US010708605B2

(12) United States Patent
He et al.

(10) Patent No.: US 10,708,605 B2
(45) Date of Patent: Jul. 7, 2020

(54) INTER-LAYER REFERENCE PICTURE ENHANCEMENT FOR MULTIPLE LAYER VIDEO CODING

(71) Applicant: VID SCALE, INC., Wilmington, DE (US)

(72) Inventors: Yuwen He, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 498 days.

(21) Appl. No.: 14/781,805

(22) PCT Filed: Apr. 4, 2014

(86) PCT No.: PCT/US2014/032904
§ 371 (c)(1),
(2) Date: Oct. 1, 2015

(87) PCT Pub. No.: WO2014/165721
PCT Pub. Date: Oct. 9, 2014

(65) Prior Publication Data
US 2016/0065976 A1   Mar. 3, 2016

Related U.S. Application Data

(60) Provisional application No. 61/845,318, filed on Jul. 11, 2013, provisional application No. 61/812,687, (Continued)

(51) Int. Cl.
*H04N 19/00* (2014.01)
*H04N 19/187* (2014.01)
(Continued)

(52) U.S. Cl.
CPC ......... *H04N 19/187* (2014.11); *H04N 19/172* (2014.11); *H04N 19/176* (2014.11); *H04N 19/33* (2014.11); *H04N 19/59* (2014.11)

(58) Field of Classification Search
CPC ........... H04N 19/00; H04N 7/00; H04N 13/00
See application file for complete search history.

(56) References Cited

U.S. PATENT DOCUMENTS 9,998,764 B2   6/2018   Ye et al.
2003/0179825 A1   9/2003   Sekiguchi et al.
(Continued)

FOREIGN PATENT DOCUMENTS

CN   101317459 A   12/2008
CN   101931813 A   12/2010
(Continued)

OTHER PUBLICATIONS

Aminlou et al., "Differential Coding for Refldx Based Scalability", Joint Collaborative Team on Video Coding (JCT-VC) of ITU-T SG 16 WP 3 and ISO/IEC JTC 1/SC 29/WG 11, Document, JCTVC-L0213, Nokia, 12th Meeting, Geneva, CH, Jan. 14-23, 2013, pp. 1-4.
(Continued)

*Primary Examiner* — Maryam A Nasri
(74) *Attorney, Agent, or Firm* — Condo Roccia Koptiw LLP

(57) ABSTRACT

A video device may generate an enhanced inter-layer reference (E-ILR) picture io assist in predicting an enhancement layer picture of a. scalable bitstream. An E-ILR picture may include one or more E-ILR blocks. An E-ILR block may be generated using a differential method, a residual method, a bi-prediction method, and/or a uni-prediction method. The video device may determine a first time instance. The video device may subtract a block of a first base layer picture
(Continued)

characterized by the first time instance from a block of an enhancement layer picture characterized by the first time instance to generate a differential block characterized by the first time instance. The video device may perform motion compensation on the differential block and add the motion compensated differential picture to a block of the second base layer picture characterized by the second time instance to generate an E-ILR block.

22 Claims, 24 Drawing Sheets

Related U.S. Application Data filed on Apr. 16, 2013, provisional application No. 61/809,115, filed on Apr. 5, 2013.

(51) Int. Cl.
  *H04N 19/59* (2014.01)
  *H04N 19/33* (2014.01)
  *H04N 19/172* (2014.01)
  *H04N 19/176* (2014.01)

(56) References Cited

U.S. PATENT DOCUMENTS

| | | | |
|---|---|---|---|
| 2004/0008783 A1 | 1/2004 | Boyce | |
| 2006/0083308 A1 | 4/2006 | Schwarz et al. | |
| 2007/0086521 A1 | 4/2007 | Wang et al. | |
| 2007/0160137 A1 | 7/2007 | Guo et al. | |
| 2010/0067572 A1* | 3/2010 | Mori | H04N 19/61 375/240.01 |
| 2011/0261876 A1 | 10/2011 | Tan et al. | |
| 2011/0293013 A1 | 12/2011 | Ma et al. | |
| 2012/0314769 A1 | 12/2012 | Lee et al. | |
| 2014/0037013 A1 | 2/2014 | Sato | |
| 2014/0185680 A1* | 7/2014 | Li | H04N 19/597 375/240.16 |
| 2014/0254681 A1* | 9/2014 | Aminlou | H04N 19/105 375/240.16 |
| 2015/0319443 A1 | 11/2015 | Bae | |

FOREIGN PATENT DOCUMENTS

| | | |
|---|---|---|
| JP | 2002-315004 A | 10/2002 |
| JP | 2009-522972 A | 6/2009 |
| JP | 2012-054982 A | 3/2012 |
| JP | 2012-517140 A | 7/2012 |
| JP | 2013-021629 A | 1/2013 |
| JP | 2013-042225 A | 2/2013 |
| JP | 2014-520413 A | 8/2014 |
| WO | WO 2006/006793 A1 | 1/2006 |

OTHER PUBLICATIONS

Bossen, Frank, "Common Test Conditions and Software Reference Configurations", Joint Collaborative Team on Video Coding (JCT-VC) of ITU-T SG16 WP3 and ISO/IEC JTC1/SC29/WG11, Document, JCTVC-H1100, 8th Meeting, San Jose, CA, USA, Feb. 1-10, 2012, pp. 1-3.

Boyce, J.M, "Weighted Prediction in the H.264/MPEG AVC Video Coding Standard", Circuits and Systems, 2004, ISCAS '04, Proceedings of the 2004 International Symposium (vol. 3), IEEE, May 23, 2004, pp. 789-792.

Bross et al., "High Efficiency Video Coding (HEVC) Text Specification Draft 10", Joint Collaborative Team on Video Coding (JCT-VC) of ITU-T SG 16 WP 3 and ISO/IEC JTC 1/SC 29/WG 11, Document, JCTVC-L1003, 12th Meeting, Geneva, CH, Jan. 14-23, 2013, pp. 1-321.

Chen et al., "SHVC Test Model 1 (SHM 1)", Joint Collaborative Team on Video Coding (JCT-VC) of ITU-T SG16 WP3 and ISO/IEC JTC1/SC29/WG11, Document, JCTVC-L1007_v3, 12th Meeting, Geneva, CH, Jan. 14-23, 2013, pp. 1-41.

Choi et al., "Scalable Structures and Inter-Layer Predictions for HEVC Scalable Extension", KWU (Kwangwoon University), JCTVC-F096, 6th Meeting: Torino, IT, Jul. 14-22, 2011, 11 pages.

Dong et al., "Description of Scalable Video Coding Technology Proposal by InterDigital Communications", Joint Collaborative Team on Video Coding (JCT-VC) of ITU-T SG16 WP3 and ISO/IEC JTC1/SC29/WG11, Document, JCTVC-K0034, 11th Meeting, Shanghai, CN, Oct. 10-19, 2012, pp. 1-30.

Husak et al., "AHG Report on MPEG Frame-Compatible Stereoscopic Coding", ISO/IEC JTC1/SC29/WG11 m21465, Geneva, CH, Nov. 2011, pp. 1-3.

Itu, "Terms of Reference of the Joint Collaborative Team on 3D Video Coding Extension Development", ITU-T Q6/16 Visual Coding and ISO/IEC JTC1/SC29/WG11 Coding of Moving Pictures and Audio, MPEG Document No. w12830, May 2012, 4 pages.

ITU-T, "Advanced Video Coding for Generic Audio Visual Services", ITU-T Rec H.264, Nov. 2007, pp. 1-564.

Li et al., "Description of Core Experiment SCE 3: Combined Inter and Inter-Layer Prediction in SHVC", Document: JCTVC-I103, Joint Collaborative Team on Video Coding of ITU-T SG 16 WP 3 and ISO/IEC JTC 1/SC 29/WG 11, 12th Meeting: Geneva, CH, Jan. 14-23, 2013, pp. 1-8.

Li et al., "Non-TE3: Extension of Test 4.6.2.1 on Generalized Residual Prediction", Joint Collaborative Team on Video Coding (JCT-VC) of ITU-T SG 16 WP 3 and ISO/IEC JTC 1/SC 29/WG 11, 12th Meeting, Geneva, CH, Document, JCTVC-L0190, Jan. 2013, pp. 1-3.

Li et al., "TE3: Results of Test 4.6.2.1 on Generalized Residual Prediction", Joint Collaborative Team on Video Coding (JCT-VC) of ITU-T SG 16 WP 3 and ISO/IEC JTC 1/SC 29/WG 11, 12th Meeting, Geneva, CH, Document, JCTVC-L0078, Jan. 14-23, 2013, pp. 1-8.

Luthra, Ajay, "Draft Call for Proposals on the Scalable Video Coding Extensions of HEVC", ISO/IEC JTC1/SC29/WG11 M24482, Geneva, Switzerland, Apr. 2012, 11 pages.

Luthra, Ajay, "Requirements for the Scalable Enhancement of HEVC", WG11 AHG on Study of HEVC Extensions, ISO/IEC JTC 1/SC29/WG11 M24484, Geneva, Switzerland, Apr. 2012, 12 pages.

Luthra, Ajay, "Use Cases for the Scalable Enhancement of HEVC", WG11 AHG on Study of HEVC Extensions, ISO/IEC JTC 1/SC29/WG11 M24483, Geneva, Switzerland, Apr. 2012, 8 pages.

Muller et al., "AHG Report on 3D Video Coding", ISO/IEC JTC1/SC29/WG11 MPEG12/m24033, Geneva, CH, Apr. 2012, pp. 1-24.

Ohm, Jens-Rainer, "Advances in Scalable Video Coding", Institute of Communications Engineering, Aachen University of Technology, Aachen, Germany, Proceedings of IEEE, vol. 93, No. 1, Jan. 2005, pp. 42-56.

Sato et al., "SCE5: Result of SCE5.2.2", Joint Collaborative Team on Video Coding (JCT-VC) of ITU-T SG 16 WP 3 and ISO/IEC JTC 1/SC 29/WG 11, Document, JCTVC-M0141, 13th Meeting, Incheon, KR, Apr. 18-26, 2013, pp. 1-4.

Schwarz et al., "Overview of the Scalable Video Coding Extension of the H.264/AVC Standard", IEEE Transactions on Circuits and Systems for Video Technology, vol. 17, No. 9, Sep. 2007, pp. 1-18.

Sullivan et al., "Rate-Distortion Optimization for Video Compression", Signal Processing Magazine, IEEE, vol. 15, No. 6, Nov. 1998, pp. 74-90.

Tech et al., "MV-HEVC Draft Text 3", Joint Collaborative Team on 3D Video Coding Extension Development of ITU-T SG 16 WP 3 and ISO/IEC JTC 1/SC 29/WG 11, 3rd Meeting, Geneva, Document, JCT3V-C1004_d3, Jan. 17-23, 2013, pp. 1-34.

Wikipedia, "Run Length Coding", Available at <http://en.wikipedia.org/wiki/Run-length_encoding>, Retrieved on Dec. 17, 2015, pp. 1-3.

\* cited by examiner

FIG. 16

| W(B₀) | W(B₄) | W(B₈) | W(B₁₂) |
| W(B₁) | W(B₅) | W(B₉) | W(B₁₃) |
| W(B₂) | W(B₆) | W(B₁₀) | W(B₁₄) |
| W(B₃) | W(B₇) | W(B₁₁) | W(B₁₅) |

1600

INTER-LAYER REFERENCE PICTURE ENHANCEMENT FOR MULTIPLE LAYER VIDEO CODING

CROSS-REFERENCE TO RELATED APPLICATIONS

This application is the National Stage Entry under 35 U.S.C. § 371 of Patent Cooperation Treaty Application No. PCT/US2014/032904, filed Apr. 4, 2014, which claims the benefit of U.S. Provisional Patent Application No. 61/809,115 filed on Apr. 5, 2013, U.S. Provisional Patent Application No. 61/812,687 filed on Apr. 16, 2013, and U.S. Provisional Patent Application No. 61/845,318 filed on Jul. 11, 2013, the contents of which are hereby incorporated by reference herein.

BACKGROUND

Over the past two decades, digital video compression technologies have been developed and standardized to enable efficient digital video communication, distribution, and consumption. Most of the commercially widely deployed standards are developed by ISO/IEC and ITU-T, such as MPEG-2 and H.264 (MPEG-4 part 10). Due to the emergence and maturity of video compression technologies, high efficiency video coding (HEVC) may be developed.

With the growth of smart phones and tablets both in resolution and computation capability, additional video applications, such as video chat, mobile video recording and sharing, and video streaming, may require video transmission in heterogeneous environments. Scenarios such as 3-screen and N-screen that consider various consumer devices (e.g., PCs, smart phones, tablets, TVs, etc.) may accommodate video consumption on devices with widely varying capabilities in terms of computing power, memory/storage size, display resolution, display frame rate, etc. The network and transmission channels may have widely varying characteristics in terms of packet loss rate, available channel bandwidth, burst error rate, etc. Video data may be transmitted over a combination of wired networks and wireless networks, which may further complicate the underlying transmission channel characteristics.

Scalable video coding may provide a solution to improve the quality of experience for video applications running on devices with different capabilities over heterogeneous networks. Scalable video coding may encode a signal once at a highest representation (e.g., temporal resolution, spatial resolution, quality, etc.) and may enable decoding from subsets of the video streams depending on the specific rate and representation required by the applications running on client devices. Scalable video coding may save bandwidth and storage compared to non-scalable solutions. Video standards such as but not limited to MPEG-2 Video, H.263, MPEG4 Visual and H.264 may have tools and/or profiles that support some modes of scalability.

SUMMARY

Systems, methods, and instrumentalities are provided to implement a video coding method. A video device (e.g., which may include an encoder and/or a decoder) may generate an enhanced inter-layer reference (E-ILR) picture that includes one or more E-ILR blocks, for example, to assist in predicting an enhancement layer (EL) picture (e.g., and/or EL block) of a scalable bitstream. The video device may receive an E-ILR enabled flag, which may for example, indicate to a decoder to perform E-LIR processing. For example, the video device may generate an E-ILR block using a differential enhancement method. The video device may include a processor that may be configured to perform one or more of the following. The processor may determine a first time instance based on base layer motion information associated with a second base layer picture characterized by a second time instance. The base layer motion information may include a motion information class and/or a motion vector of a downsampled base layer block and/or an upsampled base layer block.

The processor may subtract a block of a first base layer picture characterized by the first time instance from a block of an enhancement layer picture characterized by the first time instance to generate a differential block characterized by the first time instance. The block of the first base layer picture may be an upsampled block or a downsampled block of the first base layer picture. The processor may perform motion compensation on the differential block. The motion compensation may be performed on the differential block using base layer motion information (e.g., scaled base layer motion information) associated with a block of the second base layer picture, for example, according to a spatial ratio between the base layer and the enhancement layer.

The processor may multiply the motion compensated differential block by a weight. The weight may be greater than or equal to zero and less than or equal to one. The processor may add an offset to the motion compensated differential block. The processor may add the motion compensated differential picture to the block of the second base layer picture characterized by the second time instance to generate an E-ILR block characterized by the second time instance. The block of the second base layer picture may be an upsampled block or a downsampled block of the second base layer picture. The processor may generate an E-ILR picture characterized by the second time instance that comprises the E-ILR block. The processor may predict an enhancement layer picture characterized by the second time instance using the E-ILR picture and/or an upsampled base layer picture characterized by the second time instance.

The video device may generate an E-ILR block using a residual enhancement method. The video device may include a processor that may be configured to perform one or more of the following. The processor may determine a first time instance based on base layer motion information associated with a second base layer picture characterized by a second time instance.

The processor may subtract a block of a first base layer picture characterized by the first time instance from a block of the second base layer picture to generate a residual. The processor may perform motion compensation on the residual. The motion compensation may be performed on the residual using base layer motion information associated with the block of the second base layer picture. The processor may multiply the residual by a weight. The processor may add an offset to the residual.

The processor may add the residual to a block of an enhancement layer picture characterized by the first time instance to generate an enhanced inter-layer reference (E-ILR) block characterized by the second time instance. The processor may generate an E-ILR picture characterized by the second time instance that comprises the E-ILR block. The processor may predict an enhancement layer picture characterized by the second time instance using the E-ILR picture and/or an upsampled base layer picture characterized by the second time instance. The block of the first base layer picture may be an upsampled block or a downsampled block of the first base layer picture. The block of the second first base layer picture may be an upsampled block or a downsampled block of the second base layer picture.

The video device may generate an inter-layer reference block (e.g., an E-ILR block) using bi-prediction. The video device may include a processor that may be configured to perform one or more of the following. The processor may determine a first time instance based on first base layer motion information associated with a third base layer picture characterized by a third time instance. The processor may determine a second time instance based on second base layer motion information associated with the third base layer picture characterized by the third time instance. The processor may generate an enhanced inter-layer reference (E-ILR) block characterized by the third time instance using a block of a first base layer picture characterized by the first time instance and a block of a second base layer picture characterized by the second time instance. The block of the first base layer picture may be an upsampled block or a downsampled block of the first base layer picture. The block of the second first base layer picture may be an upsampled block or a downsampled block of the second base layer picture.

The processor may be configured to generate the E-ILR block by adding the block of the first base layer picture to the block of the second base layer picture to create a combined base layer block. The processor may divide the combined base layer block by two to generate an averaged base layer block. The processor may add a block of a first enhancement layer picture characterized by the first time instance to a block of a second enhancement layer picture characterized by the second time instance to create a combined enhancement layer block. The processor may divide the combined enhancement layer block by two to generate an averaged enhancement layer block. The processor may subtract the averaged base layer block from the averaged enhancement layer block to generate a differential block. The processor may perform motion compensation on the differential block. The processor may multiply the motion compensated differential block by a weight. The processor may add the motion compensated differential block to a block of a base layer picture characterized by the third time instance to generate the E-ILR block. The block of the third first base layer picture may be an upsampled block or a downsampled block of the third base layer picture.

BRIEF DESCRIPTION OF THE DRAWINGS

FIG. 16 is a diagram of an example of region-based weight for ILR enhancement.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application. In addition, the figures may illustrate flow charts, which are meant to be exemplary. Other embodiments may be used. The order of the messages may be varied where appropriate. Messages may be omitted if not needed, and, additional flows may be added.

Video standards such as MPEG-2 Video, H.263, MPEG4 Visual and H.264 may have tools and/or profiles that may support scalability modes. High efficiency video coding (HEVC) scalable extension may support spatial scalability (e.g., the scalable bitstream may include signals at more than one spatial resolution) and/or quality scalability (e.g., the scalable bitstream may include signals at more than one quality level). MPEG may support view scalability (e.g., the scalable bitstream may include 2D, and 3D video signals).

Figure 1:
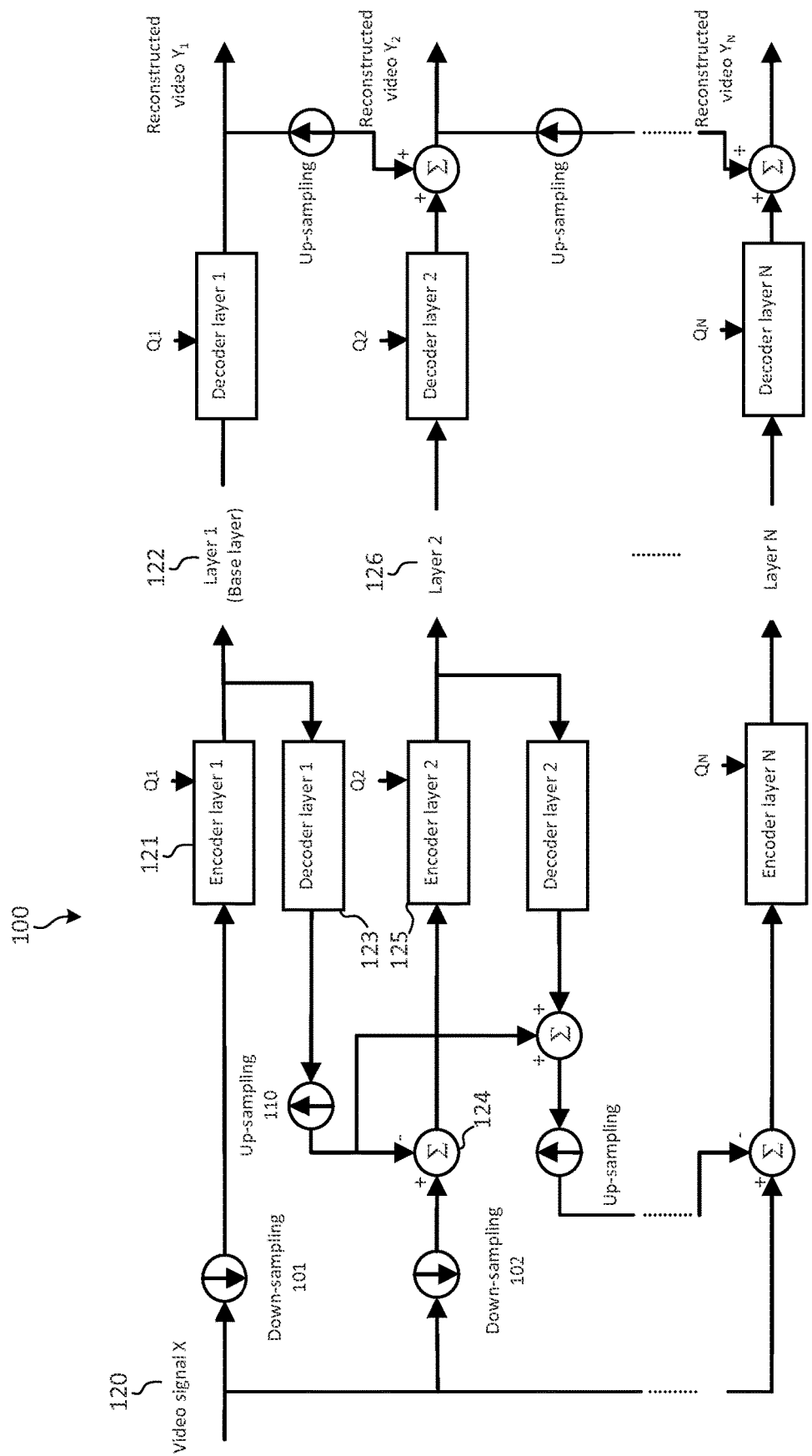
FIG. 1 is a diagram of an example scalable video coding system with N-layers.

FIG. 1 is a diagram of an example scalable video coding system 100 with N-layers. The spatial and/or temporal signal resolution to be represented by the layer 1 (e.g., a base layer) may be generated by down-sampling of the input video signal 120 at a down-sampler 101. In an encoding stage at encoder 121, an appropriate setting of the quantizer (e.g., $Q_1$) may lead to a certain quality level of an encoded base layer bitstream 122. To encode one or more higher layers, e.g., the base-layer reconstruction (e.g., $Y_1$), an approximation of the higher layer resolution levels may be used in the encoding and/or decoding of the higher layers. The encoded base layer may be decoded by a decoder 123 to create a base layer reconstruction signal. The up-sampling unit 110 may perform up-sampling of the base layer reconstruction signal to the layer-2's resolution. The upsampled base layer reconstruction signal may then be subtracted from downsampled versions of the input video signal 120. For example, the input video signal 120 may be downsampled at downsampler 102 and then the upsampled base layer reconstruction signal may be subtracted from the downsampled input video signal at 124 to generate a difference signal. The difference signal may be encoded at a layer-2 encoder 125 to create a layer-2 bitstream 126. Down-sampling and up-sampling may be performed throughout each of the layers (e.g., layers 1, 2, . . . N). The down-sampling and up-sampling ratios may be different depending on the dimension of the scalability between two given layers.

As illustrated in FIG. 1, for a higher layer n (e.g., $2 \leq n \leq N$), a differential signal may be generated by subtracting an up-sampled lower layer signal (e.g., layer n−1 signal) from the current layer n signal, and the difference signal may be encoded. If the video signals represented by two layers (e.g., n1 and n2) have the same spatial resolution, the corresponding down-sampling and up-sampling operations may be by-passed. A layer n (e.g., $1 \leq n \leq N$) or a plurality of layers may be decoded without using decoding information from higher layers. Relying on coding of the residual signal (e.g., difference signal between two layers) for each of the layers except the base layer, as may be used by the system in FIG. 1, may cause visual artifacts. The visual artifacts may be caused by the processes that quantize and/or normalize the residual signal to restrict its dynamic range, the additional quantization performed during coding of the residual, and/or because motion estimation in a residual signal may be different from conventional motion estimation.

Scalable Video Coding (SVC) may be an extension of H.264 that may enable the encoding, transmission, and/or decoding of partial bit streams to provide video services with lower temporal resolutions, lower spatial resolutions, reduced fidelity, and/or the like, for example, while retaining a relative high reconstruction quality, given the rate of the partial bit streams. A design feature of SVC may be referred to as single loop decoding. In single loop decoding, an SVC decoder may set up a motion compensation loop at the layer being decoded, and may not have to set up motion compensation loop(s) at other lower layer(s). For example, if a bitstream include two layers, layer 1 (e.g., a base layer) and layer 2 (e.g., an enhancement layer), and a decoder reconstructs the layer 2 video, a decoded picture buffer and/or motion compensated prediction may be set up for layer 2 (e.g., and not for layer 1, the base layer that layer 2 depends on). SVC may not need to have a reference picture from a lower layer to be fully reconstructed. Such a setup may reduce computational complexity and/or memory complexity at the decoder. Single loop decoding may be achieved by constrained inter-layer texture prediction, where for example, for a current block in a given layer, spatial texture prediction from a lower layer may be permitted if the corresponding lower layer block is coded in restricted intra mode. When the lower layer block is coded in intra mode, it may be reconstructed without motion compensation operations and/or a decoded picture buffer.

SVC may use additional inter-layer prediction, such as motion vector prediction, residual prediction, mode prediction etc. from lower layers, for example, to improve rate-distortion efficiency of an enhancement layer. Inter-layer prediction may refer to picture-level ILP, block-level ILP, and/or the like. Although single loop decoding may reduce the computational complexity and/or memory complexity at the decoder, single loop decoding may increase implementation complexity by relying heavily on block-level inter-layer prediction methods to achieve satisfactory performance. To compensate for the performance penalty incurred by imposing the single loop decoding constraint, encoder design and computation complexity may be increased such that desired performance may be achieved.

Multi-view video coding (MVC) is an extension of H.264. MVC may provide view scalability. In view scalability, the base layer bitstream may be decoded to reconstruct a conventional 2D video. Additional enhancement layers may be decoded to reconstruct other view representations of the same video signal. When each of the views are combined together and displayed by a proper 3D display, the user may experience 3D video, for example, with proper depth perception.

Figure 2:
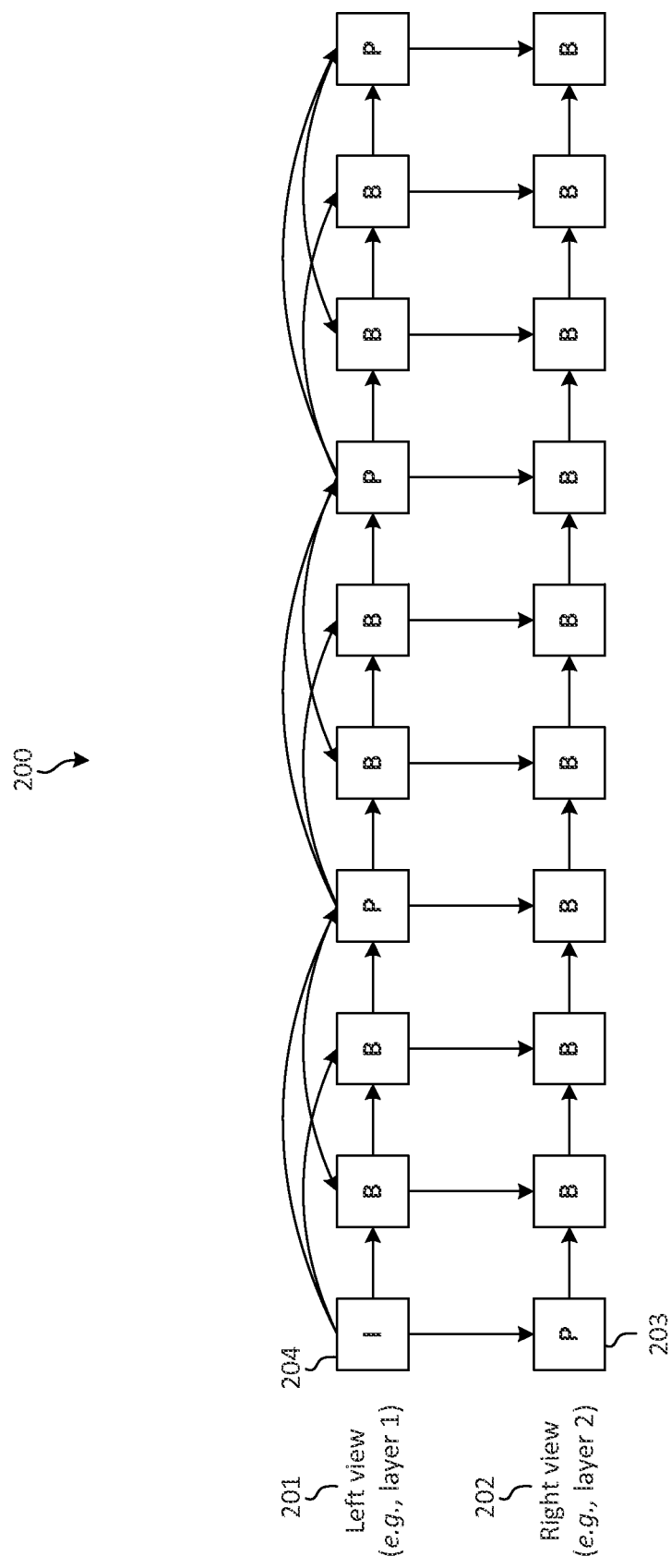
FIG. 2 is a diagram of an example of temporal and inter-layer prediction for stereoscopic (e.g., 2-view) video coding using multiple layer video coding.

FIG. 2 is a diagram of an example prediction structure 200 using MVC to code a stereoscopic video with a left view (e.g., layer 1) 201 and a right view (e.g., layer 2) 202. The left view video 201 in FIG. 2 may be coded with IBBP prediction structure. The right view video 202 may be coded with IBBP prediction structure. In the right view 202, the first picture 203 collocated with the first 1 picture 204 in the left view 201 may be encoded as a P picture. The other pictures in the right view 202 may be encoded as B pictures, for example, with the first prediction coming from temporal references in the right view 202, and the second prediction coming from inter-layer reference in the left view 201. Stereoscopic 3D TVs (e.g., using 3D glasses) may display 3D content (e.g., movies, live sports, etc.). Unlike SVC, MVC may not support the single loop decoding feature. Decoding of the right view (e.g., layer 2) video 202 may use pictures in the left view (e.g., layer 1) video 201 to be available, for example, as shown in FIG. 2. As such, motion compensation loops may be performed in both views/layers. MVC may include high level syntax changes and/or may not contain any block-level changes to H.264/AVC. MVC may support coding of more than two views by extending the example in FIG. 2 to perform inter-layer prediction across multiple views.

3D video (e.g., stereoscopic 3D video) may include two views, for example, a left view and a right view. Stereoscopic 3D video content delivery may be achieved by packing and/or multiplexing the two views into one frame (e.g., which may be referred to as frame compatible), and compressing and transmitting the packed video with a standard (e.g., H.264/AVC). At the receiver side, after decoding, the frames may be unpacked and displayed as two views. Multiplexing of the views may be performed in the temporal domain and/or the spatial domain. When performed in the spatial domain, the two views may be spatially down sampled by a factor of two and packed by various arrangements, for example, in order to maintain the same picture size. For example, side-by-side arrangement may put the down sampled left view on the left half of the picture and the down sampled right view on the right half of the picture. Other arrangements may include top-and-bottom, line-by-line, checkerboard, and the like. The specific arrangement may be used to achieve frame compatible 3D video and may be conveyed by the frame packing arrangement SEI messages. Although such arrangement may achieve 3D delivery with minimal increase in bandwidth requirement (e.g., there may be some increase since the packed frames may be difficult to compress), spatial down sampling may cause aliasing in the views and may reduce the visual quality and user experience of 3D video. A scalable extension may be provided to frame compatible (e.g., two views packed into the same frame) base layer video and one or more enhancement layers may be provided to recover the full resolution views for improved 3D experience. The underlying technology to enable full-resolution MFC may be related to spatial scalability technologies.

A 3D scalable video coding, which may be referred to as 3DV, may be provided. Autostereoscopic displays and applications may allow 3D experience without the glasses. In order to achieve the 3D experience without glasses, more than two views may be needed. Coding a number of views (e.g., 9 views or 10 views) may be expensive. A hybrid approach of coding a fewer views (e.g., 2 or 3 views) with relatively large disparity together with the depth maps that provide depth information of the views may be provided. At the display side, the coded views and depth maps may be decoded, and the remaining views may be generated using the decoded views and their depth maps using view synthesis technologies. 3DV may use various methods to code the views and the depth maps, for example, using a combination of H.264/AVC, MVC, and/or HEVC standards. The base layer may be coded with one standard (e.g., H.264/AVC) and one or more enhancement layers may be coded with another standard (e.g., HEVC).

Table 1 illustrates types of scalabilities discussed herein, and the corresponding standards that may support these scalabilities. As illustrated in Table 1, the bit-depth scalability and chroma format scalability may be tied to video formats (e.g., higher than 8-bit video and chroma sampling formats higher than YUV4:2:0).

TABLE II

| Scalability | Example |
| --- | --- |
| View scalability | 2 D → 3 D (e.g., 2 or more views) |
| Spatial scalability | 720 p → 1080 p |
| Quality (SNR) scalability | 35 dB → 38 dB |
| Temporal scalability | 30 fps → 60 fps |
| Standards scalability | H.264/AVC → HEVC |
| Bit-depth scalability | 8-bit video → 10-bit video |
| Chroma format scalability | YUV4:2:0→YUV4:2:2, UV4:4:4 |
| Aspect ratio scalability | 4:3 → 16:9 |

Various designs may be provided for an HEVC scalable extension. For example, an HEVC scalable extension may be inter-layer reference (ILR) picture based (e.g., which may be referred to as RefIdx) and/or ILR block based (e.g., which may be referred to as IntraBL). RefIdx may add an inter-layer prediction (ILP) process to generate inter-layer reference pictures. RefIdx may not use low level changes for the enhancement layer (EL) encoding and/or decoding processes. The EL codec design may reuse the design of single layer HEVC codec, for example, with some high level changes (e.g., reference list construction). IntraBL may add coding modes at a coding block level to exploit the information from the base layer including reconstructed pictures and the motion.

In an inter-layer prediction based process (e.g., which may be a process of RefIdx), one or more inter-layer reference (ILR) pictures may be generated from one or more base layer (BL) reconstructed pictures. The ILR pictures may be marked as long-term reference pictures used for EL encoding and decoding. The ILP process may include upsampling a BL reconstructed picture to the resolution of an EL. The ILP process may include mapping BL motion information (e.g., of the temporally collocated BL picture) to that of the ILR picture. Various technologies, such as but not limited to, cross-plane filtering, edge guided processing, and the like, may be used to improve the upsampled ILR picture quality. Motion mapping technology may be used to improve the motion information of an ILR picture that may be used for the EL's motion prediction. The ILR picture may be used for prediction of an EL picture, for example, of a collocated (e.g., temporally collocated) EL picture.

A high frequency signal of an ILR picture may not be restored by using an upsampled BL reconstructed picture (e.g., only a BL reconstructed picture), for example, because of high frequency information that may be missing at the BL and therefore may not be included in the upsampled BL reference picture. The missing high frequency information may be due to the downsampling of the input video stream from a high resolution signal to the resolution of the base layer when generating the BL source pictures (e.g., at the encoder side), for example, when the two layers may have different spatial resolutions. The missing high frequency information may be due to the quantization performed when coding the BL from the input video stream. The temporal reconstructed pictures at the EL may have the high frequency information (e.g., a portion of the high frequency information). As such, the high frequency information may be restored using an EL temporal reconstructed picture.

Differential coding in the RefIdx framework may be used. A differential picture may be generated by subtracting an upsampled BL picture from a reconstructed EL picture (e.g., a collocated reconstructed EL picture). The differential picture may be inserted in an EL reference picture list. The differential coding may use weighted prediction, for example, as described herein. The differential picture may be different from a reference picture generated by upsampling the base layer picture to the resolution of the EL. The differential picture may be used for a differential coding mode (e.g., only for a differential coding mode). Because of the size limitation of the reference list, the encoder may be limited to the number of differential pictures it can apply. Prediction methods that combine inter-layer prediction and EL inter prediction may be used. Prediction methods that combine inter-layer prediction and EL inter prediction may be based on the IntraBL scheme and/or may require block-level changes for EL coding.

Methods, systems, and instrumentalities provide the enhancement of an inter-layer reference picture by combining, for example, an upsampled BL picture and a temporal reconstructed EL picture with motion compensation. The RefIdx framework may be used, as the enhanced inter-layer reference picture may be treated as a normal reference picture, for example, by marking it as a long term reference.

Figure 3:
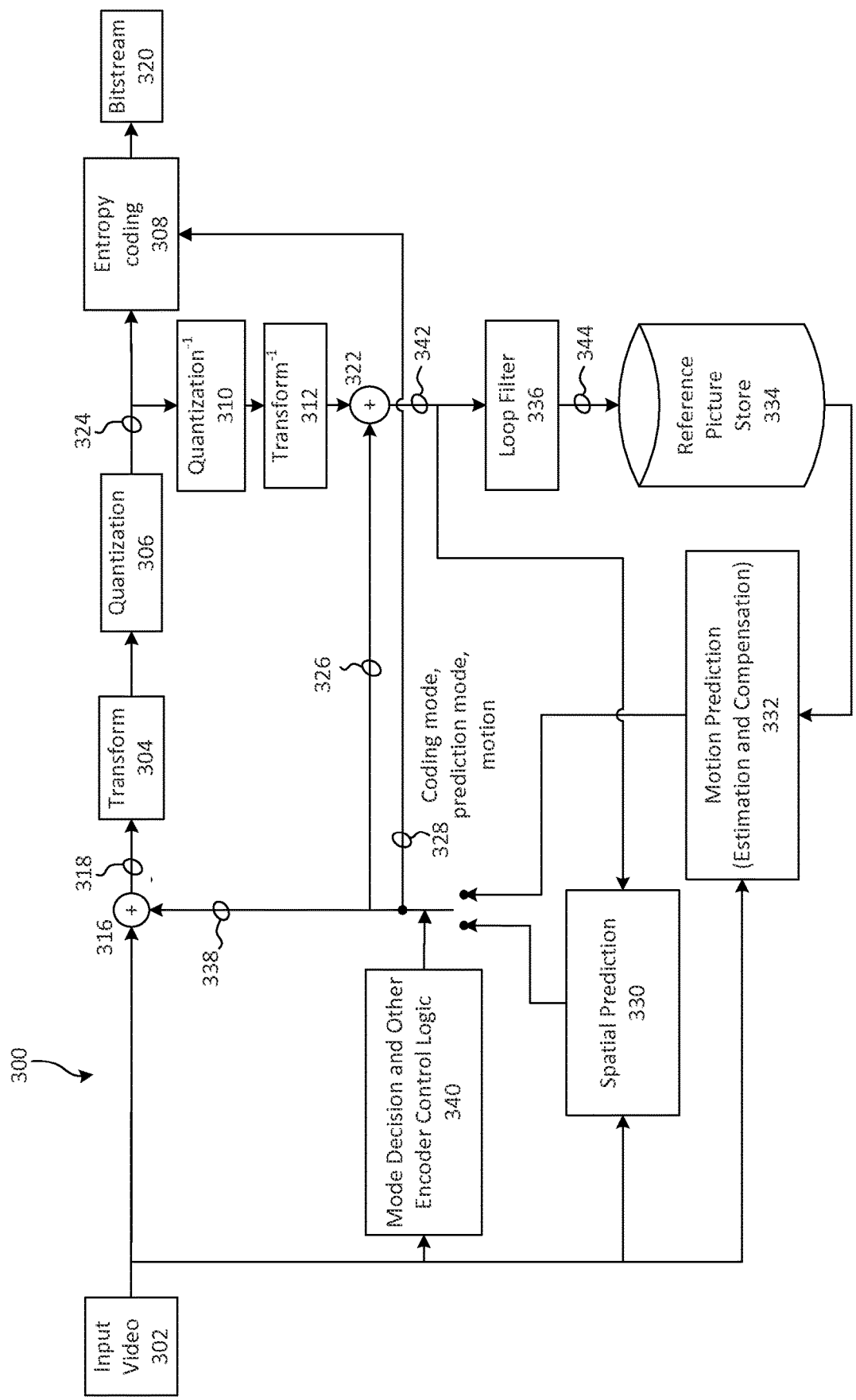
FIG. 3 is a diagram of an example single-layer encoder.

FIG. 3 is a diagram of an example block-based single layer video encoder 300. The single layer encoder 300 may employ spatial prediction (e.g., intra prediction) and/or temporal prediction (e.g., inter prediction and/or motion compensated prediction) to predict the input video signal, for example, to achieve efficient compression. The encoder 300 may receive an input video stream 302, for example, block by block. For example, the encoder may partition one or more pictures of the input video stream 301 into blocks and encode the one or more blocks, for example, one by one. The encoder 300 may send a video block of the input video 302 to a mode decision and other encoder control logic unit 340, a spatial prediction unit 330, and/or a motion prediction unit 332. The mode decision logic unit 340 may be used to determine the most suitable form of prediction, for example, based on certain criteria such as rate and/or distortion considerations.

The encoder 300 may generate a prediction residual 318 at an adder 316 using a video block of the input video stream 302 and a prediction signal 338 (e.g., a prediction block). The prediction signal 338 may be determined by the mode decision logic unit 340, for example, based on the determined form of prediction for the current block. The prediction residual 318 may be the difference signal between the input signal 302 and the prediction signal 338.

The encoder 300 may transform and quantize the prediction residual 318 at a transformation unit 304 and a quantization unit 306, respectively. By transforming a quantizing the prediction residual 318, the encoder 300 may generate a residual coefficient block 324. The residual coefficient block 324 may be referred to as a quantized residual. The residual coefficient block 324 may be combined with the mode information (e.g., intra or inter prediction), motion information, and/or prediction information (e.g., motion vectors, reference picture indexes, intra prediction modes, etc.) 328 and compressed at an entropy coder 308. The motion information may include a motion information class of the block (e.g., an index of reference picture that the motion information is associated with) and a motion vector of the block (e.g., the amount of the motion). The entropy coder 308 may generate an output video bitstream 320 using the residual coefficient block 324 and the coding mode, motion information, and/or prediction information 328. The output video bitstream 320 may include coded information of a plurality of pictures. A picture may include one or more blocks or one or more sizes. The blocks may be any size, for example, 64×64, 32×32, 16×16, 8×8, 4×4, rectangular, etc.

The encoder 300 may generate the reconstructed video signal 342 (e.g., a reconstructed video block) by applying inverse quantization at 310 and inverse transform at 312 to the quantized residual 324 to obtain a reconstructed residual and adding the reconstructed residual at adder 322 to a prediction signal 326 (e.g., a prediction block). The reconstructed video signal 342 may be referred to as an unfiltered reconstructed signal. The reconstructed video signal 342 may be provided to the spatial prediction unit 330. The reconstructed video signal 342 may go through a loop filter process (e.g., deblocking filter, Sample Adaptive Offsets, Adaptive Loop Filters, and/or the like) at a loop filter unit 336. The filtered reconstructed video signal 344 may be stored in a reference picture store 334, for example, to be used to predict future video signal. The reference picture store 334 may refer to a decoded picture buffer (DPB). The reference picture store 334 may provide the filtered reconstructed video signal 344 to the motion prediction unit 332, for example, for prediction of subsequent blocks of the input video 302.

Figure 4:
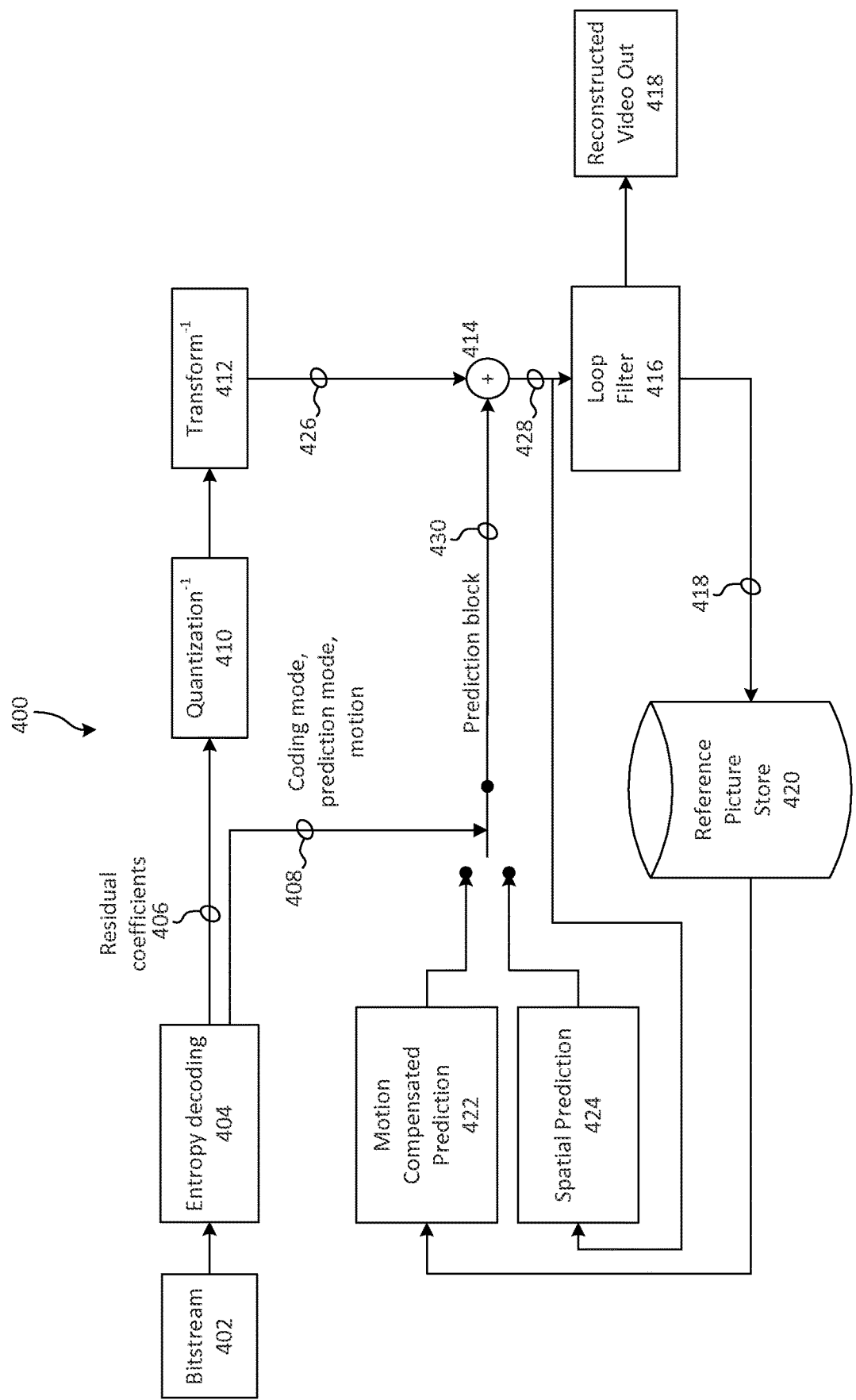
FIG. 4 is a diagram of an example single-layer decoder.

FIG. 4 is a diagram of an example block-based single layer decoder 400. The decoder 400 may receive a video bitstream 402 that, for example, may have been produced by the encoder 300 of FIG. 3 (e.g., may be the bitstream 320). The video bitstream 402 may include coded information of a plurality of pictures. A picture may include one or more blocks or one or more sizes. The blocks may be any size, for example, 64×64, 32×32, 16×16, 8×8, 4×4, rectangular, etc. The decoder 400 may reconstruct the video signal to be displayed. At the video decoder 400, the bitstream 402 may be parsed by an entropy decoder 404 to generate residual coefficients 406 and/or information relating to the coding mode, the prediction mode, and motion information 408. The residual coefficients 406 may be inverse quantized at 410 and inverse transformed at 412 to obtain a reconstructed residual 426.

The coding mode, prediction mode, and motion information 408 may be used to obtain a prediction signal 430 using spatial prediction via a spatial prediction unit 424 and/or temporal prediction via a temporal prediction unit 422 of a video block (e.g., the same or a different video block) of the bitstream 402. The prediction signal 430 and the reconstructed residual 426 may be added at adder 414 to generate a reconstructed video signal 428. The reconstructed video signal 428 may be provided to the spatial prediction unit 424. The reconstructed video may be filtered by a loop filtering unit 416 to generate a filtered reconstruction video signal 418. The filtered reconstructed video signal 418 may be stored in a reference picture store 420. The filtered reconstructed video signal 418 may be displayed and/or may be used to decode blocks of a video signal (e.g., bitstream 402).

Figure 5:
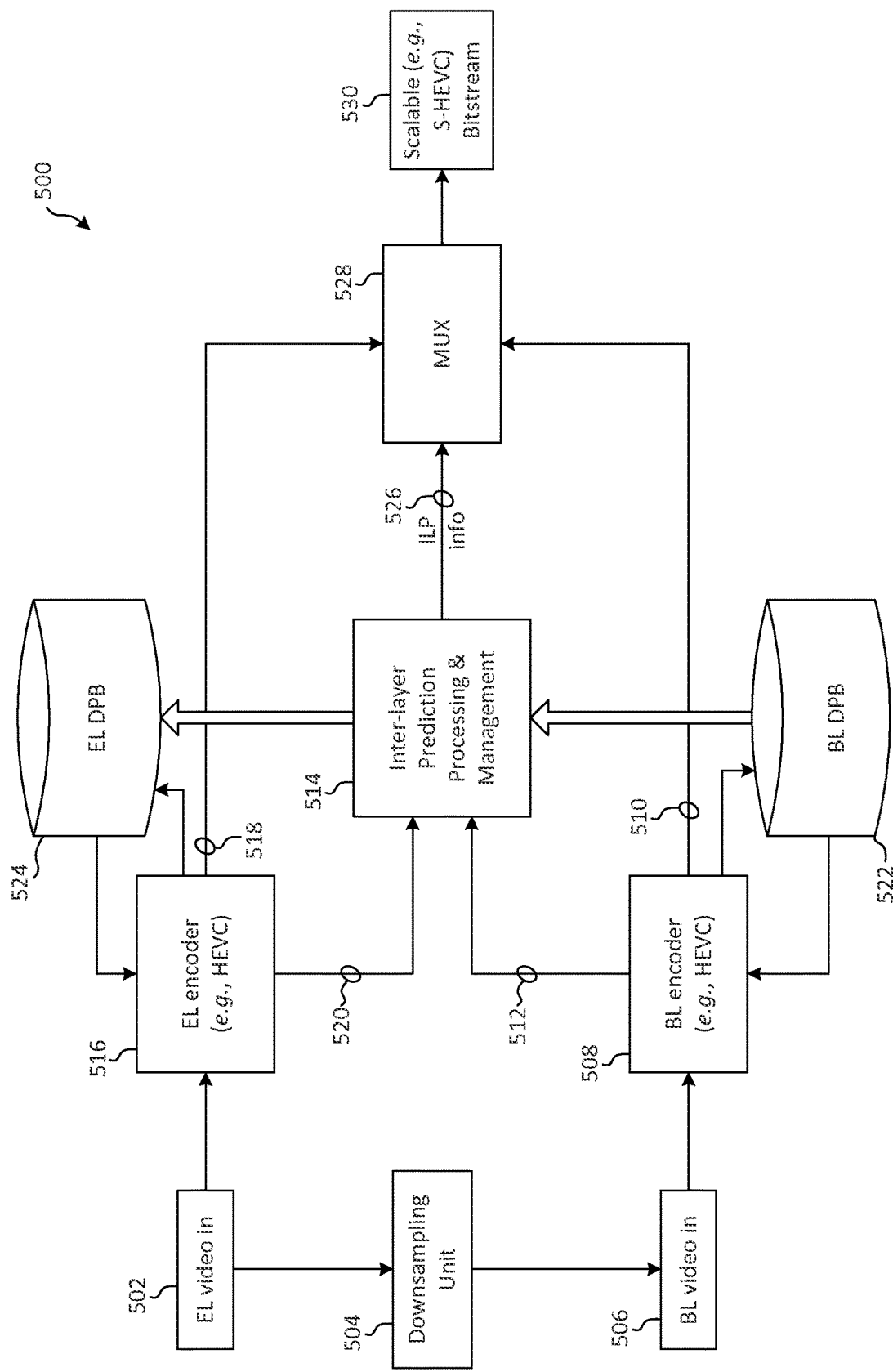
FIG. 5 is a diagram of an example two layer scalable encoder.

FIG. 5 is a diagram of an example two-layer scalable video encoder 500. The two-layer scalable video encoder 500 may include inter-layer prediction. Inter-layer prediction may refer to picture-level ILP, block-level ILP, and/or the like. In FIG. 5, an enhancement layer video input 502 may be received. The enhancement layer video input 502 may be downsampled at a downsampling unit 504 to create a base layer video input 506. A base layer encoder 508 (e.g., an HEVC encoder) may encode the base layer video input 506 (e.g., block by block, picture by picture, etc.) and may generate a base layer bitstream 510. The video encoder 300 may be an example of the base layer encoder 508. The base layer encoder 508 may send base layer information 512 (e.g., coding mode information, the prediction mode information, and/or the motion information) to an inter-layer prediction processing and management unit 514. The base layer encoder 508 may store base layer reconstructed pictures (e.g., one or more pictures of the bitstream) in a base layer decoded picture buffer 522. The base layer encoder 508 may use pictures retrieved from the decoded picture buffer 522 and/or the base layer information 512 to encoded the base layer input 506 and generate the base layer bitstream 510.

An enhancement layer encoder 516 may receive the enhancement layer video input 502. The enhancement layer video input 502 may be at higher spatial resolution and/or higher values of other video parameters than the base layer video input 506. The enhancement layer encoder 516 may generate an enhancement layer bitstream 518 using the enhancement layer video input 502. The enhancement layer encoder 516 may produce the EL bitstream 518 in a substantially similar manner as the base layer video encoder 508, for example, by using spatial prediction and/or temporal prediction to achieve compression. The enhancement layer encoder 516 may send enhancement layer information 520 (e.g., coding mode information, the prediction mode information, and/or the motion information) to the inter-layer prediction processing and management unit 514. The enhancement layer encoder 516 may store enhancement layer reconstructed pictures (e.g., one or more pictures of the bitstream) and/or the enhancement layer information 520 in an enhancement layer decoded picture buffer 524. The enhancement layer encoder 516 may use pictures retrieved from the decoded picture buffer 524 and/or the enhancement layer information 520 to encoded the enhancement layer input 502 and generate the enhancement layer bitstream 518.

The enhancement layer encoder 516 may perform inter-layer prediction (ILP) to improve its coding performance. The enhancement layer encoder 516 may perform ILP with assistance from the inter-layer prediction processing and management unit 514. For example, the inter-layer prediction processing and management unit 514 may provide one or more reference pictures generated using the base layer video input 506 to provide the reference pictures to the decoded picture buffer 524. Unlike spatial and temporal predictions that derive the prediction signal based on coded video signal in the current enhancement layer, inter-layer prediction may derive a prediction signal based on a coded video signal from the base layer input 506 (e.g., and/or other lower layers when there are more than two layers in the scalable system). Picture-level ILP and/or block-level ILP may be used by the encoder 500. A bitstream multiplexer 528 may combine the base layer bitstream 510 and the enhancement layer bitstream 518 to generate a scalable bitstream 530. The scalable bitstream 530 may include a plurality of pictures. A picture may include one or more blocks or one or more sizes. The blocks may be any size, for example, 64×64, 32×32, 16×16, 8×8, 4×4, rectangular, etc.

Figure 6:
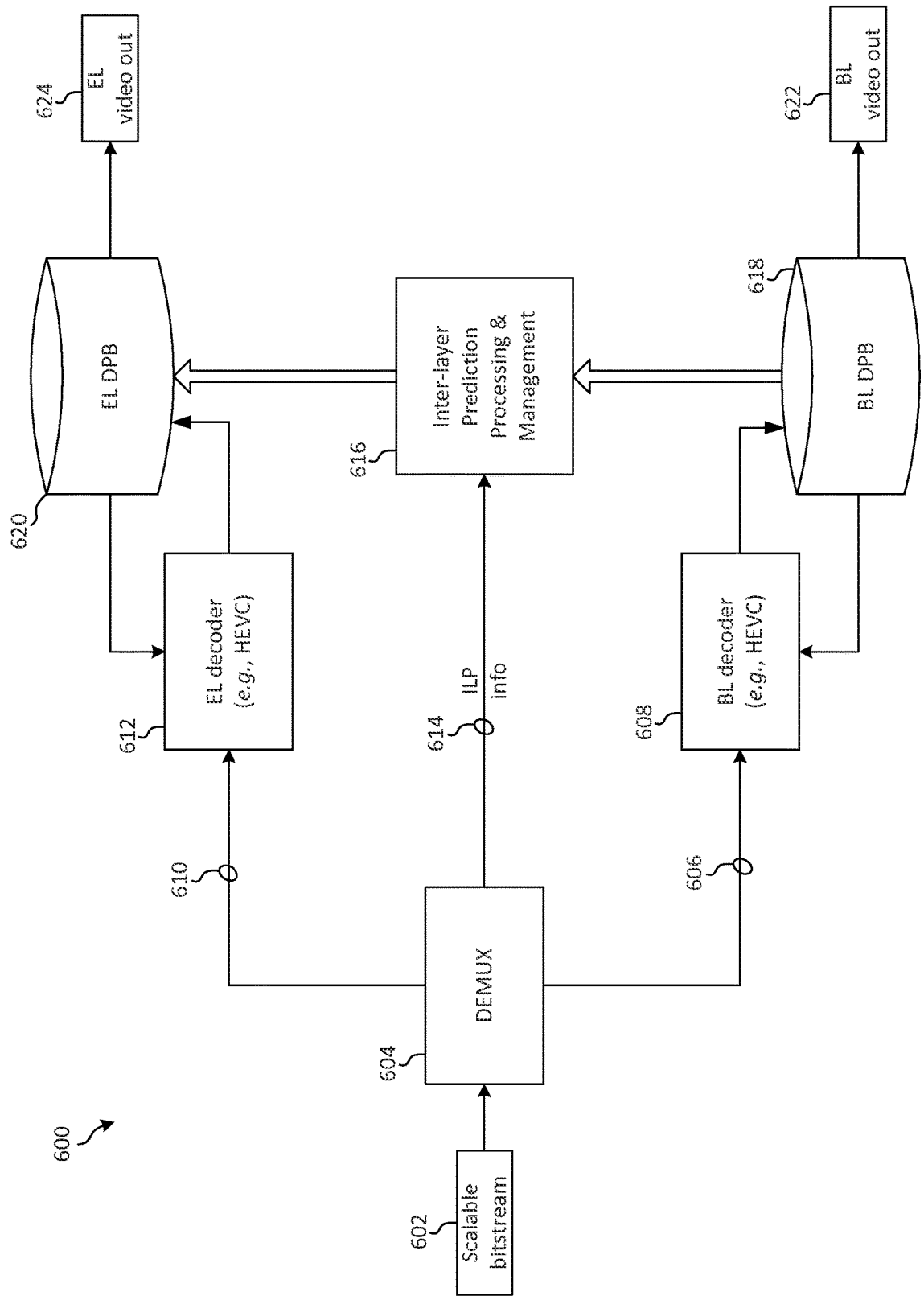
FIG. 6 is a diagram of an example two layer scalable decoder.

FIG. 6 is a diagram of an example two-layer scalable video decoder 600. The decoder 600 may correspond to the scalable encoder 500. The decoder 600 may receive a scalable bitstream 602. The scalable bitstream 602 may include a plurality of pictures. A picture may include one or more blocks or one or more sizes. The blocks may be any size, for example, 64×64, 32×32, 16×16, 8×8, 4×4, rectangular, etc. The decoder 600 may provide the scalable bitstream 602 to a de-multiplexer 604. The de-multiplexer 604 may separate the scalable bitstream 602 into a base layer bitstream 606 and an enhancement layer bitstream 610. The de-multiplexer 604 may also send inter-layer prediction information 614 to an inter-layer prediction processing and management unit 616.

A base layer decoder 608 may receive the base layer bitstream 606. The decoder 400 may be an example of the base layer decoder 608. The base layer decoder 608 may decode the base layer bitstream 606 and generate a reconstruct base layer video 622. A base layer decoded picture buffer 618 may store one or more pictures of the base layer video 622, for example, to assist the base layer decoder 608 in decoding the base layer bitstream 606. The base layer decoded picture buffer 618 may provide information relating to the base layer video 622 (e.g., an upsampled base layer picture) to the inter-layer prediction processing and management unit 616.

An enhancement layer decoder 612 may receive the enhancement layer bitstream 610. The enhancement layer decoder 612 may decode the enhancement layer bitstream 610 using information from the current layer and/or one or more of its dependent layers (e.g., the base layer), for example, via ILP. The enhancement layer decoder may decode the enhancement layer bitstream 610 to generate a reconstructed enhancement layer video 624. A enhancement layer decoded picture buffer 620 may store one or more pictures of the enhancement layer video 624 and/or one or more inter-layer pictures from the inter-layer prediction processing and management unit 616, for example, to assist the enhancement layer decoder 612 in decoding the enhancement layer bitstream 610.

Figure 7:
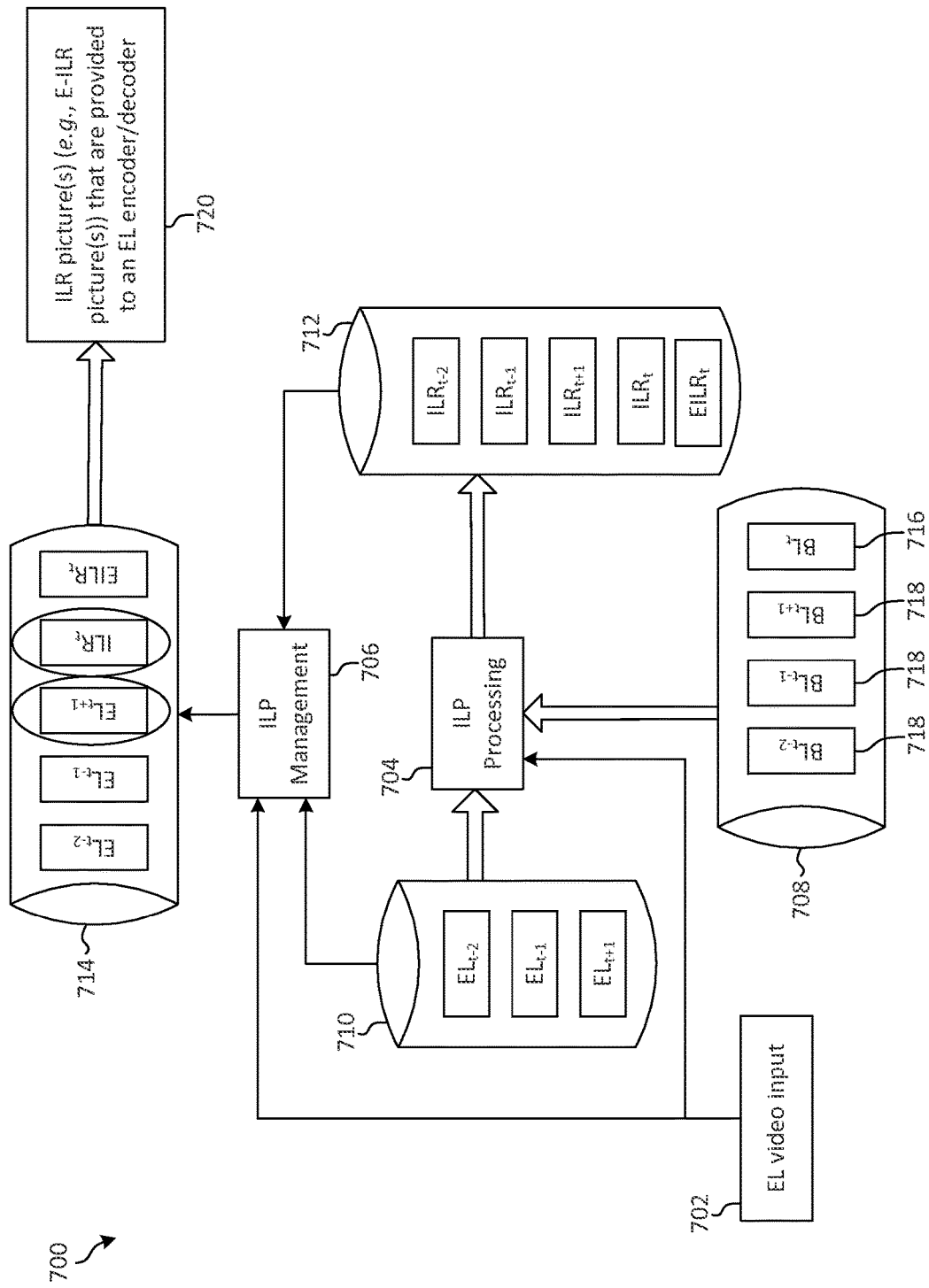
FIG. 7 is a diagram of an example of inter-layer picture (ILP) processing and management unit.

FIG. 7 is a diagram of an example inter-layer prediction processing and management unit 700. The ILP processing and management unit 514 and 616 may be examples of the ILP processing and management unit 700. The ILP processing and management unit 700 may receive an enhancement layer video input 702. The enhancement layer video input 702 may be used as an optimization target of an ILP processing unit 704. The ILP processing and management unit 700 may provide the enhancement layer video 702 to the ILP processing unit 704 and/or an ILP management unit 706. The ILP processing unit 704 may receive base layer pictures from a base layer DPB 708 and/or enhancement layer pictures 710.

The ILP processing unit 704 may generate one or more (e.g., two) inter-layer reference (ILR) pictures 712. The ILR pictures may be used by the encoder and/or decoder to encode and/or decode a current EL picture. An ILR picture may be an ILR picture generated by upsampling a collocated BL reconstructed picture 716. An ILR picture that is generated by upsampling a collocated BL reconstructed picture may be referred to as a normal ILR picture. An ILR picture may be an enhanced inter-layer reference (E-ILR) picture. An E-ILR picture may be generated by combining a temporal EL reconstructed picture and a normal ILR picture. The ILR (e.g., E-ILR) picture(s) may be inserted into an EL DPB 714. The insertion position may be managed by the ILP management unit 706. The EL DPB 714 may provide one or more of the ILR pictures to an EL encoder and/or EL decoder 720.

Figure 8:
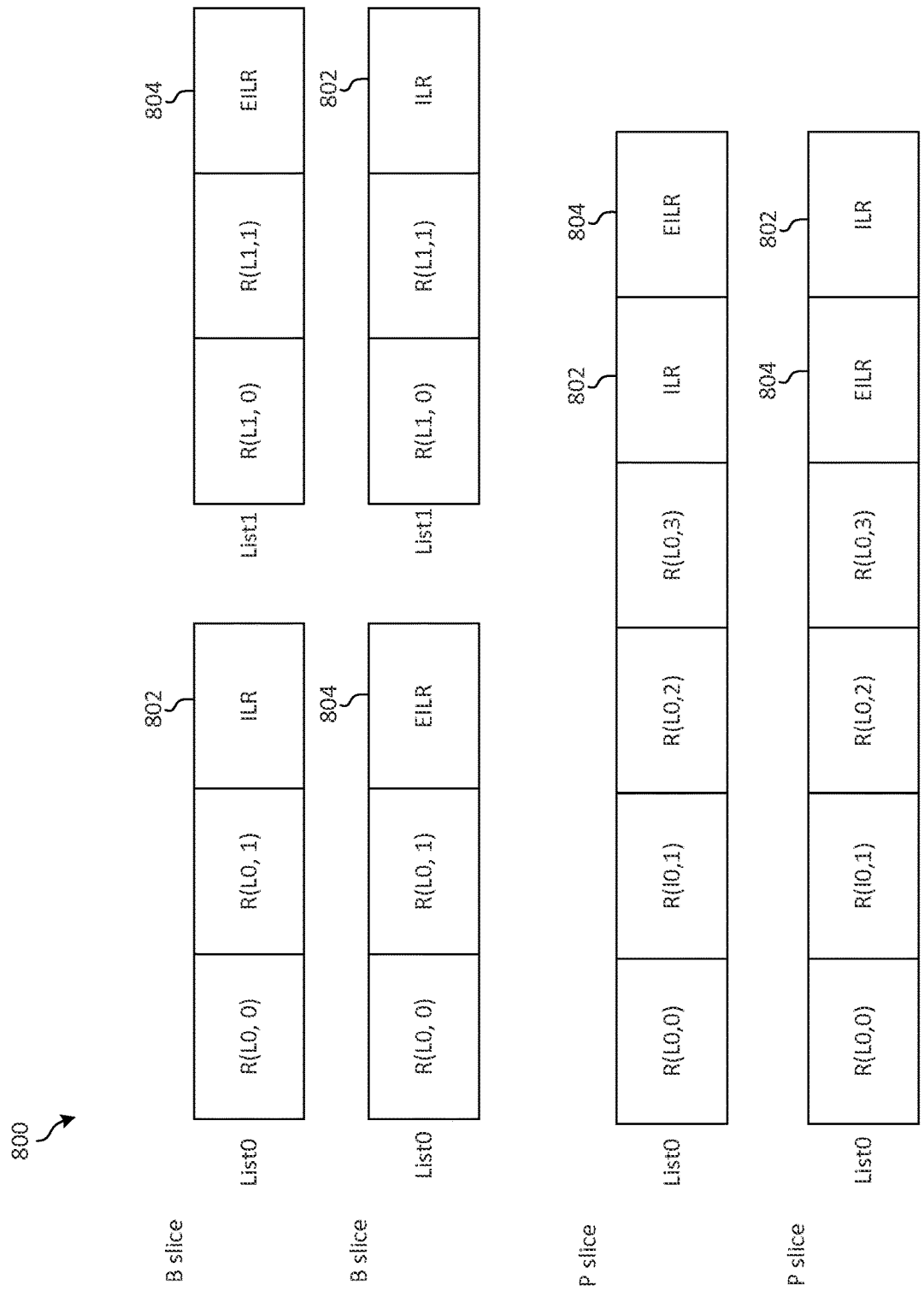
FIG. 8 is a diagram of an example placement of inter-layer reference pictures.

FIG. 8 is a diagram 800 of an example of a placement of ILR picture(s) and/or E-ILR picture(s) in reference picture lists. An ILR picture 802 and/or an E-ILR picture 804 may be identified by the encoder and/or the decoder. As illustrated in FIG. 8, the E-ILR picture 804 may be placed at different positions (e.g., of list L0 and/or L1). For example, the E-ILR picture 804 may be placed in list L0 of a B slice or in list L1 of a B slice. The E-ILR picture 804 may be placed after an ILR picture 802 in list L0 of a P slice or before an ILR picture 802 in list L0 of a P slice. The E-ILR picture may be reordered by signaling the reordering information. A flag may indicate to a decoder to perform EILR processing. Table 2 illustrates a list of symbols used herein.

TABLE 2

| Symbol | Definition |
| --- | --- |
| B(x) | block of picture x |
| Ups(x) | upsampling of x |
| $MC_{ILP}(P, MV)$ | motion compensation with reference P and motion vector MV for inter-layer prediction |
| Enh(x) | enhancement of signal x |
| MFM(x) | map the motion vector x of BL to inter-layer |
| Clip(x) | clip the value x to normal dynamic range, for example, such as [0, 255] for 8 bit content |
| $BL_T$ | base layer reconstructed picture at time T |
| $IL_T$ | inter-layer picture at time T |
| $EL_T$ | enhancement layer reconstructed picture at time T |

TABLE 2-continued

| Symbol | Definition |
| --- | --- |
| $ILD_T$ | Inter-layer differential picture at time T |
| $MV_R$ | motion vector associated with reference picture R |
| $\omega(R_x)$ | weight for the blocks with uni-prediction and reference picture being $R_X$ |
| $\omega(R_0, R_1)$ | weight for the blocks with bi-prediction and the reference pictures being $R_0$, $R_1$ |
| Enh( $B(IL_T)$ ) | enhanced inter-layer reference (E-ILR) block at time T |

The inter-layer (IL) may be a virtual picture layer that may provide a reference picture for EL coding. Motion information of an inter coded block of a BL picture may indicate the temporal correspondence for an IL block after collocated BL motion is mapped to the IL using motion field mapping. An inter-layer motion vector may be provided. For example, the inter-layer motion vector may be provided by Equation (1):

$$MV_{ILx} = MFM(MV_{BLx}) \quad (1)$$

A normal inter-layer reference picture may be provided. For example, the normal ILR picture may be generated according to Equation (2):

$$B(IL_T) = Ups(B(BL_T)) \quad (2)$$

Figure 9:
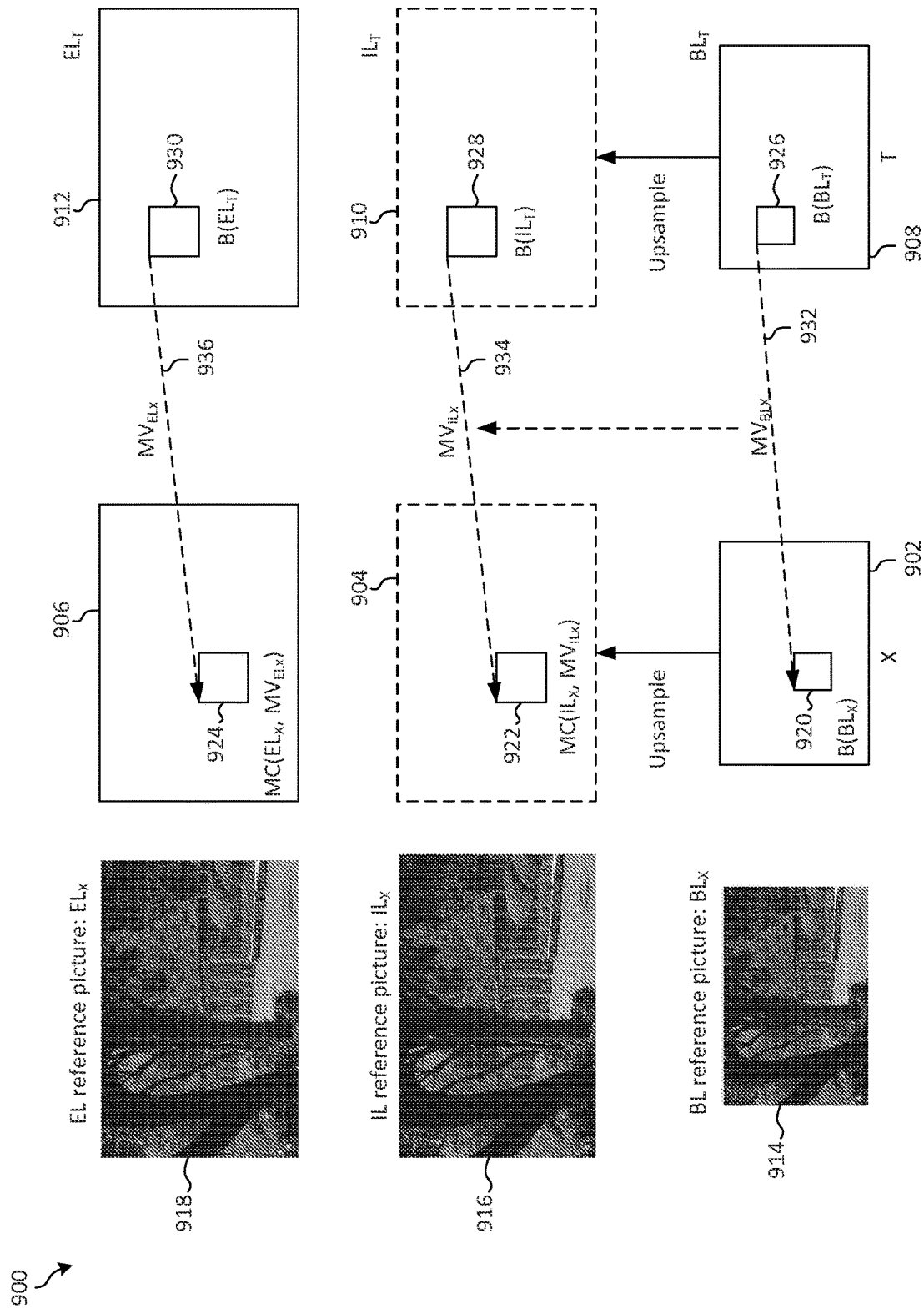
FIG. 9 is a diagram of an example of the generation of an E-ILR block using uni-prediction coded blocks.

FIG. 9 is a diagram of an example of the generation of an E-ILR block using uni-prediction coded blocks. FIG. 9 may be used to explain a residual method and/or a differential method of generating an E-ILR block. The diagram 900 shows an example of a base layer (BL) picture at time T $BL_T$ 908, an inter-layer (IL) reference picture at time T $IL_T$ 910, and an enhancement layer (EL) picture at time T $EL_T$ 912. A block $B(BL_T)$ 926 may be a block located within the BL picture $BL_T$ 908. A block $B(IL_T)$ 928 may be a block located within the IL picture $IL_T$ 910. A block $B(EL_T)$ 930 may be a block located within the EL picture $EL_T$ 912. A motion vector $MV_{BLX}$ 932 may be a motion vector associated with the block $B(BL_T)$ 926. A motion vector $MV_{ILX}$ 934 may be a motion vector associated with the block $B(IL_T)$ 928. A motion vector $MV_{ELX}$ 936 may be a motion vector associated with the block $B(EL_T)$ 930.

The diagram 900 shows an example of a BL picture $BL_X$ 902 at time X, an IL reference picture $IL_X$ 904 at time X, and an EL picture $EL_X$ 906 at time X. A block $B(BL_X)$ 920 may be a block located within the BL picture $BL_X$ 902. A motion compensated block MC $(IL_X, MV_{ILX})$ 922 may be a block located within the IL picture $IL_X$ 904. A motion compensated block MC $(EL_X, MV_{ELX})$ 924 may be a block located within the EL picture $EL_X$ 906. A BL reference picture 914, an IL reference picture 916, and a EL reference picture 918 may be example images of the respective pictures 902, 904, and 906. A picture (e.g., or block) at time X may be encoded before a picture (e.g., or block) at time T. As such, the pictures 902, 904, 906 characterized by time X may be used as reference pictures for the EL picture 912 at time T. The pictures 902, 904, 906, 908, 910, and/or 912 may be pictures in the pixel domain.

The IL reference picture $IL_T$ 910 may be generated by upsampling the BL picture $BL_T$ 908. The block $B(IL_T)$ 928 may be generated by upsampling the block $B(BL_T)$ 926. The IL reference picture $IL_X$ 904 may be generated by upsampling the BL picture $BL_X$ 902. The motion compensated block MC $(IL_X, MV_{ILX})$ 922 may be generated by upsampling the block $B(BL_X)$ 920. As such, the IL reference picture $IL_T$ 910 and/or the block $B(IL_T)$ 928 may be referred to as an upsampled BL picture 910 and/or an upsampled BL block 928, respectively. The IL reference picture $IL_X$ 904 and/or the motion compensated block MC $(IL_X, MV_{ILX})$ 922 may be referred to as an upsampled BL picture 904 and/or an upsampled BL block 922, respectively.

The block $B(BL_T)$ 926 may be a collocated block of the IL block $B(IL_T)$ 928. If the $B(BL_T)$ 926 is encoded as an inter mode block, then an E-ILR block Enh($B(IL_T)$) may be generated using the IL block $B(IL_T)$ 928 (e.g., the IL block $B(IL_T)$ 928 may be enhanced). For example, an E-ILR block Enh($B(IL_T)$) may be generated according to Equation (3) (e.g., for uni-prediction mode):

$$Enh(B(IL_T)) = Clip(B(IL_T) + \omega(IL_x)*(MC_{ILP}(EL_X, MV_{ILx}) - MC_{ILP}(IL_X, MV_{ILx}))) \quad (3)$$

If the $B(BL_T)$ 926 is encoded as an inter mode block, then an E-ILR block Enh($B(IL_T)$) may be generated using the IL block $B(IL_T)$ 928 (e.g., the IL block $B(IL_T)$ 928 may be enhanced). For example, an E-ILR block Enh($B(IL_T)$) may be generated according to Equation (4) (e.g., for bi-prediction mode):

$$Enh(B(IL_T)) = Clip(B(IL_T) + \omega(IL_0, IL_1)*((MC_{ILP}(EL_0, MV_{IL0}) + MC_{ILP}(EL_1, MV_{IL1}))/2 - (MC_{ILP}(IL_0, MV_{IL0}) + MC_{ILP}(IL_1, MV_{IL1}))/2)) \quad (4)$$

An E-ILR block including a high frequency signal may be generated using motion compensation with the pictures ELx 906 and/or ILx 904, for example, using Equation (3) and/or Equation (4).

A weight ω may be used when generating an E-ILR block. The weight ω may be greater than or equal to zero and less than or equal to one. The weight ($IL_x$) (e.g., 0≤ω≤1) may be changed (e.g., adaptively changed) for one or more (e.g., each) reference picture. For example, the weight may be estimated using the least square method. The optimization target may be the difference between the EL block $B(EL_T)$ 930 and upsampled BL block $B(IL_T)$ 928. The observation may be the difference between the reconstructed block of EL MC($EL_X, MV_{ELX}$) 924 and the block MC($IL_X, MV_{ILX}$) 922 at time instance X. The weight may be a ratio (e.g., optimal ratio) between the target and observation estimated by minimizing the difference between target and weighted observation.

The weight ω may be estimated based on different classification methods. For example, the weight can be associated with a list, such as list0 and list1. The weight may be associated with the unique reference picture combinations from two lists. The weight may be associated with the precision of motion vectors, for example, such as integer motion vectors, half pixel motion vectors, quarter pixel motion vectors, and/or the like. The weight may be associated with the prediction mode, for example, such as uni-prediction, bi-prediction, etc. The finer classification may result in a more accurate weight and/or better enhancement quality at the cost of signaling overhead of weights. The encoder may determine when to apply the estimated weight by signaling. The determination may be made based on RD optimization, RD complexity optimization, and/or the like, for example, based on the applications. In RD complexity optimization, the encoder may decide not to apply a weight if the RD performance is not improved enough for the increased computation complexity. The interpolation filter used in motion compensation in an ILR picture may be different from that in the BL and/or the EL decoding. For example, the filter may be a shorter than a normal interpolation filter (e.g., a bilinear interpolation filter) for BL coding and/or EL coding, for example, to reduce the complexity.

A residual of the EL may be predicted using an inter-layer difference. An E-ILR block $Enh(B(IL_T))$ may be generated using the IL block $B(IL_T)$ 928 (e.g., the IL block $B(IL_T)$ 928 may be enhanced). For example, an E-ILR block $Enh(B(IL_T))$ may be generated according to Equation (5) and/or Equation (6):

$$Enh(B(IL_T))=Clip(MC_{ILP}(EL_X,MV_{ILx})+\omega(IL_x)^* (B(IL_T)-MC_{ILP}(IL_X,MV_{ILx}))) \quad (5)$$

$$Enh(B(IL_T))=Clip((MC_{ILP}(EL_0,MV_{IL0})+MC_{ILP}(EL_1, MV_{IL1}))/2+\omega(IL_0,IL_1)^*(B(IL_T)-(MC_{ILP}(IL_0, MV_{IL0})+MC_{ILP}(IL_1,MV_{IL1}))/2)) \quad (6)$$

The Equations (3) and (4) may be simplified by combining motion compensation with a differential picture. An example of the differential picture is defined by Equation (7). $IL_X$ may be an IL differential picture at time X. $I_{offset}$ may be the offset value, which may be $2^{BitDepth-1}$. For example, $I_{offset}$ is 128 for 8 bit video content.

$$ILD_X=Clip(EL_X-IL_X+I_{offset}) \quad (7)$$

One or more reference pictures may be generated, for example, to assist in the prediction of the EL picture $EL_T$ 912. For example, a normal IL reference picture may be generated by upsampling the collocated BL picture $BL_T$ 908 to generate the upsampled BL picture (or IL reference picture) $IL_T$ 910. An enhanced inter-layer reference (E-ILR) picture for the EL picture $EL_T$ 912 may be generated. For example, an E-ILR picture may include one or more blocks. The blocks may be of various sizes. For example, a block may be 64×64, 32×32, 16×16, 8×8, 4×4, rectangular, etc. The blocks of an E-ILR picture may include one or more E-ILR blocks and/or one or more normal ILR blocks (e.g., blocks generated by upsampling a collocated BL block). The E-ILR blocks may be generated using one or more of the techniques described herein (e.g., residual, differential, uni-prediction, bi-prediction, and/or the like).

An E-ILR block of an E-ILR picture may be generated using a residual block, for example, in accordance with Equations (5) and/or (6). An E-ILR block of an E-ILR picture may be generated according to one or more of the following. The E-ILR block may be used to predict the block $B(EL_T)$ 930 of the EL picture $EL_T$ 912. It may be determined whether the collocated block $B(BL_T)$ 926 is inter coded or intra coded. If it is determined that the block $B(BL_T)$ 926 is inter coded, then the motion information for the block may be determined. The motion information may include a motion information class (e.g., an index of reference picture that the motion information is associated with) and/or a motion vector (e.g., the size of the motion) of the block. A time instance for generating a residual may be determined using the motion information relating to the block $B(BL_T)$ 926. For example, the motion information (e.g., the motion vector $MV_{BLX}$ 932) of block $B(BL_T)$ 926 may be used to determine a time instance X (e.g., the reference block $B(BL_X)$ 920 and/or the BL picture $BL_X$ 902).

A BL block at time X may be subtracted from a BL block at time T to generate a residual. For example, the motion compensated block $MC(IL_X, MV_{ILX})$ 922 may be subtracted from the upsampled BL block $B(IL_T)$ 928 to generate the residual. The residual may be characterized by time T. It may be determined to use the MC block $MC(IL_X, MV_{ILX})$ 922 to generate the residual based on motion information (e.g., $MV_{ILX}$ 934) associated with the upsampled BL block $B(IL_T)$ 928.

The residual may be multiplied by a weight ω. The weight ω may be greater than or equal to zero and less than or equal to one. An offset may be added to the residual, for example, to compensate for the DC variations of a residual signal between different time instances. For example, an offset may be added to the residual in accordance with Equations (10) for uni-prediction mode, and/or (11) for bi-prediction mode. The offset may be associated with weight and/or estimated with weight. The weight and offset may be signaled as one parameter set if the weight and offset are used. The residual may be added to the EL block MC ($EL_X$, $MV_{ELX}$) 924 to generate an E-ILR block characterized by time T (e.g., $Enh(B(IL_T))$). It may be determined to use the EL block MC ($EL_X$, $MV_{ELX}$) 924 to generate the E-ILR block based on motion information (e.g., $MV_{ELX}$ 936) associated with the EL block $B(EL_T)$ 930. The E-ILR block at time T may be used to predict the EL block $B(EL_T)$ 930. For example, the E-ILR block may be used to create an E-ILR picture characterized by time T that may be used to predict the EL picture $EL_T$ 912.

An E-ILR block of an E-ILR picture may be generated using a differential block, for example, as described with reference to Equations (3) and/or (4). An E-ILR picture for the EL picture $EL_T$ 912 may be generated according to one or more of the following. The E-ILR block may be used to predict the block $B(EL_T)$ 930 of the EL picture $EL_T$ 912. It may be determined whether the collocated block $B(BL_T)$ 926 is inter coded or intra coded. If it is determined that the block $B(BL_T)$ 926 is inter coded, then the motion information for the block may be determined. The motion information may include a motion information class (e.g., where the motion comes from) and/or a motion vector (e.g., the size of the motion) of the block. A time instance for generating a differential may be determined using the motion information relating to the block $B(BL_T)$ 926. For example, the motion information (e.g., the motion vector $MV_{BLX}$ 932) of block $B(BL_T)$ 926 may be used to determine a time instance X (e.g., the reference block $B(BL_X)$ 920 and/or the BL picture $BL_X$ 902).

A BL block at time X may be subtracted by an EL block at time X to generate a differential block. For example, a motion compensated block $MC(IL_X, MV_{ILX})$ 922 may be determined using the motion information $MV_{ILX}$ 934 relating to the upsampled BL block $B(IL_T)$ 928. The motion information $MV_{ILX}$ 934 may be determined by scaling the motion information $MV_{BLX}$ 932, for example, according to the spatial ratio between the enhancement layer and the base layer. A motion compensated enhancement layer block $MC(EL_X, MV_{ELX})$ 924 may be determined using the motion information $MV_{ELX}$ 936 relating to the upsampled BL block $B(EL_T)$ 930. The motion compensated block $MC(IL_X, MV_{ILX})$ 922 may be subtracted from the motion compensated enhancement layer block $MC(EL_X, MV_{ELX})$ 924 to generate the differential block. The differential block may be characterized by time X.

The differential block may be multiplied by a weight ω. The weight ω may be greater than or equal to zero and less than or equal to one. An offset may be added to the differential block. For example, an offset may be added to the differential block in accordance with Equations (10) and/or (11). The offset may be associated with weight and/or estimated with weight. The weight and offset may be signaled as one parameter set if the weight and offset are used.

The differential block may be added to an upsampled block of a BL picture to generate an E-ILR block characterized by the time T. For example, the differential block may be added to the upsampled BL block $B(IL_T)$ 928 to generate an E-ILR block characterized by the time T (e.g., $Enh(B(IL_T))$). The E-ILR block at time T may be used to predict the EL block $B(EL_T)$ 930. For example, the E-ILR block may be used to create an E-ILR picture characterized by time T that may be used to predict the EL picture $EL_T$ 912.

Although described with reference to a BL and an EL that are characterized by spatial scalability, an E-ILR block may be generated when there are other types of scalability (e.g., SNR scalability, standard scalability, etc.) between the BL and the EL. A residual method similar to that described with reference to FIG. 9 may be performed to generate an E-ILR block if there is not spatial scalability between the BL and EL. For example, if there is not spatial scalability between the BL and EL, then a MC BL block at time X (e.g., as opposed to the MC block at time X) may be subtracted from (e.g., subtracted directly from) a BL block at time T (e.g., as opposed to the upsampled BL block at time T) to generate a residual block, for example, without a resampling process. A differential method similar to that described with reference to FIG. 9 may be performed to generate an E-ILR block if there is not spatial scalability between the BL and EL. For example, if there is not spatial scalability between the BL and EL, then a MC BL block at time X (e.g., as opposed to the MC block at time X) may be subtracted from (e.g., directly subtracted from) a MC EL block at time X to generate a differential block, and/or the differential block may be added to a BL block at time T (e.g., as opposed to the upsampled BL block at time T) to generate an E-ILR block.

Equations (3), (4) may be transformed into Equations (8) and (9), for example, using a differential picture. The number of motion compensation operations may be reduced by half (e.g., from two motion compensation operations to one motion compensation operation). An E-ILR block $Enh(B(IL_T))$ may be generated using Equation (8) and/or Equation (9):

$$Enh(B(IL_T))=Clip(B(IL_T)+\omega(IL_x)*(MC_{ILP}(ILD_X, MV_{ILx})-I_{offset})) \quad (8)$$

$$Enh(B(IL_T))=Clip(B(IL_T)+\omega(IL_0,IL_1)*((MC_{ILP}(ILD_0, MV_{IL0})+MC_{ILP}(ILD_1,MV_{IL1}))/2-I_{offset})) \quad (9)$$

Figure 10:
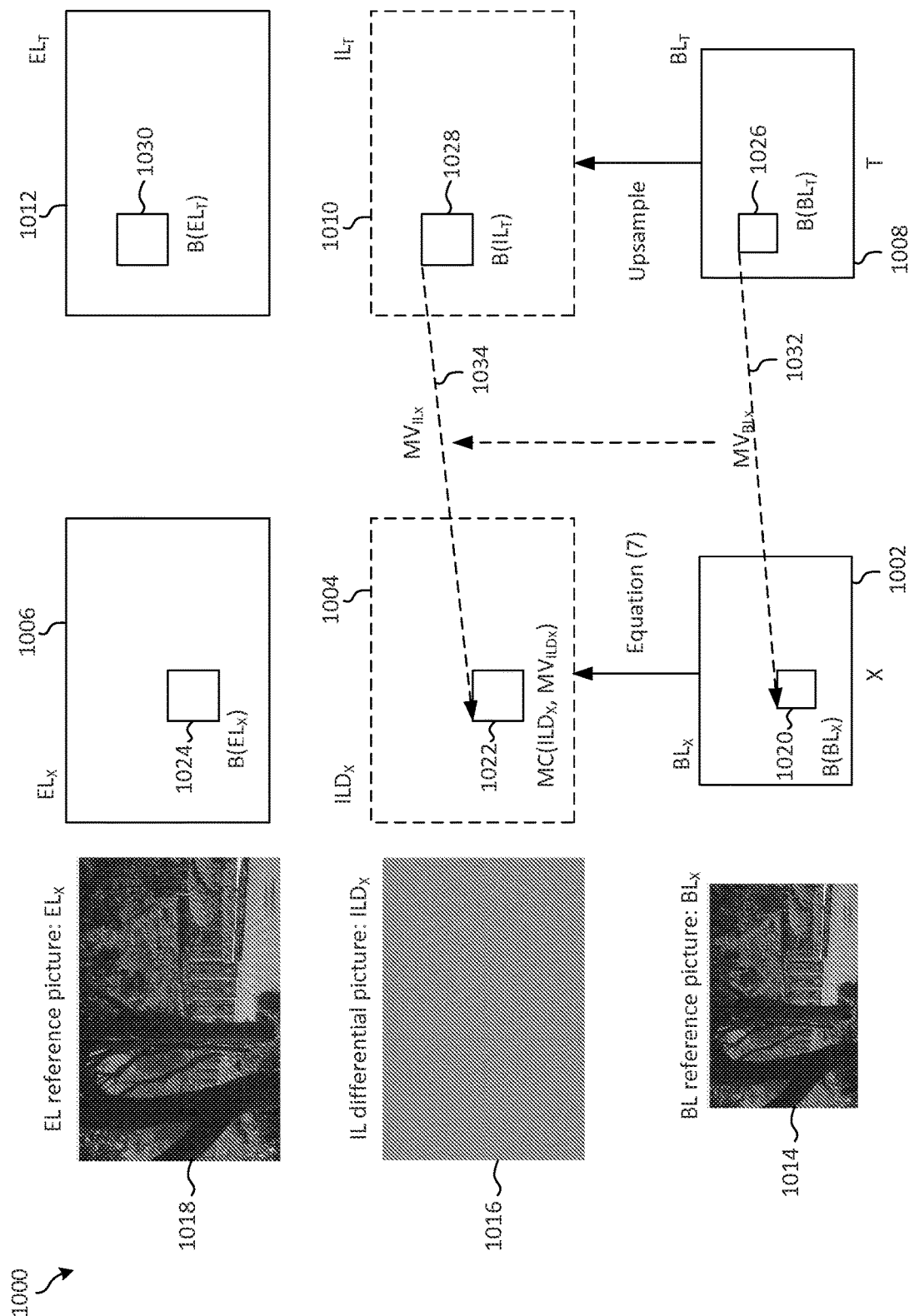
FIG. 10 is a diagram of an example of the generation of an E-ILR block using a differential picture and uni-prediction coded blocks.

FIG. 10 is a diagram of an example of the generation of an E-ILR block using a differential block and uni-prediction coded blocks. For example, the differential method described in relation to FIG. 10 may use Equations (7), (8) (e.g., for uni-prediction), and/or (9) (e.g., for bi-prediction) to generate an E-ILR block using a differential block. The diagram 1000 shows an example of a BL picture $BL_T$ 1008 at time T, an IL reference picture $IL_T$ 1010 at time T, and an EL picture $EL_T$ 1012 at time T. A block $B(BL_T)$ 1026 may be a block located within the BL picture $BL_T$ 1008. A block $B(IL_T)$ 1028 may be a block located within the IL picture $IL_T$ 1010. A block $B(EL_T)$ 1030 may be a block located within the EL picture $EL_T$ 1012. A motion vector $MV_{BLX}$ 1032 may be a motion vector associated with the block $B(BL_T)$ 1026. A motion vector $MV_{ILX}$ 1034 may be a motion vector associated with the block $B(IL_T)$ 1028.

The diagram 1000 shows an example of a BL picture $BL_X$ 1002 at time X, an IL differential picture $IDL_X$ 1004 at time X, and an EL picture $EL_X$ 1006 at time X. A block $B(BL_X)$ 1020 may be a block located within the BL picture $BL_X$ 1002. A motion compensated differential block MC $(ILD_X, MV_{ILDX})$ 1022 may be a block located within the IL differential picture $ILD_X$ 1004. An EL block $B(EL_X)$ 1024 may be a block located within the EL picture $EL_X$ 1006. The BL reference picture 1014 and the EL reference picture 1018 may be example images of the respective pictures 1002 and 1006. The IL differential picture 1016 may be an example of the IL differential picture $IDL_X$ 1004 at time X. The IL differential picture $ILD_X$ 1004 may be generated by subtracting an upsampled version of the BL picture $BL_X$ 1002 from the enhancement layer picture $EL_X$ 1006 (e.g., if the spatial resolution is not same for the BL and the EL), for example, according to Equation (7). The IL differential picture $ILD_X$ 1004 may be generated by subtracting the BL picture $BL_X$ 1002 from the enhancement layer picture $EL_X$ 1006, for example, if the spatial resolution is same for two layers. A picture (e.g., or block) at time X may be encoded before a picture (e.g., or block) at time T. As such, the pictures 1002, 1004, 1006 characterized by time X may be used as reference pictures for the EL picture 1012 at time T. In a block-level implementation, for example, an E-ILR block may be generated and picture 1004 may be used as a reference picture. In a picture level implementation, for example, picture 1004 may be used to generate an E-ILR picture.

The IL reference picture $IL_T$ 1010 may be generated by upsampling the BL picture $BL_T$ 1008. The block $B(IL_T)$ 1028 may be generated by upsampling the block $B(BL_T)$ 1026. As such, the IL reference picture $IL_T$ 1010 and/or the block $B(IL_T)$ 1028 may be referred to as an upsampled BL picture 1010 and/or an upsampled BL block 1028, respectively.

The IL differential picture 1016 is an example of a differential picture. With a differential picture, the generation of an E-ILR block and/or picture may be performed using Equations (8) and/or (9). The number of times motion compensation is performed may be reduced using the differential method described with reference to FIG. 10 as opposed to the differential method described with reference to FIG. 9 (e.g., motion compensation may be performed twice according to the differential method described with reference to FIG. 9 and once according to the differential method described with reference to FIG. 10). A filtering process may be applied, for example, because a differential picture may include a high frequency signal that may include noise. For example, denoising filtering may be applied to a differential block (e.g., MC $(ILD_X, MV_{ILDX})$ 1022) and/or picture before it is used for generation of an E-ILR block and/or picture.

One or more reference pictures may be generated, for example, to assist in the prediction of the EL picture $EL_T$ 1012. For example, a normal IL reference picture may be generated by upsampling the collocated BL picture $BL_T$ 1008 to generate the upsampled BL picture (or IL reference picture) $IL_T$ 1010. An E-ILR picture for the EL picture $EL_T$ 1012 may be generated. For example, an E-ILR picture may include one or more blocks. The blocks may be of various sizes. For example, a block may be 64×64, 32×32, 16×16, 8×8, 4×4, rectangular, etc. The blocks of an E-ILR picture may include one or more E-ILR blocks and/or one or more normal ILR blocks (e.g., blocks generated by upsampling a collocated BL block). The E-ILR blocks may be generated using one or more of the techniques described herein (e.g., residual, differential, uni-prediction, bi-prediction, and/or the like).

An E-ILR block of an E-ILR picture may be generated using a differential block, for example, as described with reference to Equations 7-9. An E-ILR picture for the EL picture $EL_T$ 1012 may be generated according to one or more of the following. The E-ILR block may be used to predict the block $B(EL_T)$ 1030 of the EL picture $EL_T$ 1012. It may be determined whether the collocated block $B(BL_T)$ 1026 is inter coded or intra coded. If it is determined that the block $B(BL_T)$ 1026 is inter coded, then the motion information for the block may be determined. The motion information may include a motion information class (e.g., an index of reference picture that the motion information is associated with) and/or a motion vector (e.g., the size of the motion) of the block. A time instance for generating a differential picture/block may be determined using the motion information relating to the block $B(BL_T)$ 1026. For example, the motion information (e.g., the motion vector $MV_{BLX}$ 1032) of block $B(BL_T)$ 1026 may be used to determine a time instance X (e.g., the reference block $B(BL_X)$ 1020 and/or the BL picture $BL_X$ 1002).

A BL block at time X may be subtracted from an EL block at time X to generate a differential block. For example, an upsampled version of the BL block $B(BL_X)$ 1020 may be subtracted from the EL block $B(EL_X)$ 1024 to generate the differential block. The differential block may be characterized by time X. It may be determined to use the upsampled version of the BL block $B(BL_X)$ 1020 to generate the differential block based on motion information (e.g., $MV_{ILX}$ 1034) associated with the IL block $B(IL_T)$ 1028 and/or motion information (e.g., $MV_{BLX}$ 1032) associated with the BL block $B(BL_T)$ 1026.

Motion compensation may be performed on the differential block to generate a motion compensated differential block $MC(ILD_X, MV_{ILDX})$ 1022. For example, motion compensation may be performed on the differential block using base layer motion information. The base layer motion information may be scaled base layer motion information. For example, the base layer motion information may be scaled based on the spatial ratio between the base layer and the enhancement layer. The base layer motion information may be the motion information $MV_{ILX}$ 1034, which may be determined by scaling the motion information $MV_{BLX}$ 1032 according to the spatial ratio between the enhancement layer and the base layer. As such, motion compensation may be performed on the differential block to generate a motion compensated differential block $MC(ILD_X, MV_{ILDX})$ 1022 using the scaled motion information $MV_{ILX}$ 1034.

The motion compensated differential block $MC(ILD_X, MV_{ILDX})$ 1022 may be multiplied by a weight ω. The weight ω may be greater than or equal to zero and less than or equal to one. An offset may be added to the motion compensated differential block $MC(ILD_X, MV_{ILDX})$ 1022. For example, an offset may be added to the motion compensated differential block $MC(ILD_X, MV_{ILDX})$ 1022 in accordance with Equations (7), (10), and/or (11). The offset $I_{offset}$ may be added to shift the dynamic range of the differential block/picture to the dynamic range of a picture where motion compensation may be used (e.g., according to Equation (7)). After motion compensation of the differential block, the $I_{offset}$ may be subtracted to restore the differential signal (e.g., as shown in Equations (10) and/or (11)). For example, the offset $O(IL_X)$ and/or $O(IL_0, IL_1)$ may be added after weighting (e.g., as shown in Equations (10) and/or (11)). The offset O(x) may be associated with weight forming a set of model parameter (W, O).

The motion compensated differential block $MC(ILD_X, MV_{ILDX})$ 1022 may be added to a BL block at time T to generate an E-ILR block characterized by the time T. For example, the motion compensated differential block $MC(ILD_X, MV_{ILDX})$ 1022 may be added to the upsampled BL block $B(IL_T)$ 1028 to generate an E-ILR block characterized by the time T (e.g., $Enh(B(IL_T))$). The E-ILR block at time T may be used to predict the EL block $B(EL_T)$ 1030. For example, the E-ILR block may be used to create an E-ILR picture characterized by time T that may be used to predict the EL picture $EL_T$ 1012.

Although described with reference to a BL and an EL that are characterized by spatial scalability, an E-ILR block may be generated when there are other types of scalability (e.g., SNR scalability, standard scalability, etc.) between the BL and the EL. A differential method similar to that described with reference to FIG. 10 may be performed to generate an E-ILR block if there is not spatial scalability between the BL and EL. For example, if there is not spatial scalability between the BL and EL, then the BL block at time X (e.g., as opposed to the upsampled BL block at time X) may be subtracted from (e.g., directly subtracted from) the EL block at time X to generate the differential block at time X, and/or the motion compensated differential block may be added to a BL block at time T (e.g., as opposed to the upsampled BL block at time T) to generate an E-ILR block. Further, motion compensation may be performed on the differential block using motion information associated with the BL block at time T (e.g., as opposed to the upsampled BL block at time T) to generate the motion compensated differential.

An ILR block (e.g., a normal ILR block and/or an E-ILR block) may be generated using bi-prediction. An E-ILR block may be generated using bi-prediction, for example, according to Equation (4), (6), and/or (9). For example, the E-ILR block may be generated for one time instance using blocks from two or more other time instances. One example is provided with reference to FIG. 11, although generation of an E-ILR block using bi-prediction may be performed in other manners (e.g., a residual method, a differential method using a single motion compensation (e.g., as described in reference to FIG. 10), a differential method using two motion compensation operations (e.g., as described in reference to FIG. 9), etc.).

Figure 11:
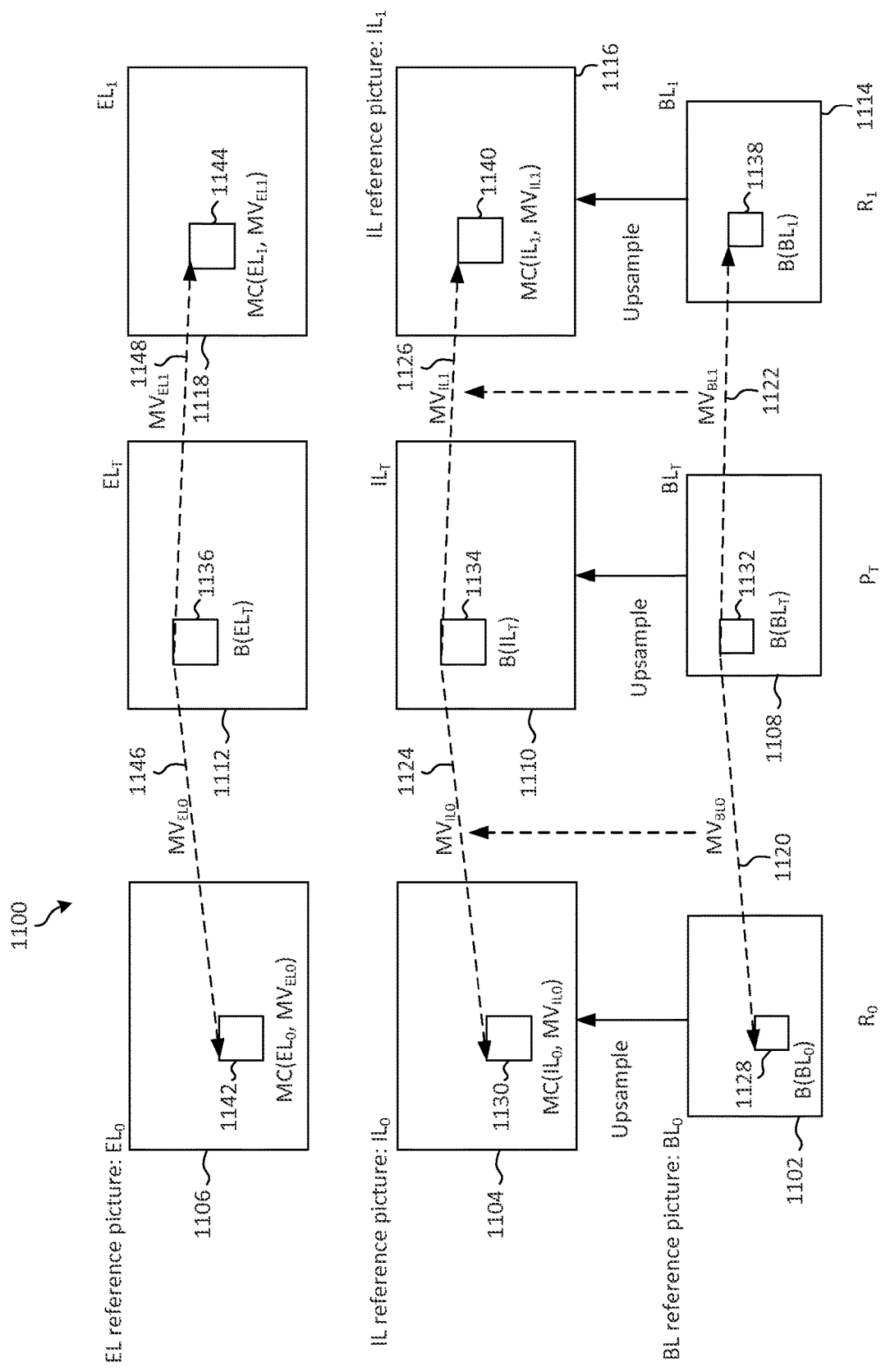
FIG. 11 is a diagram of an example of the generation of an E-ILR block using bi-prediction coded blocks.

FIG. 11 is a diagram of an example of the generation of an E-ILR block using a differential and bi-prediction coded blocks. The diagram 1100 provides an example of a BL picture $BL_0$ 1102 at time $R_0$, an IL reference picture $IL_0$ 1104 at time $R_0$, and an EL picture $EL_0$ 1106 at time $R_0$. The diagram 1100 provides an example of a BL picture $BL_T$ 1108 at time $P_T$, an IL picture $IL_T$ 1110 at time $P_T$, and an EL picture $EL_T$ 1112 at time $P_T$. The diagram 1100 provides an example of a BL picture $BL_1$ 1114 at time $R_1$, an IL reference picture $IL_1$ 1116 at time $R_1$, and an EL picture $EL_1$ 1118 at time $R_1$.

A block $B(BL_0)$ 1128 may be a block located within the BL picture $BL_0$ 1102. A motion compensated block $MC(IL_0, MV_{IL0})$ 1130 may be a block located within the IL picture $IL_0$ 1104. A motion compensated block $MC(EL_0, MV_{EL0})$ 1142 may be a block located within the EL picture $EL_0$ 1106. A block $B(BL_T)$ 1132 may be a block located within the BL picture $BL_T$ 1108. A block $B(IL_T)$ 1134 may be a block located within the IL picture $IL_T$ 1110. A block $B(EL_T)$ 1136 may be a block located within the EL picture $EL_T$ 1112. A block $B(BL_1)$ 1138 may be a block located within the BL picture $BL_1$ 1114. A motion compensated block $MC(IL_1, MV_{IL1})$ 1140 may be a block located within the IL picture $IL_1$ 1116. A motion compensated block $MC(EL_1, MV_{EL1})$ 1144 may be a block located within the EL picture $EL_0$ 1118. A picture (e.g., or block) at time $R_0$ and/or a picture (e.g., or block) at time $R_1$ may be encoded before a picture (e.g., or block) at time $P_T$. As such, the pictures 1102, 1104, 1106 characterized by time $R_0$ and/or the pictures 1114, 1116, 1118 characterized by time $R_1$ may be used as reference pictures for the EL picture $EL_T$ 1112 at time $P_T$.

The IL reference picture $IL_T$ 1110 may be generated by upsampling the BL picture $BL_T$ 1108. The block $B(IL_T)$ 1134 may be generated by upsampling the block $B(BL_T)$ 1132. The IL reference picture $IL_0$ 1104 may be generated by upsampling the BL picture $BL_0$ 1102. The motion compensated block MC $(IL_0, MV_{IL0})$ 1130 may be generated by upsampling the block $B(BL_0)$ 1128. The IL reference picture $IL_1$ 1116 may be generated by upsampling the BL picture $BL_1$ 1114. The motion compensated block MC $(IL_1, MV_{IL1})$ 1140 may be generated by upsampling the block $B(BL_1)$ 1138. As such, the IL reference picture $IL_T$ 1110 and/or the block $B(IL_T)$ 1134 may be referred to as an upsampled BL picture 1110 and/or an upsampled BL block 1134, respectively. The IL reference picture $IL_0$ 1104 and/or the motion compensated block MC $(IL_0, MV_{IL0})$ 1130 may be referred to as an upsampled BL picture 1104 and/or an upsampled BL block 1130, respectively. The IL reference picture $IL_1$ 1116 and/or the motion compensated block MC $(IL_1, MV_{IL1})$ 1140 may be referred to as an upsampled BL picture 1116 and/or an upsampled BL block 1140, respectively.

One or more reference pictures may be generated, for example, to assist in the prediction of the EL picture $EL_T$ 1112. For example, a normal IL reference picture may be generated by upsampling the collocated BL picture $BL_T$ 1108 to generate the upsampled BL picture (or IL reference picture) $IL_T$ 1110. An E-ILR picture for the EL picture $EL_T$ 1112 may be generated. For example, an E-ILR picture may include one or more blocks. The blocks may be of various sizes. For example, a block may be 64×64, 32×32, 16×16, 8×8, 4×4, rectangular, etc. The blocks of an E-ILR picture may include one or more E-ILR blocks and/or one or more normal ILR blocks (e.g., blocks generated by upsampling a collocated BL block). The E-ILR blocks may be generated using one or more of the techniques described herein (e.g., residual, differential, uni-prediction, bi-prediction, and/or the like).

E-ILR block of an E-ILR picture may be generated using a differential and bi-prediction mode. An E-ILR picture for the EL picture $EL_T$ 1112 may be generated according to one or more of the following. The E-ILR block may be used to predict the block $B(EL_T)$ 1136 of the EL picture $EL_T$ 1112. It may be determined whether the collocated block $B(BL_T)$ 1132 is inter coded or intra coded. If it is determined that the block $B(BL_T)$ 1132 is inter coded, then the motion information for the block may be determined. For example, if the block $B(BL_T)$ 1132 is bi-predicted, then the block $B(BL_T)$ 1132 may include two sets of motion information. The motion information may include a motion information class (e.g., where the motion comes from) and/or a motion vector (e.g., the size of the motion) of the block. Two time instances for generating a differential may be determined using the motion information relating to the block $B(BL_T)$ 1132. For example, the first motion information (e.g., the motion vector $MV_{BL0}$ 1120) of block $B(BL_T)$ 1132 may be used to determine a time instance $R_0$ (e.g., the reference block $B(BL_0)$ 1128 and/or the BL picture $BL_0$ 1102) and the second motion information (e.g., the motion vector $MV_{BL1}$ 1122) of block $B(BL_T)$ 1132 may be used to determine a time instance $R_1$ (e.g., the reference block $B(BL_1)$ 1138 and/or the BL picture $BL_0$ 1114).

A BL block at time $R_0$ may be added to a BL block at time $R_1$ to generate a combined BL block. For example, the combined BL block may be divided by two to generate an averaged BL block. For example, the motion compensated block $MC(IL_0, MV_{IL0})$ 1130 may be added to the motion compensated block $MC(IL_1, MV_{IL1})$ 1140 to generate the combined BL block. The combined BL block may be divided by two to generate the averaged BL block. The motion compensated block $MC(IL_0, MV_{IL0})$ 1130 may be determined using the motion information $MV_{IL0}$ 1124 associated with the upsampled BL block $B(IL_T)$ 1134. The motion compensated block $MC(IL_1, MV_{IL1})$ 1140 may be determined using the motion information $MV_{IL1}$ 1126 associated with the upsampled BL block $B(IL_T)$ 1134.

An averaged BL block may be generated using a weighted average. For example, an averaged BL block may be generated using a weighted average according to $P=(p0*w0+p1*w1)/(w0+w1)$. For example, the motion compensated block $MC(IL_0, MV_{IL0})$ 1130 may be multiplied by a first weight and the motion compensated block $MC(IL_1, MV_{IL1})$ 1140 may be multiplied by a second weight before adding the motion compensated block $MC(IL_0, MV_{IL0})$ 1130 to the motion compensated block $MC(IL_1, MV_{IL1})$ 1140 to generate the combined BL block. The first weight and the second weight may be different. The combined block may be divided by the combined first weight and second weight to generate the averaged BL block.

An EL block at time $R_0$ may be added to an EL block at time $R_1$ to generate a combined EL block. The combined EL block may be divided by two to generate an averaged EL block. For example, the motion compensated EL block MC $(EL_0, MV_{EL0})$ 1142 may be added to the motion compensated EL block MC $(EL_1, MV_{EL1})$ 1144 to generate a combined EL block. The combined EL block may be divided by two to generate an averaged EL block. The motion compensated EL block MC $(EL_0, MV_{EL0})$ 1142 may be determined using the motion information $MV_{EL0}$ 1146 associated with the EL block $B(EL_T)$ 1136. The motion compensated EL block MC $(EL_1, MV_{EL1})$ 1144 may be determined using the motion information $MV_{EL0}$ 1148 associated with the EL block $B(EL_T)$ 1136. The motion $MV_{EL0}$ 1146 and $MV_{EL1}$ 1148 may be determined from $MV_{IL0}$ and $MV_{IL1}$ respectively, for example, because IL and EL may have the same spatial resolution.

An averaged EL block may be generated using a weighted average. For example, an averaged BL block may be generated using a weighted average according to $P=(p0*w0+p1*w1)/(w0+w1)$. For example, the motion compensated EL block MC $(EL_0, MV_{EL0})$ 1142 may be multiplied by a first weight and the motion compensated EL block MC $(EL_1, MV_{EL1})$ 1144 may be multiplied by a second weight before adding the motion compensated EL block MC $(EL_0, MV_{EL0})$ 1142 to the motion compensated EL block MC $(EL_1, MV_{EL1})$ 1144 to generate the combined BL block. The first weight and the second weight may be different. The combined block may be divided by the combined first weight and second weight to generate the averaged EL block.

The averaged BL block may be subtracted from the averaged EL block to generate a differential block. The differential block may be multiplied by a weight ω. The weight ω may be greater than or equal to zero and less than or equal to one. An offset may be added to the differential block. For example, an offset may be added to the differential block in accordance with Equations (7), (10), and/or (11). The differential block may be added to a block of a BL picture characterized by time $P_T$. For example, the differential block may be added to the upsampled BL block $B(IL_T)$ 1134 to generate an E-ILR block characterized by time T (e.g., $Enh(B(IL_T))$). The E-ILR block at time $P_T$ may be used to predict the EL block B(EL$_T$) 1136. For example, the E-ILR block may be used to create an E-ILR picture characterized by time P$_T$ that may be used to predict the EL picture EL$_T$ 1112.

Although described with reference to a BL and an EL that are characterized by spatial scalability, an E-ILR block may be generated when there are other types of scalability (e.g., SNR scalability, standard scalability, etc.) between the BL and the EL. For example, if there is not spatial scalability between the BL and EL, then a BL block at time R$_0$ (e.g., as opposed to the upsampled BL block at time R$_0$) and a BL block at time R$_1$ (e.g., as opposed to the upsampled BL block at time R$_1$) may be used to generate the differential block, and/or the BL block at time Pr (e.g., as opposed to the upsampled BL block at time P$_T$) may be added to the differential block to generate the E-ILR block.

An offset may be used when generating an E-ILR block for an E-ILR picture instead of or in addition to using a weighting parameter. The offset O(x) may be used to compensate for DC errors. The weight and/or offset may include a pair of parameter. The weight and/or offset may depict a linear model. Without the offset O(x), the weight parameter may not depict a linear model. In the parameter estimation, the weight and/or offset may be jointly estimated using an optimization process, for example, such as a Least Square method. For example, the offset may be used in addition to the weight ω. The Equations (8) and (9) may be transformed to Equations (10) and (11) using the offset:

$$Enh(B(IL_T))=\text{Clip}(B(IL_T)+W(IL_x)*(MC_{ILP}(ILD_X, MV_{ILx})-I_{offset})+O(IL_x)) \quad (10)$$

$$Enh(B(IL_T))=\text{Clip}(B(IL_T)+W(IL_0,IL_1)*((MC_{ILP}(ILD_0, MV_{IL0})+MC_{ILP}(ILD_1,MV_{IL1}))/2-I_{offset})+O(IL_0, IL_1)) \quad (11)$$

O(IL$_x$) and O(IL$_0$, IL$_1$) may be the offset that may be used to compensate for the error between original picture and the enhanced ILR picture. O(IL$_x$) and O(IL$_0$, IL$_1$) may be associated with the reference picture for uni-prediction motion and/or the pair of reference pictures for bi-prediction motion.

The weight applied when generating an E-ILR block (e.g., according to Equations (8) and/or (9)) may be associated with one or more reference pictures. In HEVC scalable extension, for example, the reference pictures may appear in both lists. A lookup table may be used to map a reference picture index to the index in a weight list. There may be multiple (e.g., two) lookup tables, including, for example, lut_weight_uni for uni-prediction mode, which may map the reference list and reference index of uni-prediction to the index of weight list for uni-prediction weight_uni_list. Another table may be for bi-prediction mode and may map the reference index of list0 and/or the reference index of list1 of bi-prediction to the index of weight list for bi-prediction weight_bi_list.

weight_uni_list_idx=lut_weight_uni[list_x][ref_idx]
weight_bi_list_idx=lut_weight_uni[ref_idx0][ref_idx1]

Figure 12:
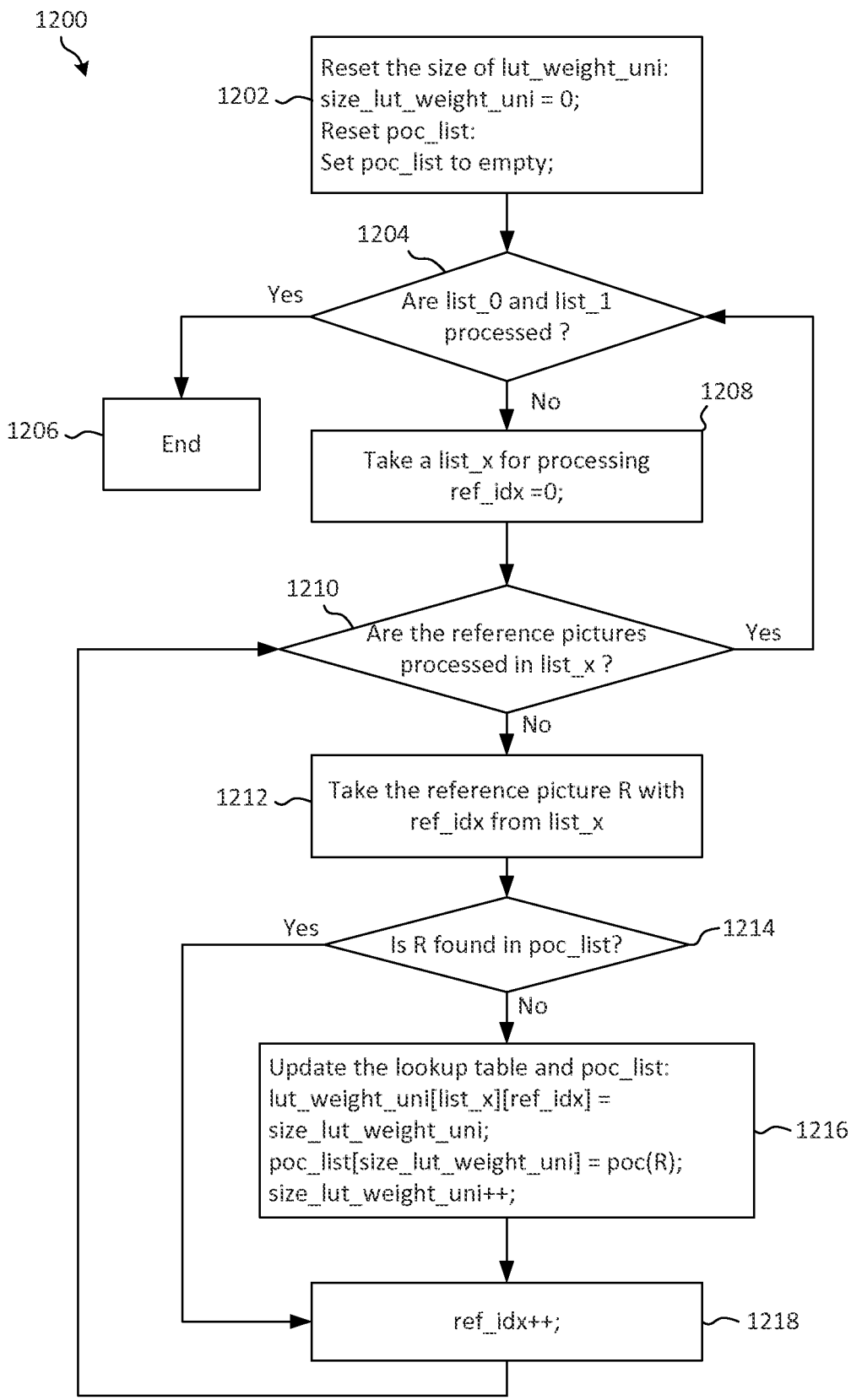
FIG. 12 is a flow chart of an example of a setup for a lookup table mapping reference index to the index in the weight list for uni-prediction mode.
Figure 13:
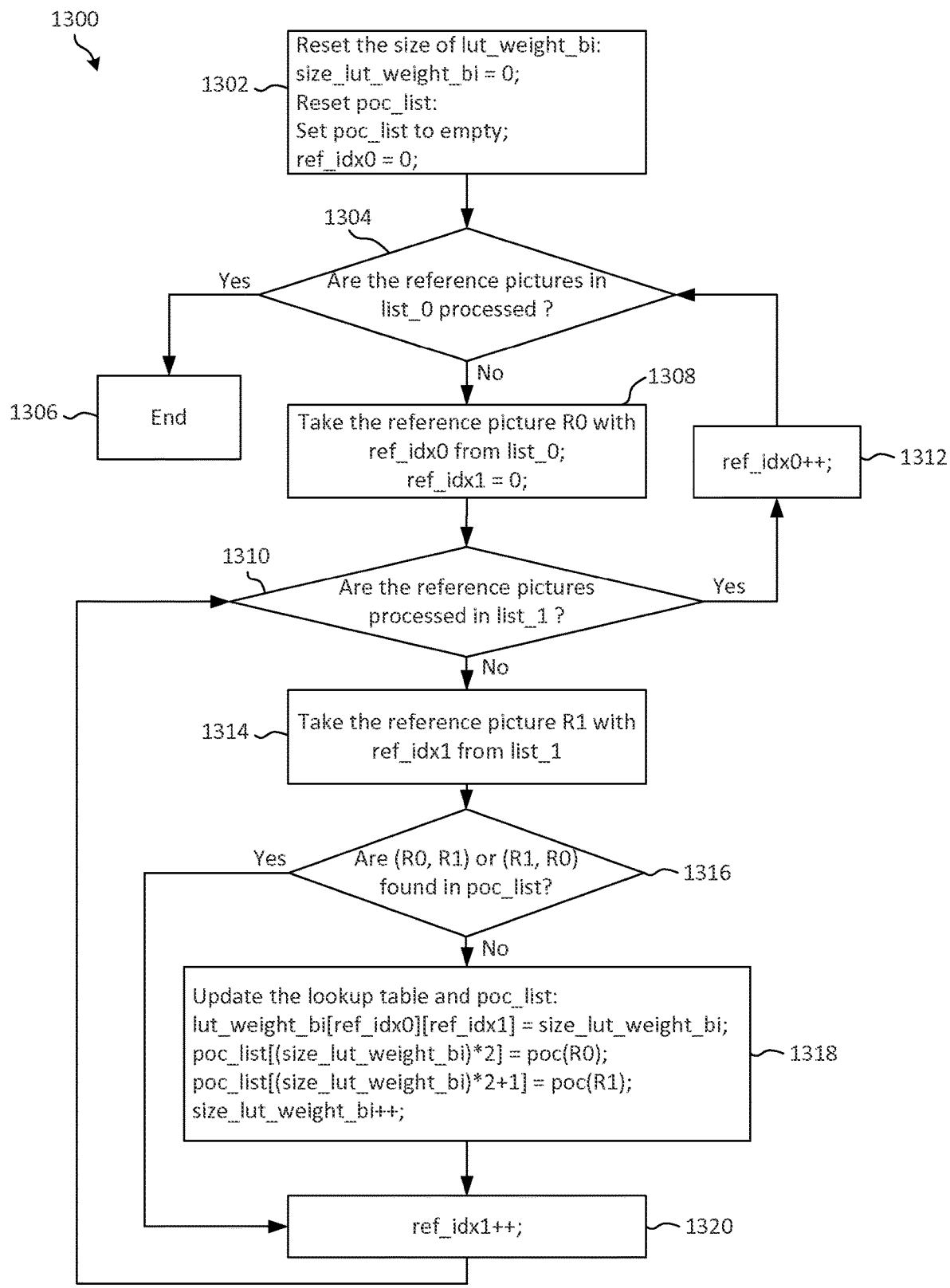
FIG. 13 is a flow chart of an example of a setup for a lookup table mapping reference index to the index in the weight list for bi-prediction mode.

FIG. 12 is a flow chart of an example of a setup for a lookup table mapping reference index to the index in the weight list for uni-prediction mode. FIG. 13 is a flow chart of an example of a setup for a lookup table mapping reference index to the index in the weight list for bi-prediction mode. For an entry (e.g., each entry) in a weight list for uni-prediction and/or for bi-prediction, the least square method may be used to estimate the weight based on one or more (e.g., each) of the blocks having the same index in the weight list. The block of the original EL picture may be used as the optimization target of Equations (8) and (9), which means the Enh(B(IL$_T$)) in (8) (9) may be equal to the collocated block of original EL picture in the parameter estimation.

Weight parameter signaling may be associated with a reference picture. There may be two or more lookup tables for the weight mapping. A table may be for uni-prediction mode usage, for example, such as Equation (3), (5), (8), and/or (10). A table may be for bi-prediction mode usage, for example, such as Equation (4), (6), (9), and/or (11). For uni-prediction mode, the weight may be associated with a reference picture identified by a picture order count (POC). For bi-prediction mode, the weight may be associated with a reference picture pair. In the reference pair, one reference picture may be from list0 and the other reference picture may be from list1. For example, the pair of reference pictures (r0(POC0), r1(POC1)) (e.g., where the first entry is from list0, and the second entry is from list1) may be treated the same as (r1(POC1), r0(POC0)) if r0 and r1 are in both lists. There may be the same reference picture occurring in two or more lists (e.g., list0 and list1). Therefore, a list of POC may be used to store the POC of those reference pictures already processed to remove replicated reference pictures. The weight may be associated with a reference picture using the lookup table.

FIG. 12 may be used to setup uni-prediction mapping. The procedure 1200 may include one or more of the following. The procedure 1200 may begin at 1202 where the size of lut_weight_uni may be reset, size_lut_weight_uni may equal zero, the poc_list may be reset, and/or the poc_list may be set to empty. At 1204 it may be determined if list_0 and list_1 are processed. If so, then the procedure 1200 may end at 1206. If not, then a list, list_x (e.g., list_0 or list_1), may be selected to process with the ref_idx equal to zero at 1208. For example, list_0 may be selected a first time the procedure enters 1208 and list_1 may be selected a second time the procedure enters 1208. At 1210 it may be determined whether the reference pictures in list_x have been processed. If so, then the procedure may return to 1204. For example, if all of the reference pictures in list_0 have been processed, then the procedure 1200 may return to 1204, for example, to check if all of the reference picture in list_1 have also been processed. If not, then the procedure 1200 may continue to 1210. At 1210 the reference picture R with ref_idx may be selected from list_x. At 1212 it may be determined whether the reference picture R is in the poc_list. If so, then the ref_idx may be increased, for example by one, at 1218 and the procedure 1200 may return to 1210. If not, then the lookup table and poc_list may be updated accordingly at 1216. For example, lut_weight_uni[list_x][ref_idx] may be set to equal size_lut_weight_uni, poc_list[size_lut_weight_uni] may be set to equal poc(R), and/or the size_lut_weight_uni may be increased, for example by one. After 1216, the procedure 1200 may continue to 1218 and the ref_idx may be increased, for example by one. After 1218, the procedure 1200 may return to 1210. The procedure 1200 may continue the loop 1210-1218 until all of the reference pictures in the list_x are processed.

FIG. 13 may be used to setup bi-prediction mapping. The procedure 1300 may include one or more of the following. The procedure 1300 may begin at 1302 where the size of lut_weight_bi may be reset, size_lut_weight_bi may equal zero, the poc_list may be reset, the poc_list may be set to empty, and/or the ref_idx0 may be equal to zero. At 1304 it may be determined if list_0 are processed. If so, then the procedure 1300 may end at 1306. If not, then at 1308 the reference picture R0 with ref_idx0 may be selected from list_0 and/or the ref_idx1 may equal one. At 1310 it may be determined whether the reference pictures in list_1 are processed. If so, then the ref_idx0 may be increased, for example by one, at 1312, and the procedure may return to 1304. If not, then the reference picture R1 with ref_idx1 may be selected from list_1 at 1314. At 1316 it may be determined whether (R0, R1) or (R1, R0) are in the poc_list. If so, then the ref_idx1 may be increased, for example by one, at 1320, and the procedure 1300 may return to 1310. If not, then the lookup table and poc_list may be updated accordingly at 1318. For example, lut_weight_bi [ref_idx0][ref_idx1] may be set to equal size_lut_weight_bi, poc_list [(size_lut_weight_bi)*2] may be set to equal poc(R0), the poc_list[(size_lut_weight_bi)*2+1] may be set to equal poc (R1), and/or the size_lut_weight_bi may be increased, for example by one. After 1318, the procedure 1300 may continue to 1320 and the ref_idx1 may be increased, for example by one. After 1320, the procedure 1300 may return to 1310. The procedure 1300 may continue the loop 1310-1320 until all of the reference pictures in the list_1 are processed.

Figure 14:
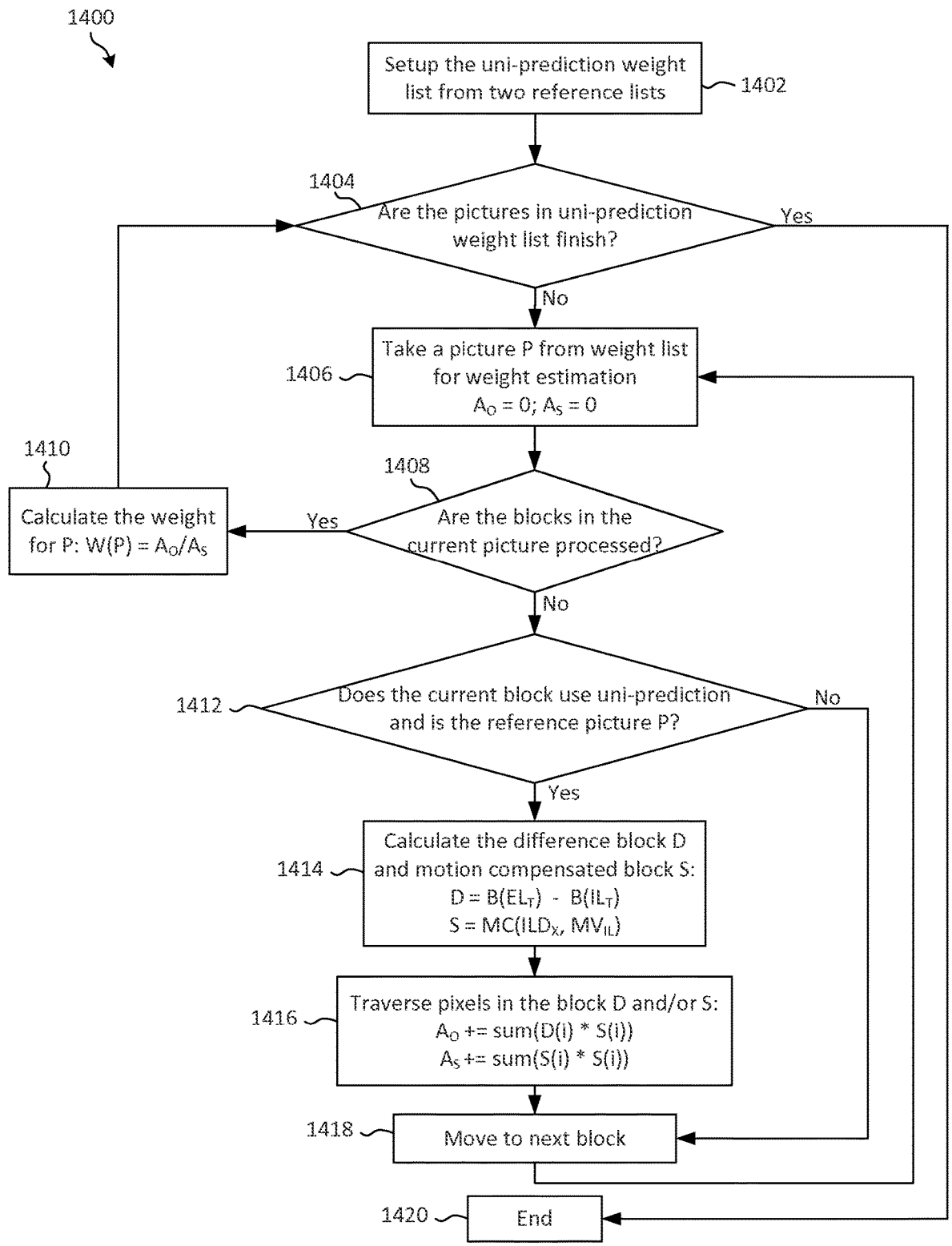
FIG. 14 is a flow chart of an example of calculating weight estimation for uni-prediction mode.
Figure 15:
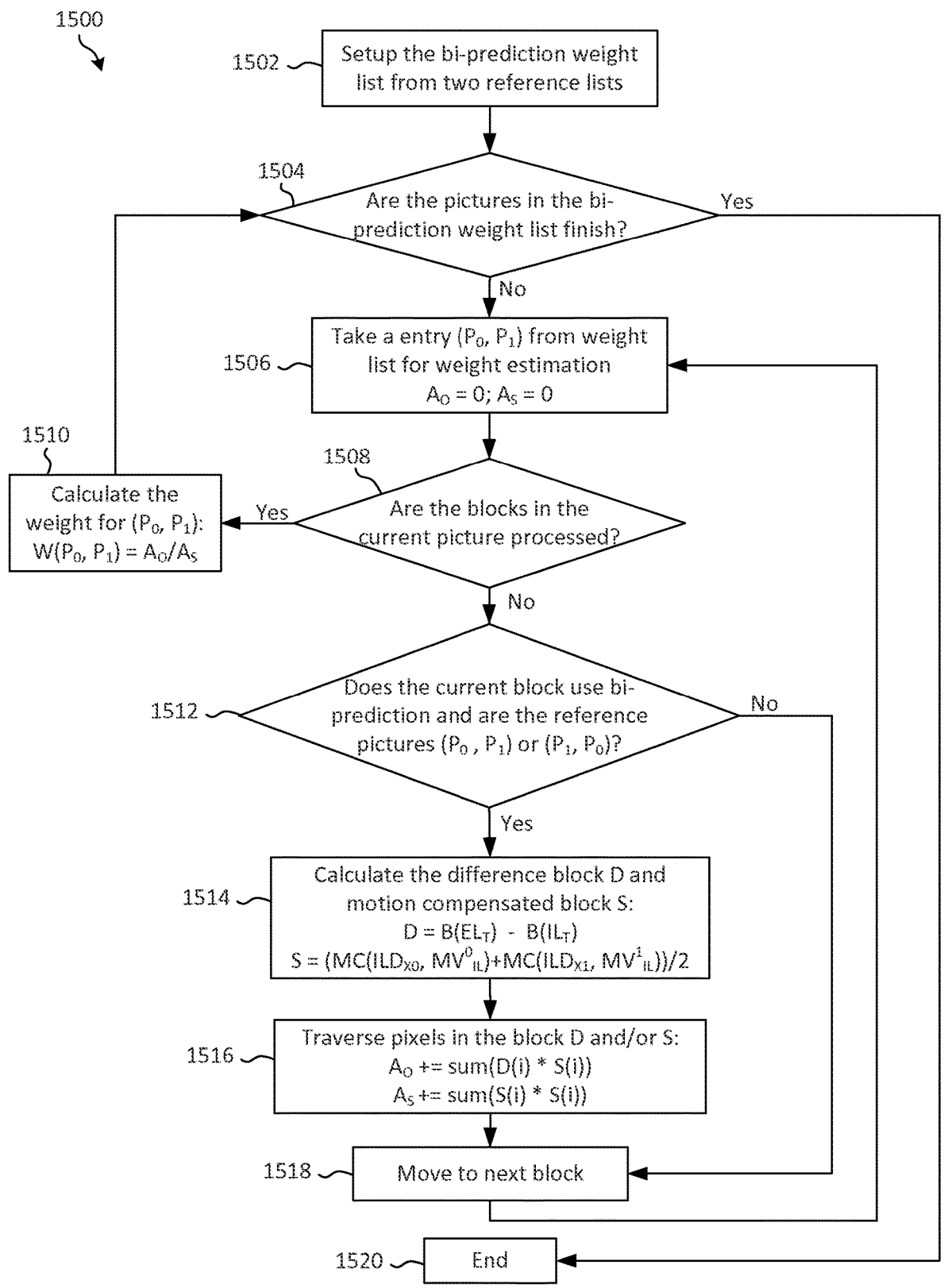
FIG. 15 is a flow chart of an example of calculating weight estimation for bi-prediction mode.

Given target signal T and observation signal O, the solution with Least Square for the optimal weight maybe equal to Cor(T, O)/Cor(O), where Cor (T, O) may be correlation between T and O, and Cor(O) may be auto-correlation of O. FIG. 14 is a flow chart of an example of calculating weight estimation for uni-prediction mode with Least Square method. In FIG. 14, uni-prediction mode coded blocks having the same weight may be traversed to collect the cross correlation and auto correlation for weight estimation. FIG. 15 is a flow chart of an example of calculating weight estimation for bi-prediction mode with Least Square. In FIG. 15, bi-prediction mode coded blocks having the same weight may be traversed to collect the cross correlation and auto correlation for weight estimation.

The procedure 1400 may include one or more of the following. The procedure 1400 may begin at 1402 where a uni-prediction weight list may be setup from two reference pictures lists. At 1404 it is determined whether pictures in the uni-prediction weight list are complete. If so, then the procedure 1400 may end at 1420. If not, then at 1406 a picture P may be selected from the weight list for weight estimation, AO may be set to zero, and/or AS may be set to zero. At 1408, it may be determined whether the block(s) in the current picture are processed. If so, then at 1410 the weight for picture P may be calculated, for example according to $W(P)=A_O/A_S$, and the procedure 1400 may return to 1404. If not, then at 1412 it may be determined whether the current block uses uni-prediction and whether the reference picture is P. Is not, then the procedure 1400 may move to the next block at 1418 and then return to 1406. If so, then at 1414 the difference block D and motion compensated block S may be calculated, for example, according to $D=B(EL_T)-B(IL_T)$ and/or $S=MC(ILD_X, MV_{IL})$. At 1416, the pixels' correlation (D(i)*S(i)) between D and S, and auto-correlation of S (S(i)*S(i)) within a block may be accumulated to $A_O$ and $A_S$, for example, according to $A_O+=\text{sum}(D(i)*S(i))$ and/or $A_S+=\text{sum}(S(i)*S(i))$. At 1418, the procedure 1400 may move to the next block and then return to 1406.

The procedure 1500 may include one or more of the following. The procedure 1500 may begin at 1502 where a bi-prediction weight list may be setup from two reference pictures lists. At 1504 it is determined whether pictures in the bi-prediction weight list are complete. If so, then the procedure 1500 may end at 1520. If not, then at 1506 an entry ($P_0$, $P_1$) may be selected from the weight list for weight estimation, AO may be set to zero, and/or AS may be set to zero. At 1508, it may be determined whether the block(s) in the current picture are processed. If so, then at 1510 the weight for ($P_0$, $P_1$) may be calculated, for example according to $W(P_0, P_1)=A_O/A_S$, and the procedure 1500 may return to 1504. If not, then at 1512 it may be determined whether the current block uses bi-prediction and whether the reference pictures are ($P_0$, $P_1$) or ($P_1$, $P_0$). Is not, then the procedure 1500 may move to the next block at 1518 and then return to 1506. If so, then at 1514 the difference block D and motion compensated block S may be calculated, for example, according to $D=B(EL_T)-B(IL_T)$ and/or $S=(MC(ILD_{X0}, MV^0{}_{IL})+MC(ILD_{X1}, MV^1{}_{IL}))/2$. At 1516, $A_O+=\text{sum}(D(i)*S(i))$ and/or $A_S+=\text{sum}(S(i)*S(i))$. At 1518, the procedure 1500 may move to the next block and then return to 1506.

The encoder may signal the weight and/or offset information of a picture (e.g., each picture) to the decoder, for example, for ILP enhancement processing. The weight and/or offset for the luma component and the chroma component may be different. The weight and/or offset for the luma component and the chroma component may be signaled, for example, separately. The weight for chroma may be set to 1 and/or the offset for chroma may be set to 0, for example, to reduce the complexity on the decoder side. The weight and/or offset may be coded in a fixed point. An example of signaling for the weight and offset parameters may be provided in Table 3.

TABLE 3

Signal enh_ILR_enabled_flag;
If (enh_ILR_enabled_flag)
{
  Signal num_of_weight_uni;
  for ( n = 0; n < num_of_weight_uni; n++ )
  {
    Signal the n-th weight for uni-prediction mode;
    Signal the n-th offset for uni-prediction mode
  }
  Signal num_of_weight_bi;
  for ( n = 0; n < num_of_weight_bi; n++ )
  {
    Signal the n-th weight for bi-prediction mode;
    Signal the n-th offset for bi-prediction mode;
  }
}

FIG. 16 is a diagram of an example of region-based weight for ILR enhancement. As illustrated in FIG. 16, the weight and/or offset may be region (e.g., block) based. The diagram 1600 illustrates an example of how the weight may be assigned to more than one region of a picture. A picture may be partitioned into multiple regions in different ways. For example, the picture may be partitioned evenly, partitioned with objects, partitioned with motion, etc. FIG. 16 shows an example of even partition. A region (e.g., each region) may have its own weight and/or offset. For example, a block (e.g., each block) of an E-ILR picture may have its own weight and/or offset. Uni-prediction and/or bi-prediction blocks may share a weight and/or an offset in the same region, for example, in order to reduce the overhead of weight and offset coding. The predictive coding may be applied to encode the region based weight and/or offset information. The weight and/or offset information may be conveyed in the NAL of slice, the NAL of Adaptation Parameter Set (APS) in HEVC, and/or the like.

The motion information used in inter-layer reference picture enhancement may be from inter-layer motion which may be from motion field mapping process and/or may be derived (e.g., directly derived) from BL compressed and/or uncompressed motion information. The block size for motion compensation in the ILR enhancement process may not be 16×16 block-size aligned, for example, if ILR enhancement derives motion from the BL. The uncompressed motion may provide motion information (e.g., more accurate motion information) as compared to compressed motion. A multi-stage motion compression method may be provided to improve EL coding. This method may be applied for ILR enhancement. The block size of uncompressed motion may be 4×4, for example. The block size of the compressed motion may be 16×16, for example. The BL may provide an 8×8 sized motion for ILR enhancement. The 8×8 sized motion may provide memory savings as compared to 4×4 sized uncompressed motion and/or may be more accurate as compared to the 16×16 sized compressed motion. The 8×8 sized motion may be compressed to get 16×16 motion, for example, for the encoding of the BL's future pictures.

The BL motion in the DPB may be compressed, for example, in order to save the memory size. This compressed BL motion may make inter-layer motion in a coarse granularity. The scaling of BL motion may lose the precision if the resolution of two layers is different. For example, the BL motion may be scaled up by 2× for 2× spatial scalability. If the original BL motion is ¼-pel precision, the motion precision may be ½-pel precision. Improving the inter-layer motion accuracy used in Equations (8) and (9) may improve ILP.

Motion refinement may apply mapped motion as the center of refinement and search one or more of its neighbors (e.g., nearest neighbors). The motion may be refined to receive delta motion, for example, using Equation (12):

$$\operatorname*{argMin}_{dmv}(Dist(B(IL_T), MC_{ILP}(IL_X, MV_{IL_X} + dmv)) \quad (12)$$

$MV_{IL_X}$ may be the motion derived from BL motion. Distortion may be evaluated using a sum of square error (SSE), a sum of absolute transform difference (SATD), and/or the like. If the collocated block is intra coded at the BL, then MV IL, may be unavailable. The motion may be derived from the motion of one or more spatial neighboring blocks. Minimal distortion may be determined, for example, using Equation (13). The enhancement layer temporal motion may be determined using scaling according to the temporal distance.

$$\operatorname*{argMin}_{MV_i}(Dist(B(IL_T), MC_{ILP}(IL_X, MV_i + dmv)), \quad (13)$$

$i \in \{neighboring\_blocks\}$

The motion derived from the BL may be efficient for inter-layer reference picture enhancement. The motion at the BL may be determined by a BL encoder using a rate-distortion cost, which may consider the rate overhead. The BL encoder may consider rate in the ILR enhancement process. The motion information may be derived from the BL. For the bi-prediction mode, the BL encoder may provide two sets of motion information, for example, list0 and list1. The ILR enhancement may determine to use of list0, list1, or both. The determination may be based on the distortion. The distortion for motion of list0 and/or list1 may be determined, for example, using Equations (14) (15), respectively. Equation 16 may be used for bi-prediction using the motion of list0 and list1. An encoder and/or decoder may determine to use the list characterized by minimal distortion for ILR enhancement.

$$Dist_{list0}=Dist(B(IL_T),MC_{ILP}(IL_{ref\_idx(list0)},MV_{list0})) \quad (14)$$

$$Dist_{list1}=Dist(B(IL_T),MC_{ILP}(IL_{ref\_idx(list1)},MV_{list1})) \quad (15)$$

$$Dist_{list0,list1}=Dist(B(IL_T),MC_{ILP}(IL_{ref\_list(list0)}, MV_{list0})+MC_{ILP}(IL_{ref\_list(list1)},MV_{list1}))/2) \quad (16)$$

The motion refinement and/or selection process may be explicit or implicit. The explicit motion refinement and/or selection may be carried out at an encoder, and the encoder may signal refinement and/or selection information to a decoder. By signaling the refinement and/or selection information, decoding complexity may be reduced by increasing the overhead. In the implicit mode, the encoder and the decoder may perform refinement and/or selection. There may be no need for the encoder to signal the motion information to decoder. By doing so, the overhead bits may be saved, for example, by increasing the decoding complexity.

One or more blocks of an E-ILR picture may be generated using a differential based method (e.g., as described with reference to Equations 3, 4, 7, 8, 9, and 10), a residual based method (e.g., as described with reference to Equations 5, 6), a normal ILR block generation method (e.g., upsampling a collocated BL block), a uni-prediction based method, a bi-prediction based method, another E-ILR block generation method, and/or a combination. The enhancement method may be signed for a region (e.g., each region) explicitly or implicitly, for example, if multiple enhancement methods are used. The mode may be decided according to one or more local characteristics, such as motion (e.g., large motion, small motion, zero motion), texture (e.g., continuous tone, discontinuous tone, number of colors), edge strength (e.g., strong, medium, weak), and/or the like. Blocks of an E-ILR picture may have different characteristics, for example, based on the generation method used. An E-ILR block may be characterized by enhanced and/or increased high frequency information, compensated low frequency energy loss from base layer compression, and/or mitigated compression artifacts (e.g., ringing, blocking) in base layer encoding. The E-ILR block generation methods (e.g., differential based, residual based, uni-prediction based, bi-prediction based, etc.) may be combined to generate an E-ILR picture. If the E-ILR block generation methods are combined together, the compression efficiency may be improved. The E-ILR block generation methods used by the encoder for encoding of a current picture may be signaled (e.g., explicitly signaled), for example, to reduce the decoding complexity. A decoder may apply the E-ILR block generation method(s) signaled by the encoder, for example, instead of trying each of the E-ILR block generation method(s). A decoder may derive the E-ILR block generation method online according to the local characteristics of each block, for example, if the generation method is signaled implicitly.

Figure 17:
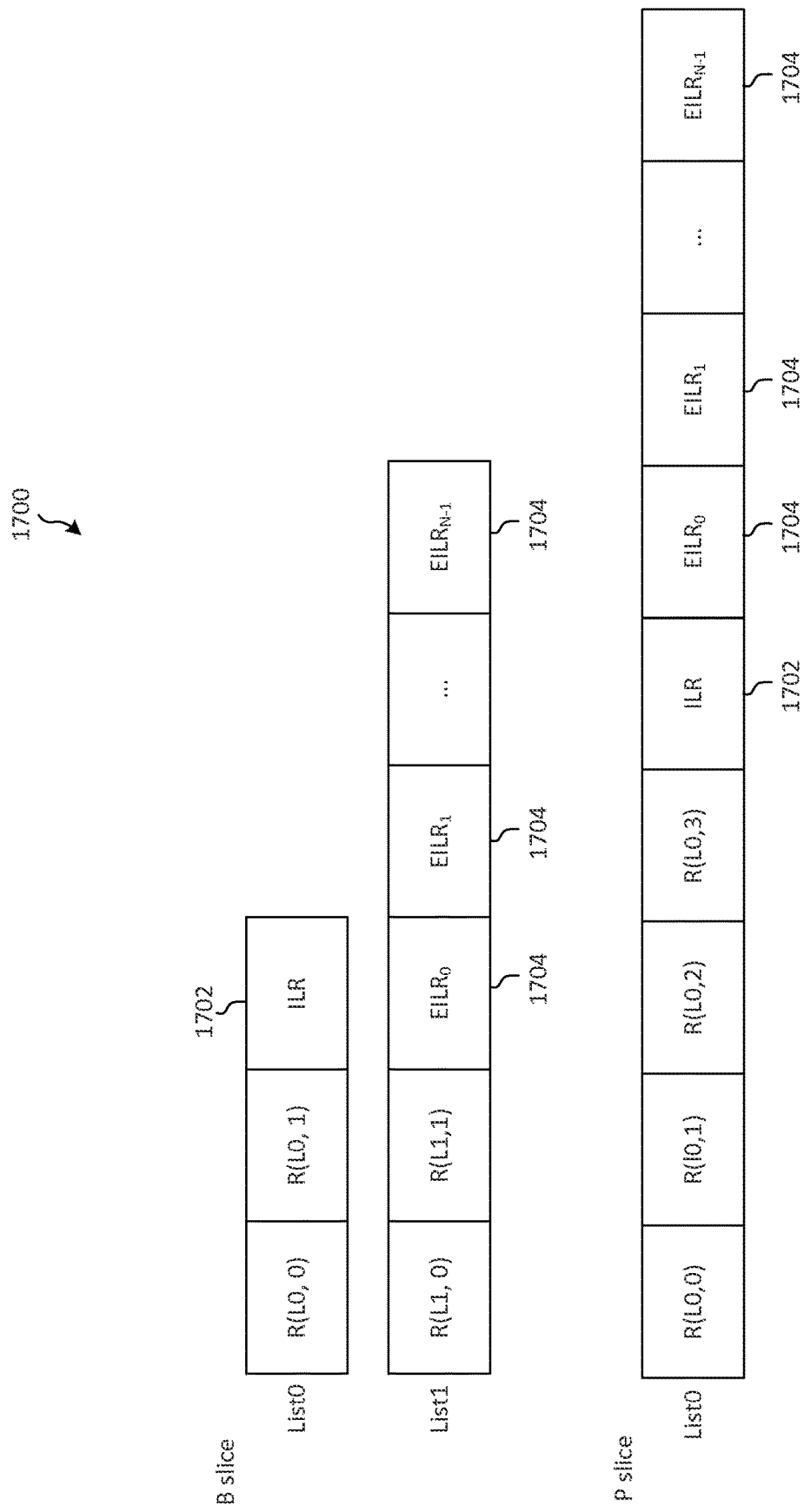
FIG. 17 is a diagram of an example placement of enhanced ILR pictures in a reference picture list.

Two or more E-ILR block generation methods may be combined to generate blocks of an E-ILR picture, for example, by increasing the size of reference picture list and inserting the E-ILR picture in the reference picture list. The E-ILR picture may be inserted in list0, list1, or both. FIG. 17 is a diagram of an example placement of E-ILR pictures into a reference picture list(s). In the diagram 1700, one or more ILR pictures 1702 may be placed in list0 of a B slice and one or more E-ILR pictures may be placed in list1 of the B slice.

In a P slice, one or more E-ILR pictures 1704 may be placed after one or more ILR pictures 1702 in the list0. E-ILR block generation methods may be combined to generate an E-ILR picture using, for example, a block-based combination (e.g., explicit combination). A block (e.g., each block) of an E-ILR picture may be generated using a different E-ILR block generation method. The encoder and the decoder may generate an E-ILR picture and/or insert the E-ILR picture in a reference picture list. The encoder may determine the E-ILR block generation method used for a block (e.g., each block) of the E-ILR picture. For example, the E-ILR block generation method may be selected based on rate-distortion optimization criteria. The encoder may signal the block's generation method to the decoder. The information may be embedded in the NAL unit used to convey inter-layer processing parameter sets, for example, such as Adaptation Parameter Sets (APS). Variable block size based coding (e.g., quad-tree based coding) may be used to encode the E-ILR block generation method information. The E-ILR block generation method information of a block (e.g., each block) may be encoded with run-length coding.

Figure 18:
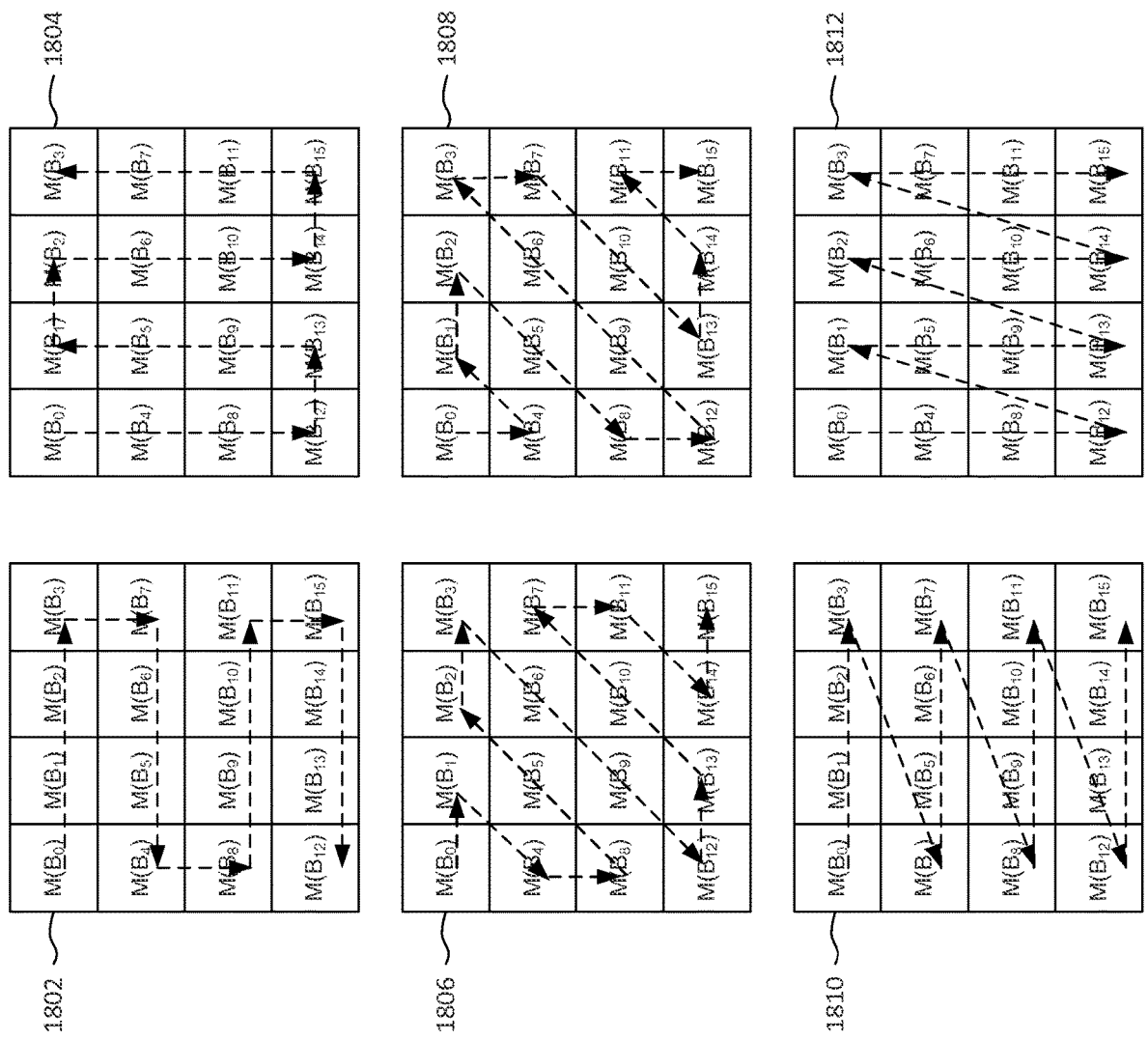
FIG. 18 is a diagram of an example of scan patterns for block mode encoding.

FIG. 18 is a diagram of an example of different scan patterns for run-length coding. For example, scan patterns for run-length coding may include horizontal 1802, vertical 1804, horizontal zigzag 1806, vertical zigzag 1808, horizontal raster 1810, vertical raster 1812, and/or the like. The 2D data map may be converted to a 1D map, for example, for encoding with different scan patterns. Run may be referred to as duplicating times of the data. One or more (e.g., two) types of runs for the run-length coding of a 2D map may be provided, for example, to more efficiently compress information. A run may be derived by comparing encoding data with immediate neighbors in the converted 1D order. The run may be used in conventional run-length coding. A run may be derived by comparing data with spatial neighbors.

Figure 19:
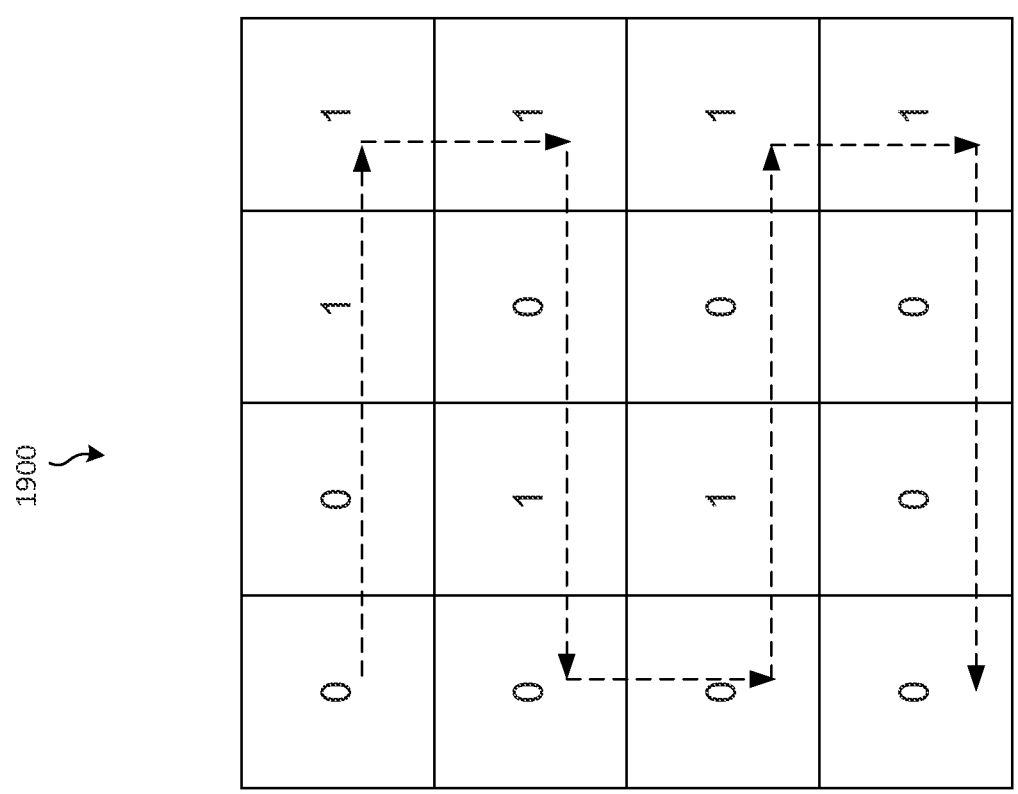
FIG. 19 is a diagram of an example of a 2D map coded with horizontal scan.

FIG. 19 is a diagram of an example of a 2D map 1900 encoded with a horizontal scan. A symbol to be encoded after scanning may be represented as one or more parameters (e.g., three parameters, including, for example, Run, Type, and/or Value). Run may refer to the number of duplicating times. For example, Run may refer to the distance traveled without changing the value. Type may refer to the type of the Run. Value may refer to the data immediate after the duplicated values. Direction may refer to the direction of travel. As illustrated in FIG. 19, H may indicate that the run may be derived in the horizontal scanning order. T may indicate that the run is derived from its top neighbor. For a binary map, the Value may not be coded, as it may be derived from previous data. The compression ratio may vary with different scanning pattern because of different distribution of data. The encoder may decide the scan pattern for a map (e.g., each map) and/or may signal the scan pattern to the decoder.

Block-based combination (e.g., implicit combination) may be provided. An encoder and/or decoder may generate an E-ILR picture and insert the E-ILR picture in a reference picture list. The encoder and/or decoder may apply a derivation process (e.g., the same derivation process) to determine the block's generation method information based on one or more characteristics, for example, instead of exchanging the generation method information of a block (e.g., explicitly). For example, a block may be classified into one or more types based on one or more local image statistical features, which for example may include texture (e.g., if the block is flat or if the block is an edge block). The E-ILR block generation method may be applied based on the block type.

Figure 20A:
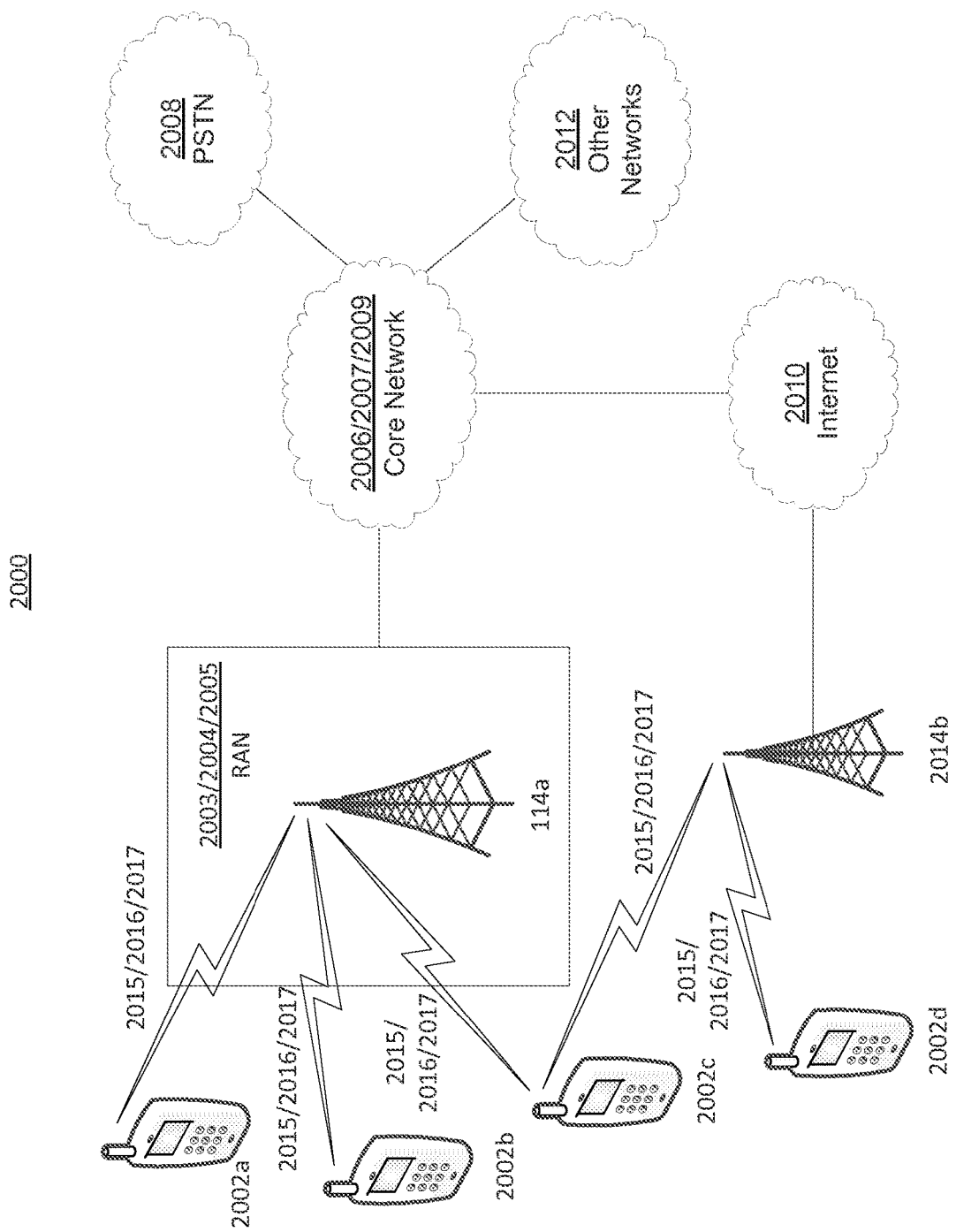
FIG. 20A is a system diagram of an example communications system in which one or more disclosed embodiments may be implemented.

FIG. 20A is a diagram of an example communications system 2000 in which one or more disclosed embodiments may be implemented. The communications system 2000 may be a multiple access system that provides content, such as voice, data, video, messaging, broadcast, etc., to multiple wireless users. The communications system 2000 may enable multiple wireless users to access such content through the sharing of system resources, including wireless bandwidth. For example, the communications systems 2000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 20A, the communications system 2000 may include wireless transmit/receive units (WTRUs) 2002a, 2002b. 2002c, and/or 2002d (which generally or collectively may be referred to as WTRU 2002), a radio access network (RAN) 2003/2004/2005, a core network 2006/2007/2009, a public switched telephone network (PSTN) 2008, the Internet 2010, and other networks 2012, though it will be appreciated that the disclosed embodiments contemplate any number of WTRUs, base stations, networks, and/or network elements. Each of the WTRUs 2002a, 2002b, 2002c, 2002d may be any type of device configured to operate and/or communicate in a wireless environment. By way of example, the WTRUs 2002a, 2002b, 2002c, 2002d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 2000 may also include a base station 2014a and a base station 2014b. Each of the base stations 2014a. 2014b may be any type of device configured to wirelessly interface with at least one of the WTRUs 2002a, 2002b, 2002c, 2002d to facilitate access to one or more communication networks, such as the core network 2006/2007/2009, the Internet 2010, and/or the networks 2012. By way of example, the base stations 2014a, 2014b may be a base transceiver station (BTS), a Node-B, an eNode B, a Home Node B, a Home eNode B, a site controller, an access point (AP), a wireless router, and the like. While the base stations 2014a, 2014b are each depicted as a single element, it will be appreciated that the base stations 2014a, 2014b may include any number of interconnected base stations and/or network elements.

The base station 2014a may be part of the RAN 2003/2004/2005, which may also include other base stations and/or network elements (not shown), such as a base station controller (BSC), a radio network controller (RNC), relay nodes, etc. The base station 2014a and/or the base station 2014b may be configured to transmit and/or receive wireless signals within a particular geographic region, which may be referred to as a cell (not shown). The cell may further be divided into cell sectors. For example, the cell associated with the base station 2014a may be divided into three sectors. Thus, in one embodiment, the base station 2014a may include three transceivers, e.g., one for each sector of the cell. In an embodiment, the base station 2014a may employ multiple-input multiple output (MIMO) technology and, therefore, may utilize multiple transceivers for each sector of the cell.

The base stations 2014a, 2014b may communicate with one or more of the WTRUs 2002a, 2002b, 2002c, 2002d over an air interface 2015/2016/2017, which may be any suitable wireless communication link (e.g., radio frequency (RF), microwave, infrared (IR), ultraviolet (UV), visible light, etc.). The air interface 2015/2016/2017 may be established using any suitable radio access technology (RAT).

More specifically, as noted above, the communications system 2000 may be a multiple access system and may employ one or more channel access schemes, such as CDMA, TDMA, FDMA, OFDMA, SC-FDMA, and the like. For example, the base station 2014a in the RAN 2003/2004/2005 and the WTRUs 2002a, 2002b, 2002c may implement a radio technology such as Universal Mobile Telecommunications System (UMTS) Terrestrial Radio Access (UTRA), which may establish the air interface 2015/2016/2017 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 2014a and the WTRUs 2002a, 2002b, 2002c may implement a radio technology such as Evolved UMTS Terrestrial Radio Access (E-UTRA), which may establish the air interface 2015/2016/2017 using Long Term Evolution (LTE) and/or LTE-Advanced (LTE-A).

In an embodiment, the base station 2014a and the WTRUs 2002a, 2002b, 2002c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000). Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 2014b in FIG. 20A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 2014b and the WTRUs 2002c, 2002d may implement a radio technology such as IEEE 802.11 to establish a wireless local area network (WLAN). In an embodiment, the base station 2014b and the WTRUs 2002c, 2002d may implement a radio technology such as IEEE 802.15 to establish a wireless personal area network (WPAN). In yet an embodiment, the base station 2014b and the WTRUs 2002c, 2002d may utilize a cellular-based RAT (e.g., WCDMA, CDMA2000, GSM, LTE, LTE-A, etc.) to establish a picocell or femtocell. As shown in FIG. 20A, the base station 2014b may have a direct connection to the Internet 2010. Thus, the base station 2014b may not be required to access the Internet 2010 via the core network 2006/2007/2009.

The RAN 2003/2004/2005 may be in communication with the core network 2006/2007/2009, which may be any type of network configured to provide voice, data, applications, and/or voice over internet protocol (VoIP) services to one or more of the WTRUs 2002a, 2002b, 2002c, 2002d. For example, the core network 2006/2007/2009 may provide call control, billing services, mobile location-based services, pre-paid calling, Internet connectivity, video distribution, etc., and/or perform high-level security functions, such as user authentication. Although not shown in FIG. 20A, it will be appreciated that the RAN 2003/2004/2005 and/or the core network 2006/2007/2009 may be in direct or indirect communication with other RANs that employ the same RAT as the RAN 2003/2004/2005 or a different RAT. For example, in addition to being connected to the RAN 2003/2004/2005, which may be utilizing an E-UTRA radio technology, the core network 2006/2007/2009 may also be in communication with a RAN (not shown) employing a GSM radio technology.

The core network 2006/2007/2009 may also serve as a gateway for the WTRUs 2002a, 2002b, 2002c, 2002d to access the PSTN 2008, the Internet 2010, and/or other networks 2012. The PSTN 2008 may include circuit-switched telephone networks that provide plain old telephone service (POTS). The Internet 2010 may include a global system of interconnected computer networks and devices that use common communication protocols, such as the transmission control protocol (TCP), user datagram protocol (UDP) and the internet protocol (IP) in the TCP/IP internet protocol suite. The networks 2012 may include wired or wireless communications networks owned and/or operated by other service providers. For example, the networks 2012 may include a core network connected to one or more RANs, which may employ the same RAT as the RAN 2003/2004/2005 or a different RAT.

Some or all of the WTRUs 2002a, 2002b, 2002c, 2002d in the communications system 2000 may include multi-mode capabilities, e.g., the WTRUs 2002a, 2002b, 2002c, 2002d may include multiple transceivers for communicating with different wireless networks over different wireless links. For example, the WTRU 2002c shown in FIG. 20A may be configured to communicate with the base station 2014a, which may employ a cellular-based radio technology, and with the base station 2014b, which may employ an IEEE 802 radio technology.

Figure 20B:
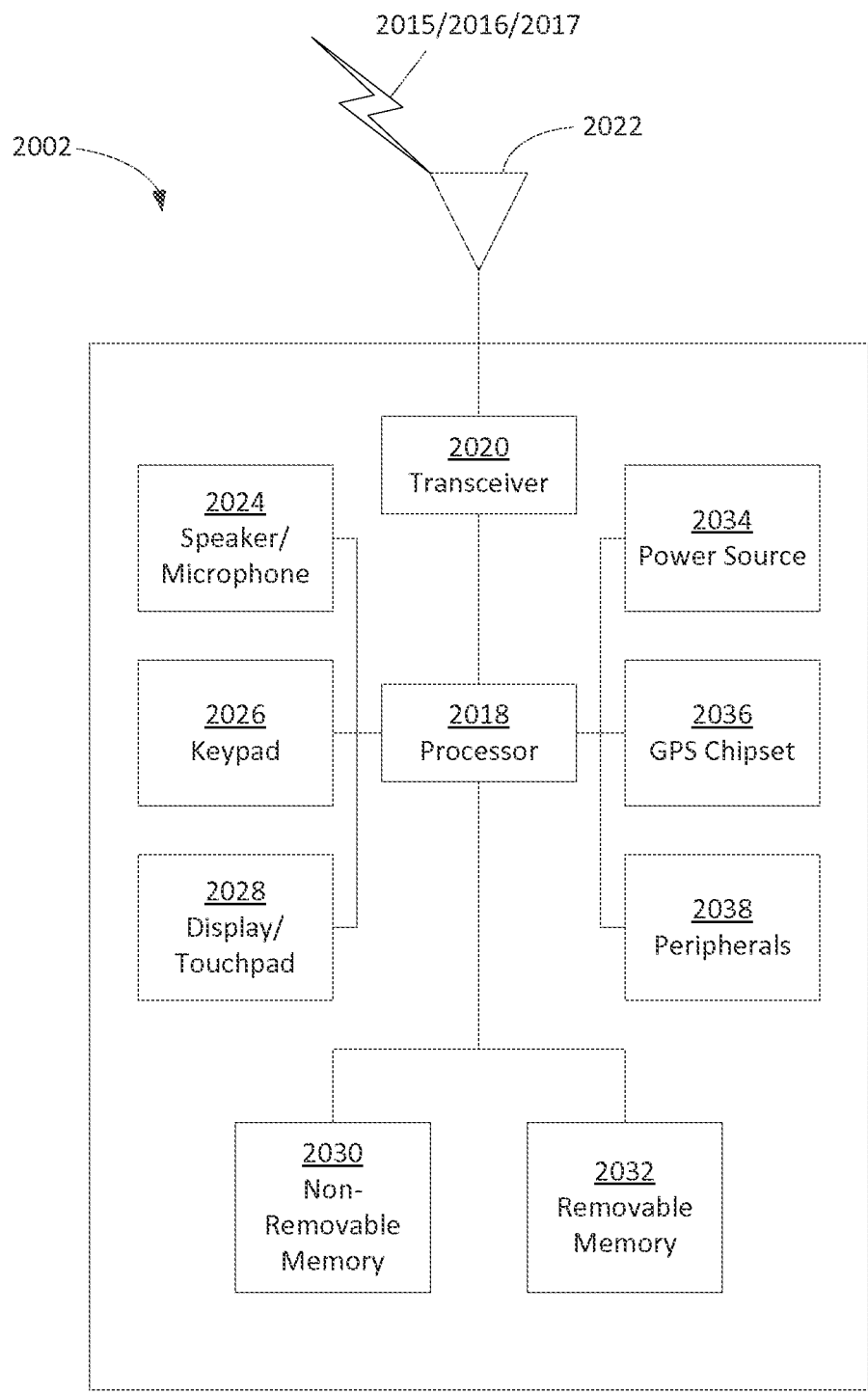
FIG. 20B is a system diagram of an example wireless transmit/receive unit (WTRU) that may be used within the communications system illustrated in FIG. 20A.

FIG. 20B is a system diagram of an example WTRU 2002. As shown in FIG. 20B, the WTRU 2002 may include a processor 2018, a transceiver 2020, a transmit/receive element 2022, a speaker/microphone 2024, a keypad 2026, a display/touchpad 2028, non-removable memory 2030, removable memory 2032, a power source 2034, a global positioning system (GPS) chipset 2036, and other peripherals 2038. It will be appreciated that the WTRU 2002 may include any sub-combination of the foregoing elements while remaining consistent with an embodiment. Also, embodiments contemplate that the base stations 2014a and 2014b, and/or the nodes that base stations 2014a and 2014b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or each of the elements depicted in FIG. 20B and described herein.

The processor 2018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2018 may perform signal coding, data processing, power control, input/output processing, and/or any other functionality that enables the WTRU 2002 to operate in a wireless environment. The processor 2018 may be coupled to the transceiver 2020, which may be coupled to the transmit/receive element 2022. While FIG. 20B depicts the processor 2018 and the transceiver 2020 as separate components, it will be appreciated that the processor 2018 and the transceiver 2020 may be integrated together in an electronic package or chip.

The transmit/receive element 2022 may be configured to transmit signals to, or receive signals from, a base station (e.g., the base station 2014a) over the air interface 2015/2016/2017. For example, in one embodiment, the transmit/receive element 2022 may be an antenna configured to transmit and/or receive RF signals. In an embodiment, the transmit/receive element 2022 may be an emitter/detector configured to transmit and/or receive IR, UV, or visible light signals, for example. In yet an embodiment, the transmit/receive element 2022 may be configured to transmit and receive both RF and light signals. It will be appreciated that the transmit/receive element 2022 may be configured to transmit and/or receive any combination of wireless signals.

In addition, although the transmit/receive element 2022 is depicted in FIG. 20B as a single element, the WTRU 2002 may include any number of transmit/receive elements 2022. More specifically, the WTRU 2002 may employ MIMO technology. Thus, in one embodiment, the WTRU 2002 may include two or more transmit/receive elements 2022 (e.g., multiple antennas) for transmitting and receiving wireless signals over the air interface 2015/2016/2017.

The transceiver 2020 may be configured to modulate the signals that are to be transmitted by the transmit/receive element 2022 and to demodulate the signals that are received by the transmit/receive element 2022. As noted above, the WTRU 2002 may have multi-mode capabilities. Thus, the transceiver 2020 may include multiple transceivers for enabling the WTRU 2002 to communicate via multiple RATs, such as UTRA and IEEE 802.11, for example.

The processor 2018 of the WTRU 2002 may be coupled to, and may receive user input data from, the speaker/microphone 2024, the keypad 2026, and/or the display/touchpad 2028 (e.g., a liquid crystal display (LCD) display unit or organic light-emitting diode (OLED) display unit). The processor 2018 may also output user data to the speaker/microphone 2024, the keypad 2026, and/or the display/touchpad 2028. In addition, the processor 2018 may access information from, and store data in, any type of suitable memory, such as the non-removable memory 2030 and/or the removable memory 2032. The non-removable memory 2030 may include random-access memory (RAM), read-only memory (ROM), a hard disk, or any other type of memory storage device. The removable memory 2032 may include a subscriber identity module (SIM) card, a memory stick, a secure digital (SD) memory card, and the like. In an embodiment, the processor 2018 may access information from, and store data in, memory that is not physically located on the WTRU 2002, such as on a server or a home computer (not shown).

The processor 2018 may receive power from the power source 2034, and may be configured to distribute and/or control the power to the other components in the WTRU 2002. The power source 2034 may be any suitable device for powering the WTRU 2002. For example, the power source 2034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2018 may also be coupled to the GPS chipset 2036, which may be configured to provide location information (e.g., longitude and latitude) regarding the current location of the WTRU 2002. In addition to, or in lieu of, the information from the GPS chipset 2036, the WTRU 2002 may receive location information over the air interface 2015/2016/2017 from a base station (e.g., base stations 2014a, 2014b) and/or determine its location based on the timing of the signals being received from two or more nearby base stations. It will be appreciated that the WTRU 2002 may acquire location information by way of any suitable location-determination method while remaining consistent with an embodiment.

The processor 2018 may further be coupled to other peripherals 2038, which may include one or more software and/or hardware modules that provide additional features, functionality and/or wired or wireless connectivity. For example, the peripherals 2038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20C:
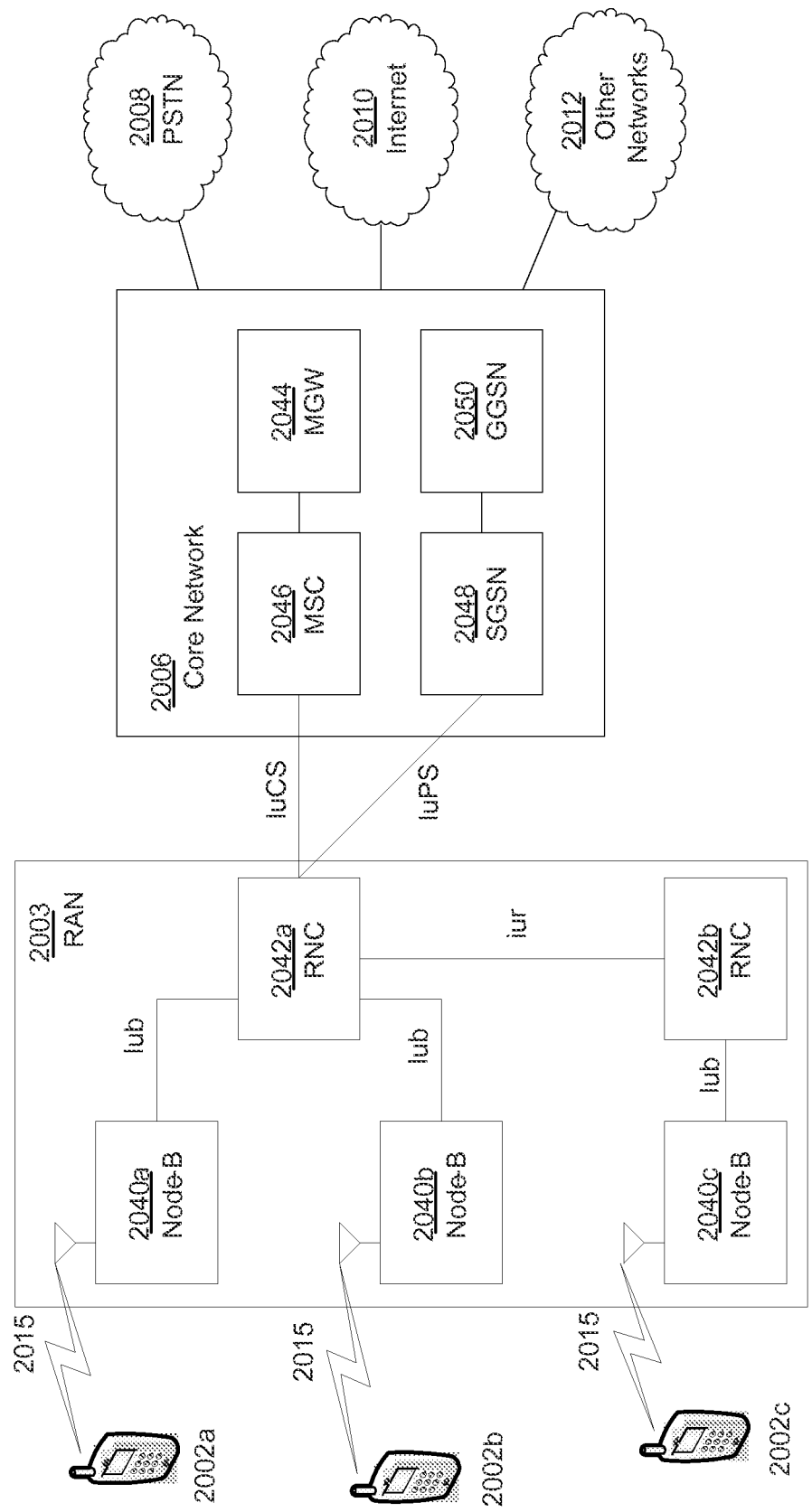
FIG. 20C is a system diagram of an example radio access network and an example core network that may be used within the communications system illustrated in FIG. 20A.

FIG. 20C is a system diagram of the RAN 2003 and the core network 2006 according to an embodiment. As noted above, the RAN 2003 may employ a UTRA radio technology to communicate with the WTRUs 2002a, 2002b, 2002c over the air interface 2015. The RAN 2003 may also be in communication with the core network 2006. As shown in FIG. 20C, the RAN 2003 may include Node-Bs 2040a, 2040b, 2040c, which may each include one or more transceivers for communicating with the WTRUs 2002a, 2002b, 2002c over the air interface 2015. The Node-Bs 2040a, 2040b, 2040c may each be associated with a particular cell (not shown) within the RAN 2003. The RAN 2003 may also include RNCs 2042a, 2042b. It will be appreciated that the RAN 2003 may include any number of Node-Bs and RNCs while remaining consistent with an embodiment.

As shown in FIG. 20C, the Node-Bs 2040a, 2040b may be in communication with the RNC 2042a. Additionally, the Node-B 2040c may be in communication with the RNC 2042b. The Node-Bs 2040a, 2040b, 2040c may communicate with the respective RNCs 2042a, 2042b via an Iub interface. The RNCs 2042a. 2042b may be in communication with one another via an Iur interface. Each of the RNCs 2042a, 2042b may be configured to control the respective Node-Bs 2040a, 2040b, 2040c to which it is connected. In addition, each of the RNCs 2042a, 2042b may be configured to carry out or support other functionality, such as outer loop power control, load control, admission control, packet scheduling, handover control, macro diversity, security functions, data encryption, and the like.

The core network 2006 shown in FIG. 20C may include a media gateway (MGW) 2044, a mobile switching center (MSC) 2046, a serving GPRS support node (SGSN) 2048, and/or a gateway GPRS support node (GGSN) 2050. While each of the foregoing elements are depicted as part of the core network 2006, it will be appreciated that any one of these elements may be owned and/or operated by an entity other than the core network operator.

The RNC 2042a in the RAN 2003 may be connected to the MSC 2046 in the core network 2006 via an IuCS interface. The MSC 2046 may be connected to the MGW 2044. The MSC 2046 and the MGW 2044 may provide the WTRUs 2002a, 2002b, 2002c with access to circuit-switched networks, such as the PSTN 2008, to facilitate communications between the WTRUs 2002a, 2002b, 2002c and traditional land-line communications devices.

The RNC 2042a in the RAN 2003 may also be connected to the SGSN 2048 in the core network 2006 via an IuPS interface. The SGSN 2048 may be connected to the GGSN 2050. The SGSN 2048 and the GGSN 2050 may provide the WTRUs 2002*a*, 2002*b*, 2002*c* with access to packet-switched networks, such as the Internet 2010, to facilitate communications between and the WTRUs 2002*a*, 2002*b*, 2002*c* and IP-enabled devices.

As noted above, the core network 2006 may also be connected to the networks 2012, which may include other wired or wireless networks that are owned and/or operated by other service providers.

Figure 20D:
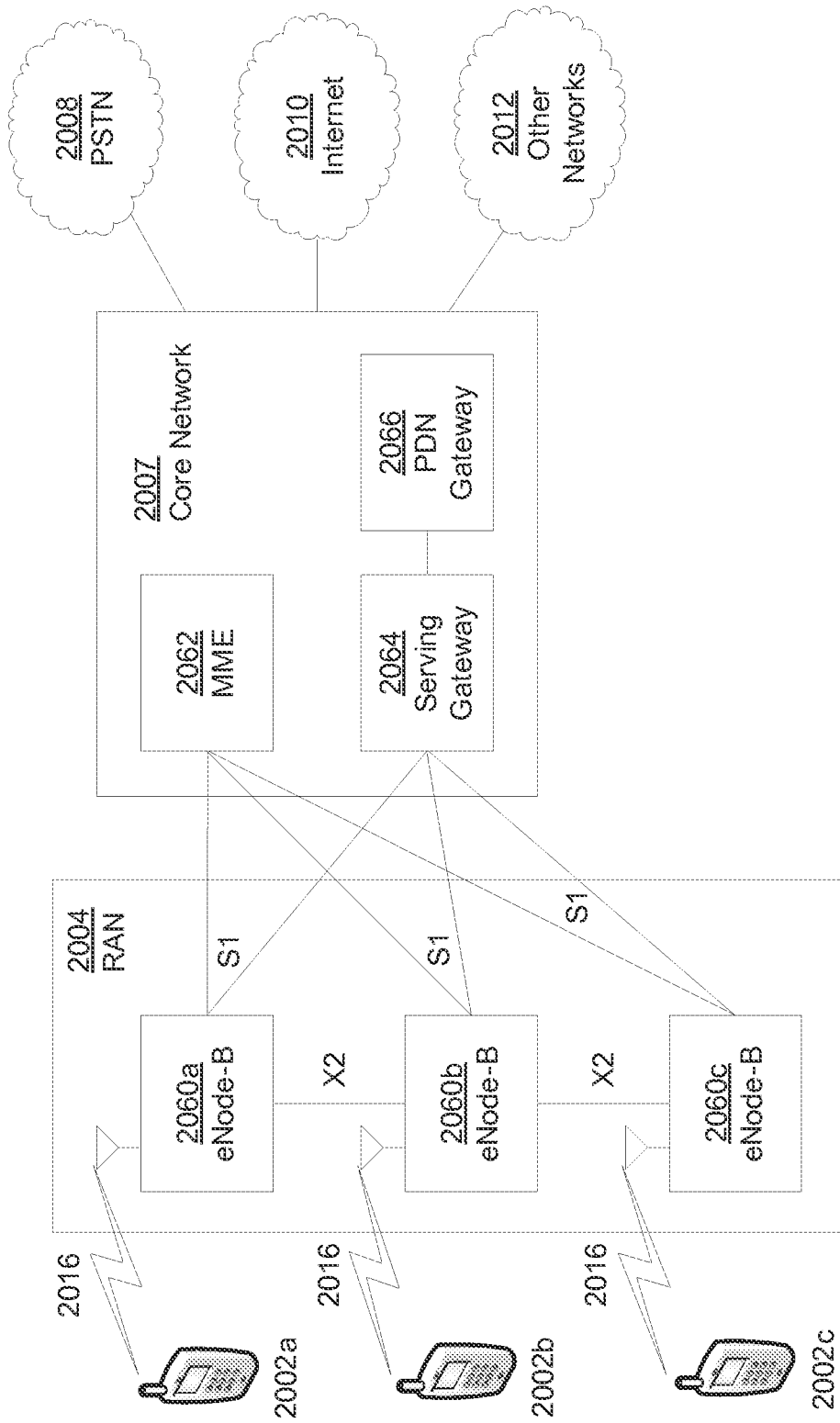
FIG. 20D is a system diagram of another example radio access network and another example core network that may be used within the communications system illustrated in FIG. 20A.

FIG. 20D is a system diagram of the RAN 2004 and the core network 2007 according to an embodiment. As noted above, the RAN 2004 may employ an E-UTRA radio technology to communicate with the WTRUs 2002*a*, 2002*b*, 2002*c* over the air interface 2016. The RAN 2004 may also be in communication with the core network 2007.

The RAN 2004 may include eNode-Bs 2060*a*, 2060*b*, 2060*c*, though it will be appreciated that the RAN 2004 may include any number of eNode-Bs while remaining consistent with an embodiment. The eNode-Bs 2060*a*, 2060*b*, 2060*c* may each include one or more transceivers for communicating with the WTRUs 2002*a*, 2002*b*, 2002*c* over the air interface 2016. In one embodiment, the eNode-Bs 2060*a*, 2060*b*, 2060*c* may implement MIMO technology. Thus, the eNode-B 2060*a*, for example, may use multiple antennas to transmit wireless signals to, and receive wireless signals from, the WTRU 2002*a*.

Each of the eNode-Bs 2060*a*, 2060*b*, 2060*c* may be associated with a particular cell (not shown) and may be configured to handle radio resource management decisions, handover decisions, scheduling of users in the uplink and/or downlink, and the like. As shown in FIG. 8D, the eNode-Bs 2060*a*, 2060*b*. 2060*c* may communicate with one another over an X2 interface.

The core network 2007 shown in FIG. 8D may include a mobility management gateway (MME) 2062, a serving gateway 2064, and a packet data network (PDN) gateway 2066. While each of the foregoing elements are depicted as part of the core network 2007, it will be appreciated that any one of these elements may be owned and/or operated by an entity other than the core network operator.

The MME 2062 may be connected to each of the eNode-Bs 2060*a*, 2060*b*, 2060*c* in the RAN 2004 via an S1 interface and may serve as a control node. For example, the MME 2062 may be responsible for authenticating users of the WTRUs 2002*a*, 2002*b*, 2002*c*, bearer activation/deactivation, selecting a particular serving gateway during an initial attach of the WTRUs 2002*a*, 2002*b*, 2002*c*, and the like. The MME 2062 may also provide a control plane function for switching between the RAN 2004 and other RANs (not shown) that employ other radio technologies, such as GSM or WCDMA.

The serving gateway 2064 may be connected to each of the eNode-Bs 2060*a*, 2060*b*, 2060*c* in the RAN 2004 via the S1 interface. The serving gateway 2064 may generally route and forward user data packets to/from the WTRUs 2002*a*, 2002*b*, 2002*c*. The serving gateway 2064 may also perform other functions, such as anchoring user planes during inter-eNode B handovers, triggering paging when downlink data is available for the WTRUs 2002*a*, 2002*b*, 2002*c*, managing and storing contexts of the WTRUs 2002*a*, 2002*b*, 2002*c*, and the like.

The serving gateway 2064 may also be connected to the PDN gateway 2066, which may provide the WTRUs 2002*a*, 2002*b*, 2002*c* with access to packet-switched networks, such as the Internet 2010, to facilitate communications between the WTRUs 2002*a*, 2002*b*, 2002*c* and IP-enabled devices.

The core network 2007 may facilitate communications with other networks. For example, the core network 2007 may provide the WTRUs 2002*a*, 2002*b*, 2002*c* with access to circuit-switched networks, such as the PSTN 2008, to facilitate communications between the WTRUs 2002*a*, 2002*b*, 2002*c* and traditional land-line communications devices. For example, the core network 2007 may include, or may communicate with, an IP gateway (e.g., an IP multimedia subsystem (IMS) server) that serves as an interface between the core network 2007 and the PSTN 2008. In addition, the core network 2007 may provide the WTRUs 2002*a*, 2002*b*, 2002*c* with access to the networks 2012, which may include other wired or wireless networks that are owned and/or operated by other service providers.

Figure 20E:
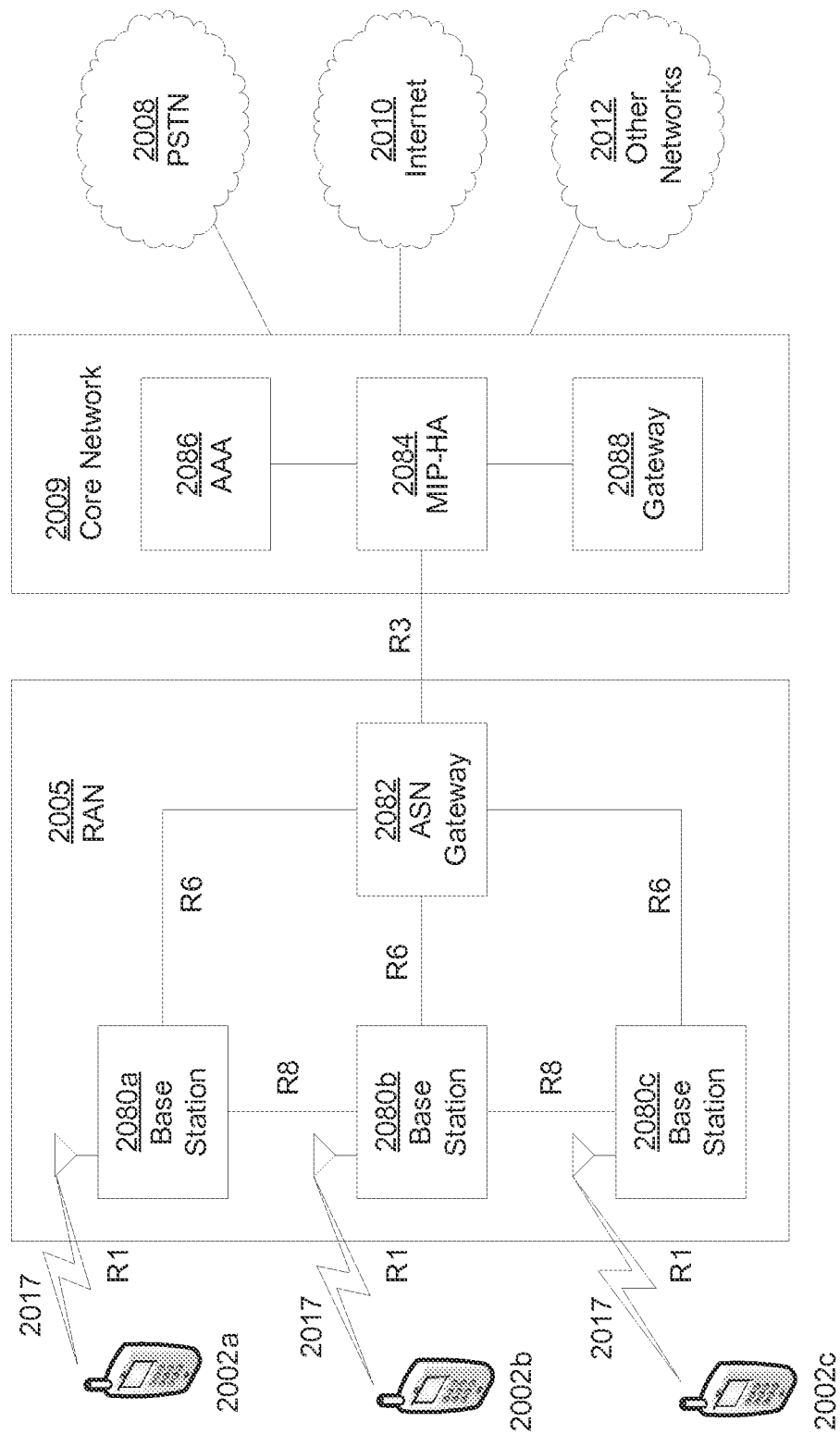
FIG. 20E is a system diagram of another example radio access network and another example core network that may be used within the communications system illustrated in FIG. 20A.

FIG. 20E is a system diagram of the RAN 2005 and the core network 2009 according to an embodiment. The RAN 2005 may be an access service network (ASN) that employs IEEE 802.16 radio technology to communicate with the WTRUs 2002*a*. 2002*b*, 2002*c* over the air interface 2017. As will be further discussed below, the communication links between the different functional entities of the WTRUs 2002*a*, 2002*b*, 2002*c*, the RAN 2005, and the core network 2009 may be defined as reference points.

As shown in FIG. 20E, the RAN 2005 may include base stations 2080*a*, 2080*b*, 2080*c*, and an ASN gateway 2082, though it will be appreciated that the RAN 2005 may include any number of base stations and ASN gateways while remaining consistent with an embodiment. The base stations 2080*a*, 2080*b*, 2080*c* may each be associated with a particular cell (not shown) in the RAN 2005 and may each include one or more transceivers for communicating with the WTRUs 2002*a*, 2002*b*, 2002*c* over the air interface 2017. In one embodiment, the base stations 2080*a*, 2080*b*, 2080*c* may implement MIMO technology. Thus, the base station 2080*a*, for example, may use multiple antennas to transmit wireless signals to, and receive wireless signals from, the WTRU 2002*a*. The base stations 2080*a*. 2080*b*, 2080*c* may also provide mobility management functions, such as handoff triggering, tunnel establishment, radio resource management, traffic classification, quality of service (QoS) policy enforcement, and the like. The ASN gateway 2082 may serve as a traffic aggregation point and may be responsible for paging, caching of subscriber profiles, routing to the core network 2009, and the like.

The air interface 2017 between the WTRUs 2002*a*, 2002*b*, 2002*c* and the RAN 2005 may be defined as an R1 reference point that implements the IEEE 802.16 specification. In addition, each of the WTRUs 2002*a*, 2002*b*. 2002*c* may establish a logical interface (not shown) with the core network 2009. The logical interface between the WTRUs 2002*a*, 2002*b*, 2002*c* and the core network 2009 may be defined as an R2 reference point, which may be used for authentication, authorization, IP host configuration management, and/or mobility management.

The communication link between each of the base stations 2080*a*, 2080*b*, 2080*c* may be defined as an R8 reference point that includes protocols for facilitating WTRU handovers and the transfer of data between base stations. The communication link between the base stations 2080*a*, 2080*b*, 2080*c* and the ASN gateway 2082 may be defined as an R6 reference point. The R6 reference point may include protocols for facilitating mobility management based on mobility events associated with each of the WTRUs 2002*a*, 2002*b*, 2002*c*.

As shown in FIG. 20E, the RAN 2005 may be connected to the core network 2009. The communication link between the RAN 2005 and the core network 2009 may defined as an R3 reference point that includes protocols for facilitating data transfer and mobility management capabilities, for example. The core network 2009 may include a mobile IP home agent (MIP-HA) 2084, an authentication, authorization, accounting (AAA) server 2086, and a gateway 2088. While each of the foregoing elements are depicted as part of the core network 2009, it will be appreciated that any one of these elements may be owned and/or operated by an entity other than the core network operator.

The MIP-HA may be responsible for IP address management, and may enable the WTRUs 2002a, 2002b, 2002c to roam between different ASNs and/or different core networks. The MIP-HA 2084 may provide the WTRUs 2002a, 2002b, 2002c with access to packet-switched networks, such as the Internet 2010, to facilitate communications between the WTRUs 2002a, 2002b, 2002c and IP-enabled devices. The AAA server 2086 may be responsible for user authentication and for supporting user services. The gateway 2088 may facilitate interworking with other networks. For example, the gateway 2088 may provide the WTRUs 2002a, 2002b, 2002c with access to circuit-switched networks, such as the PSTN 2008, to facilitate communications between the WTRUs 2002a, 2002b. 2002c and traditional land-line communications devices. In addition, the gateway 2088 may provide the WTRUs 2002a, 2002b, 2002c with access to the networks 2012, which may include other wired or wireless networks that are owned and/or operated by other service providers.

Although not shown in FIG. 20E, it will be appreciated that the RAN 2005 may be connected to other ASNs and the core network 2009 may be connected to other core networks. The communication link between the RAN 2005 the other ASNs may be defined as an R4 reference point, which may include protocols for coordinating the mobility of the WTRUs 2002a, 2002b, 2002c between the RAN 2005 and the other ASNs. The communication link between the core network 2009 and the other core networks may be defined as an R5 reference, which may include protocols for facilitating interworking between home core networks and visited core networks.

The processes described above may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device comprising:
a processor configured to:
determine a first time instance based on motion information of a block of a base layer picture characterized by a second time instance;
generate, using the motion information, a motion compensated differential block characterized by the first time instance that indicates a difference between a block of a base layer reference picture characterized by the first time instance and a block of an enhancement layer picture characterized by the first time instance;
determine a weight using a reference index associated with the base layer reference picture and a prediction mode;
apply the weight to the motion compensated differential block;
add the weighted motion compensated differential block to the block of the base layer picture characterized by the second time instance to generate an enhanced inter-layer reference (E-ILR) block characterized by the second time instance;
generate an E-ILR picture characterized by the second time instance that comprises the E-ILR block; and
add the E-ILR picture to a reference picture list for the enhancement layer picture characterized by the second time instance.

2. The device of claim 1, wherein the block of the base layer reference picture is an upsampled block of the base layer reference picture, and wherein the block of the base layer picture is an upsampled block of the base layer picture.

3. The device of claim 1, wherein the processor is configured to determine the prediction mode based on whether the motion compensated differential block is generated using uni-prediction or bi-prediction.

4. The device of claim 3, wherein the processor is further configured to:
select a lookup table out of a plurality of lookup tables based on the reference index from the motion information and the prediction mode; and
determine the weight using the selected lookup table.

5. The device of claim 1, wherein the processor is configured to add an offset to the motion compensated differential block.

6. The device of claim 5, wherein the processor is further configured to subtract the offset from the motion compensated differential block before adding the motion compensated differential block to the block of the base layer picture to generate the E-ILR block.

7. The device of claim 1, wherein the processor is further configured to determine an offset such that when the offset is added to the motion compensated differential block, a dynamic range of the motion compensated differential block is shifted to a dynamic range of the enhancement layer picture characterized by the second time instance.

8. The device of claim 1, wherein the processor is configured to predict the enhancement layer picture characterized by the second time instance using the E-ILR picture.

9. A video device comprising:
a processor configured to:
determine a first time instance based on motion information of a block of a base layer picture characterized by a second time instance;
generate a residual block that indicates a difference between a motion compensated block of a base layer reference picture characterized by the first time instance and a block of the base layer picture;
determine a weight using a reference index associated with the base layer reference picture and a prediction mode;
apply the weight to the residual block;
add the weighted residual block to a motion compensated block of an enhancement layer picture characterized by the first time instance to generate an enhanced inter-layer reference (E-ILR) block characterized by the second time instance; and generate an E-ILR picture characterized by the second time instance that comprises the E-ILR block; and add the E-ILR picture to a reference picture list for the enhancement layer picture characterized by the second time instance.

10. The device of claim 9, wherein the block of the base layer reference picture is an upsampled block of the base layer reference picture, and wherein the block of the base layer picture is an upsampled block of the base layer picture.

11. The device of claim 9, wherein the prediction mode is a uni-prediction mode or a bi-prediction mode.

12. The device of claim 9, wherein the processor is configured to add an offset to the residual block after applying the weight to the residual block.

13. The device of claim 12, wherein the processor is configured to subtract the offset from the residual block before adding the residual block to the motion compensated block of the enhancement layer picture to generate the E-ILR block.

14. The device of claim 9, wherein the processor is configured to predict the enhancement layer picture characterized by the second time instance using the E-ILR picture.

15. A device comprising:
a processor configured to:
determine a first time instance based on motion information of a block of a base layer picture characterized by a second time instance;
generate, using the motion information, a motion compensated differential block characterized by the first time instance that indicates a difference between a block of a base layer reference picture characterized by the first time instance and a block of an enhancement layer picture characterized by the first time instance;
determine a weight using a reference index associated with the base layer reference picture and a prediction mode;
apply the weight to the motion compensated differential block; and
add the weighted motion compensated differential block to a block of the base layer picture characterized by the second time instance to generate an enhanced inter-layer reference (E-ILR) block characterized by the second time instance.

16. The device of claim 15, wherein the block of the base layer reference picture is an upsampled block of the base layer reference picture, and wherein the block of the base layer picture is an upsampled block of the base layer picture.

17. The device of claim 15, wherein the processor is configured to:
select a lookup table out of a plurality of lookup tables based on the reference index from the motion information and the prediction mode; and
determine the weight using the selected lookup table.

18. The device of claim 15, wherein the processor is configured to add an offset to the motion compensated differential block.

19. The device of claim 18, wherein the processor is further configured to subtract the offset from the motion compensated differential block before adding the motion compensated differential block to the block of the base layer picture to generate the E-ILR block.

20. The device of claim 15, wherein the processor is configured to:
generate an E-ILR picture characterized by the second time instance that comprises the E-ILR block;
add the E-ILR picture to a reference picture list for the enhancement layer picture characterized by the second time instance; and
predict the enhancement layer picture characterized by the second time instance using the E-ILR picture.

21. A method for decoding a video, the method comprising determining, by a device, a first time instance based on motion information of a block of a base layer picture characterized by a second time instance;
generating, using the motion information, a motion compensated differential block characterized by the first time instance that indicates a difference between a block of a base layer reference picture characterized by the first time instance and a block of an enhancement layer picture characterized by the first time instance;
determining a weight using a reference index associated with the base layer reference picture and a prediction mode;
applying the weight to the motion compensated differential block;
adding the weighted motion compensated differential block to the block of the base layer picture characterized by the second time instance to generate an enhanced inter-layer reference (E-ILR) block characterized by the second time instance;
generating an E-ILR picture characterized by the second time instance that comprises the E-ILR block; and
adding the E-ILR picture to a reference picture list for the enhancement layer picture characterized by the second time instance.

22. A method for decoding a video, the method comprising: a processor configured to:
determining a first time instance based on motion information of a block of a base layer picture characterized by a second time instance;
generating a residual block that indicates a difference between a motion compensated block of a base layer reference picture characterized by the first time instance and a block of the base layer picture;
determining a weight using a reference index associated with the base layer reference picture and a prediction mode;
applying the weight to the residual block;
adding adding the weighted residual block to a motion compensated block of an enhancement layer picture characterized by the first time instance to generate an enhanced inter-layer reference (E-ILR) block characterized by the second time instance; and
generating an E-ILR picture characterized by the second time instance that comprises the E-ILR block; and
adding the E-ILR picture to a reference picture list for the enhancement layer picture characterized by the second time instance.

* * * * *